(12) United States Patent
Amarendran et al.

(10) Patent No.: US 9,984,006 B2
(45) Date of Patent: *May 29, 2018

(54) DATA STORAGE SYSTEMS AND METHODS

(71) Applicant: Commvault Systems, Inc., Tinton Falls, NJ (US)

(72) Inventors: Arun Prasad Amarendran, Manalapan, NJ (US); Tirthankar Chatterjee, Tinton Falls, NJ (US); Yun Yuan, Eatontown, NJ (US); Yongtao Liu, Eatontown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/632,145

(22) Filed: Jun. 23, 2017

(65) Prior Publication Data
US 2018/0032446 A1  Feb. 1, 2018

Related U.S. Application Data

(63) Continuation of application No. 15/195,681, filed on Jun. 28, 2016, now Pat. No. 9,720,849, which is a (Continued)

(51) Int. Cl.
*H04L 29/06* (2006.01)
*G06F 12/14* (2006.01)
(Continued)

(52) U.S. Cl.
CPC .......... *G06F 12/1408* (2013.01); *G06F 17/27* (2013.01); *G06F 17/3012* (2013.01);
(Continued)

(58) Field of Classification Search
CPC ................................. H04L 67/10; H04L 9/00
See application file for complete search history.

(56) References Cited

U.S. PATENT DOCUMENTS 4,084,231 A   4/1978 Capozzi et al.
4,267,568 A   5/1981 Dechant et al.
(Continued)

FOREIGN PATENT DOCUMENTS

EP   0259912   3/1988
EP   0405926   1/1991
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Haresh N Patel
(74) *Attorney, Agent, or Firm* — Knobbe, Martens, Olson & Bear, LLP

(57) ABSTRACT

Data storage systems are disclosed for automatically generating encryption rules based on a set of training files that are known to include sensitive information. The system may use a number of heuristic algorithms to generate one or more encryption rules for determining whether a file includes sensitive information. Further, the system may apply the heuristic algorithms to the content of the files, as determined by using natural language processing algorithms, to generate the encryption rules. Moreover, systems are disclosed that are capable of automatically determining whether to encrypt a file based on the generated encryption rules. The content of the file may be determined using natural language processing algorithms and then the encryption rules may be applied to the content of the file to determine whether to encrypt the file.

20 Claims, 24 Drawing Sheets

Related U.S. Application Data continuation of application No. 14/489,222, filed on Sep. 17, 2014, now Pat. No. 9,405,928.

(51) Int. Cl.

| | | |
|---|---|---|
| *H04L 29/08* | (2006.01) | |
| *G06F 21/60* | (2013.01) | |
| *G06N 5/02* | (2006.01) | |
| *G06F 17/27* | (2006.01) | |
| *G06F 17/30* | (2006.01) | |
| *G06N 99/00* | (2010.01) | |
| *G06F 21/62* | (2013.01) | |

(52) U.S. Cl.
CPC ........ *G06F 21/602* (2013.01); *G06F 21/6218* (2013.01); *G06N 5/02* (2013.01); *G06N 99/005* (2013.01); *H04L 63/0428* (2013.01); *H04L 67/10* (2013.01); *G06F 2212/1052* (2013.01); *G06F 2212/402* (2013.01); *G06F 2221/2107* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,966,448 A | 10/1999 | Namba et al. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,496,949 B1 | 12/2002 | Kanevsky et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,658,436 B2 | 12/2003 | Oshinsky et al. |
| 6,658,526 B2 | 12/2003 | Nguyen et al. |
| 6,721,767 B2 | 4/2004 | De Meno et al. |
| 6,760,723 B2 | 7/2004 | Oshinsky et al. |
| 6,959,327 B1 | 10/2005 | Vogl et al. |
| 6,973,444 B1 | 12/2005 | Blinn et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,162,496 B2 | 1/2007 | Amarendran et al. |
| 7,171,558 B1 | 1/2007 | Mourad et al. |
| 7,174,433 B2 | 2/2007 | Kottomtharayil et al. |
| 7,209,972 B1 | 4/2007 | Ignatius et al. |
| 7,246,207 B2 | 7/2007 | Kottomtharayil et al. |
| 7,266,200 B2 | 9/2007 | Lambert |
| 7,266,699 B2 | 9/2007 | Newman et al. |
| 7,277,941 B2 | 10/2007 | Ignatius et al. |
| 7,315,923 B2 | 1/2008 | Retnamma et al. |
| 7,315,924 B2 | 1/2008 | Prahlad et al. |
| 7,343,453 B2 | 3/2008 | Prahlad et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,480,803 B1 | 1/2009 | Marballi |
| 7,484,054 B2 | 1/2009 | Kottomtharayil et al. |
| 7,490,207 B2 | 2/2009 | Amarendran et al. |
| 7,496,766 B2 | 2/2009 | Kitamura |
| 7,500,053 B1 | 3/2009 | Kavuri et al. |
| 7,506,102 B2 | 3/2009 | Lev-Ran et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,581,077 B2 | 8/2009 | Ignatius et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |

(56) References Cited

U.S. PATENT DOCUMENTS

| | | |
|---|---|---|
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,627,776 B2 | 12/2009 | Petruzzo |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,418 B2 * | 2/2010 | Glick .................. G06F 21/10 380/251 |
| 7,660,807 B2 | 2/2010 | Prahlad et al. |
| 7,661,028 B2 | 2/2010 | Erofeev |
| 7,739,381 B2 | 6/2010 | Ignatius et al. |
| 7,739,459 B2 | 6/2010 | Kottomtharayil et al. |
| 7,747,579 B2 | 6/2010 | Prahlad et al. |
| 7,757,043 B2 | 7/2010 | Kavuri et al. |
| 7,769,961 B2 | 8/2010 | Kottomtharayil et al. |
| 7,783,895 B2 | 8/2010 | Hori et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,861,050 B2 | 12/2010 | Retnamma et al. |
| 7,945,586 B1 | 5/2011 | Fang et al. |
| 8,009,833 B2 | 8/2011 | Uchikawa |
| 8,131,964 B2 | 3/2012 | Retnamma et al. |
| 8,140,786 B2 | 3/2012 | Bunte et al. |
| 8,140,847 B1 | 3/2012 | Wu |
| 8,156,086 B2 | 4/2012 | Lu et al. |
| 8,170,995 B2 | 5/2012 | Prahlad et al. |
| 8,190,647 B1 * | 5/2012 | Pereira ................ G06F 21/566 707/749 |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,306,931 B1 | 11/2012 | Bowman et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,392,677 B2 | 3/2013 | Bunte et al. |
| 8,401,982 B1 | 3/2013 | Satish et al. |
| 8,413,244 B1 | 4/2013 | Nachenberg |
| 8,417,908 B2 | 4/2013 | Retnamma et al. |
| 8,429,425 B2 | 4/2013 | Ko et al. |
| 8,429,428 B2 | 4/2013 | Ignatius et al. |
| 8,478,937 B2 | 7/2013 | Grube et al. |
| 8,510,573 B2 | 8/2013 | Muller et al. |
| 8,538,020 B1 | 9/2013 | Miller |
| 8,612,439 B2 | 12/2013 | Prahlad et al. |
| 8,751,828 B1 | 6/2014 | Raizen et al. |
| 8,775,823 B2 | 7/2014 | Gokhale et al. |
| 9,081,978 B1 * | 7/2015 | Connolly .............. G06F 21/62 713/168 |
| 9,208,348 B1 | 12/2015 | Brennan et al. |
| 9,367,702 B2 | 6/2016 | Erofeev et al. |
| 9,405,928 B2 | 8/2016 | Amarendran et al. |
| 9,411,986 B2 | 8/2016 | Muller et al. |
| 9,483,655 B2 | 11/2016 | Erofeev et al. |
| 9,633,232 B2 | 4/2017 | Gokhale et al. |
| 9,720,849 B2 | 8/2017 | Amarendran et al. |
| 9,727,491 B2 | 8/2017 | Amarendran et al. |
| 9,734,348 B2 | 8/2017 | Gokhale et al. |
| 2003/0046572 A1 | 3/2003 | Newman et al. |
| 2003/0079120 A1 | 4/2003 | Hearn et al. |
| 2003/0081784 A1 | 5/2003 | Kallahalla et al. |
| 2004/0181689 A1 | 9/2004 | Kiyoto et al. |
| 2004/0210539 A1 | 10/2004 | Ikeda et al. |
| 2004/0218804 A1 | 11/2004 | Affleck et al. |
| 2005/0027999 A1 | 2/2005 | Pelly et al. |
| 2005/0065890 A1 | 3/2005 | Benaloh |
| 2005/0091655 A1 | 4/2005 | Probert et al. |
| 2005/0108526 A1 | 5/2005 | Robertson |
| 2005/0180573 A1 | 8/2005 | Pelly et al. |
| 2005/0246510 A1 | 11/2005 | Retnamma et al. |
| 2005/0257062 A1 | 11/2005 | Ignatius et al. |
| 2006/0034459 A1 | 2/2006 | Uchikawa |
| 2006/0120520 A1 | 6/2006 | Suzuki et al. |
| 2006/0136389 A1 | 6/2006 | Cover et al. |
| 2006/0224846 A1 | 10/2006 | Amarendran et al. |
| 2006/0232826 A1 | 10/2006 | Bar-El |
| 2006/0242296 A1 | 10/2006 | Woolard et al. |
| 2007/0050638 A1 * | 3/2007 | Rasti .................. H04L 9/3226 713/186 |
| 2007/0057958 A1 | 3/2007 | Bucher et al. |
| 2007/0100913 A1 | 5/2007 | Sumner |
| 2007/0124603 A1 | 5/2007 | Yamamichi et al. |
| 2007/0240217 A1 | 10/2007 | Tuvell et al. |
| 2007/0245108 A1 | 10/2007 | Yasaki et al. |
| 2008/0005380 A1 | 1/2008 | Kawasaki et al. |
| 2008/0037777 A1 | 2/2008 | Ignatius et al. |
| 2008/0091747 A1 | 4/2008 | Prahlad et al. |
| 2008/0091894 A1 | 4/2008 | Retnamma et al. |
| 2008/0229037 A1 | 9/2008 | Bunte et al. |
| 2008/0244721 A1 * | 10/2008 | Barrus ................ G06F 21/6254 726/9 |
| 2008/0260161 A1 | 10/2008 | Yokota et al. |
| 2008/0263355 A1 | 10/2008 | Witt et al. |
| 2009/0021403 A1 | 1/2009 | Chan et al. |
| 2009/0031128 A1 | 1/2009 | French et al. |
| 2009/0110198 A1 | 4/2009 | Garimella et al. |
| 2009/0158030 A1 * | 6/2009 | Rasti .................. H04L 63/0421 713/156 |
| 2009/0222907 A1 | 9/2009 | Guichard |
| 2009/0319534 A1 | 12/2009 | Gokhale |
| 2010/0235649 A1 | 9/2010 | Jeffries |
| 2010/0275036 A1 | 10/2010 | Harada et al. |
| 2010/0287383 A1 | 11/2010 | Conte |
| 2010/0299490 A1 | 11/2010 | Attarde et al. |
| 2010/0306175 A1 | 12/2010 | Johnson et al. |
| 2010/0313039 A1 | 12/2010 | Ignatius et al. |
| 2010/0332479 A1 | 12/2010 | Prahlad et al. |
| 2010/0333116 A1 | 12/2010 | Prahlad et al. |
| 2011/0037766 A1 | 2/2011 | Judy et al. |
| 2011/0087851 A1 | 4/2011 | Retnamma et al. |
| 2011/0157620 A1 * | 6/2011 | Nordback ............ G06F 11/2221 358/1.15 |
| 2011/0164746 A1 * | 7/2011 | Nice .................. G06F 21/6263 380/30 |
| 2011/0208808 A1 * | 8/2011 | Corbett ............ G06F 17/30442 709/203 |
| 2011/0271279 A1 | 11/2011 | Pate |
| 2012/0072391 A1 * | 3/2012 | Simitsis ................ G06Q 10/103 707/602 |
| 2012/0072713 A1 | 3/2012 | Begum et al. |
| 2012/0084523 A1 | 4/2012 | Littlefield et al. |
| 2012/0150818 A1 | 6/2012 | Vijayan Retnamma et al. |
| 2012/0150826 A1 | 6/2012 | Vijayan Retnamma et al. |
| 2012/0166745 A1 | 6/2012 | Retnamma et al. |
| 2012/0179656 A1 | 7/2012 | Bunte et al. |
| 2012/0185691 A1 | 7/2012 | Begum et al. |
| 2012/0198559 A1 | 8/2012 | Venkata Naga Ravi |
| 2012/0218275 A1 | 8/2012 | Wu |
| 2013/0086381 A1 | 4/2013 | Thomas et al. |
| 2013/0097421 A1 * | 4/2013 | Lim .................. G06F 21/602 713/167 |
| 2013/0179405 A1 | 7/2013 | Bunte et al. |
| 2013/0198522 A1 | 8/2013 | Kohno et al. |
| 2013/0283048 A1 * | 10/2013 | Chiu .................. G06F 21/6209 713/165 |
| 2013/0305039 A1 | 11/2013 | Gauda |
| 2013/0311785 A1 | 11/2013 | Ignatius et al. |
| 2014/0053252 A1 | 2/2014 | Kelsey |
| 2014/0090061 A1 | 3/2014 | Avasarala et al. |
| 2014/0115328 A1 * | 4/2014 | Allen .................. H04L 29/06 713/165 |
| 2014/0115329 A1 | 4/2014 | Sturonas et al. |
| 2014/0129830 A1 * | 5/2014 | Raudaschl .......... G06F 21/6218 713/165 |
| 2014/0245026 A1 | 8/2014 | Bates |
| 2014/0281518 A1 | 9/2014 | Erofeev et al. |
| 2014/0281519 A1 | 9/2014 | Erofeev et al. |
| 2014/0281545 A1 | 9/2014 | Erofeev et al. |

(56) References Cited

U.S. PATENT DOCUMENTS

| | | |
|---|---|---|
| 2014/0325217 A1 | 10/2014 | Mori et al. |
| 2015/0117645 A1* | 4/2015 | Carlson ............... H04L 63/0435 380/262 |
| 2015/0139559 A1 | 5/2015 | Smith |
| 2015/0178660 A1 | 6/2015 | Nowak et al. |
| 2015/0381578 A1* | 12/2015 | Thota ...................... G09C 1/00 713/168 |
| 2016/0306751 A1 | 10/2016 | Amarendran et al. |
| 2016/0306984 A1 | 10/2016 | Amarendran et al. |
| 2017/0004320 A1 | 1/2017 | Erofeev et al. |
| 2017/0116433 A1 | 4/2017 | Erofeev et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 1999/012098 | 3/1999 |
| WO | WO 2006/052872 | 5/2006 |

OTHER PUBLICATIONS

Armstead et al., "Implementation of a Campus-Wide Distributed Mass Storage Service: The Dream vs. Reality," IEEE, 1995, pp. 190-199.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Huff, KL, "Data Set Usage Sequence Number," IBM Technical Disclosure Bulletin, vol. 24, No. 5, Oct. 1981 New York, US, pp. 2404-2406.

Jander, "Launching Storage-Area Net," Data Communications, US, McGraw Hill, NY, vol. 27, No. 4(Mar. 21, 1998), pp. 64-72.

Rosenblum et al., "The Design and Implementation of a Log-Structure File System," Operating Systems Review SIGOPS, vol. 25, No. 5, May 1991, New York, US, pp. 1-15.

\* cited by examiner

DATA STORAGE SYSTEMS AND METHODS

INCORPORATION BY REFERENCE TO ANY PRIORITY APPLICATIONS

Any and all applications, if any, for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc. Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

For many users, maintaining the security of electronic data is an ever-increasing concern and is growing ever more expensive. Preventing the leakage of data is of particular importance to enterprise users who often have access to private customer data, including financial information (e.g., social security numbers, credit card data, etc.). The challenges related to maintaining data security has continued to increase as more and more enterprise users utilize mobile devices to store and/or access data within an enterprise environment, and outside of the enterprise environment.

Today, to help protect data and to increase the accessibility of the data both throughout the enterprise environment and outside of the enterprise environment, many users and organizations store data on secondary storage devices or on a device in a network (e.g., cloud storage devices). In many cases, the data is encrypted on the secondary storage device. Although data is more secure when stored in an encrypted form on the secondary storage device, securing the data on the secondary storage device does not prevent malicious users from accessing sensitive data on a primary storage device (e.g., a client computing device).

SUMMARY

For purposes of summarizing the disclosure, certain aspects, advantages and novel features of the inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

Certain embodiments described herein include a method of automatically generating encryption rules using machine learning techniques. In some cases, the method may be performed by computer hardware comprising one or more processors. The method can include accessing, by a rules generation system comprising computer hardware, a set of one or more training files that include content designated as sensitive information. Further, the method can include applying, by the rules generation system, one or more processing algorithms to each training file included in the set of training files to obtain a set of data tokens for each training file. Each of the set of data tokens for a training file may correspond to a portion of the training file. The method may further include applying, by the rules generation system, one or more algorithms to the set of data tokens for each training file to determine a set of encryption rules for identifying files with sensitive information. In addition, the method may include storing the set of encryption rules in an encryption rules repository accessible for one or more systems for determining whether to encrypt a file.

In some embodiments, the one or more processing algorithms comprise natural language processing algorithms. Further, the one or more algorithms may comprise heuristic algorithms. In some implementations, at least one of the one or more processing algorithms comprises a natural language processing algorithm and wherein applying the one or more processing algorithms comprises performing at least one of the following natural language processing tasks: automatic summarization, coreference resolution, discourse analysis, machine translation, morphological segmentation, named entity recognition, natural language understanding, optical character recognition, part-of-speech tagging, parsing, relationship extraction, sentence boundary disambiguation, sentiment analysis, topic segmentation and recognition, word segmentation, word sense disambiguation, singular value decomposition, latent semantic analysis, latent Dirichlet allocation, pachinko allocation, and probabilistic latent semantic analysis.

In certain implementations, applying the one or more algorithms to the set of data tokens comprises generating a prospective encryption rule based on the set of data tokens. Further, the method can include performing the prospective encryption rule with respect to the set of training files and determining a percentage of training files from the set of training files identified for encryption using the prospective encryption rule. Responsive to the percentage of training files identified for encryption satisfying a threshold, the method may include adding the prospective encryption rule to the set of encryption rules.

In some cases, applying the one or more algorithms to the set of data tokens for each training file comprises applying the one or more algorithms on a file-by-file basis, separately to each set of data tokens. Further, applying the one or more algorithms to the set of data tokens for each training file may comprise applying the one or more algorithms to a cumulative set of data tokens formed by combining the sets of data tokens from a plurality of training files.

With some implementations, the method includes presenting the set of encryption rules to a user for confirmation, wherein storing the set of encryption rules comprises storing encryption rules from the set of encryption rules confirmed by the user. Further, the method may include filtering data tokens identified as non-sensitive by a user from the set of data tokens for each training file prior to applying the one or more algorithms.

In some implementations, the method includes monitoring file creation and/or file modification activity. In response to detecting a file creation and/or modification event with respect to a file, the method can include determining whether the file satisfies an encryption rule from the set of encryption rules. Further, in response to determining that the file satisfies the encryption rule from the set of encryption rules, the method can include identifying the file as protected. Moreover, the method may include determining whether the file satisfies a context condition associated with the encryption rule. In response to determining that the context condition is satisfied, the method may include encrypting the file.

In certain embodiments, a system for automatically generating encryption rules using machine learning techniques is disclosed. The system can include a content analyzer comprising computer hardware, the content analyzer configured to access a set of training files that include content designated as sensitive information. Further, the content analyzer may be configured to use one or more processing algorithms with respect to the set of training files to obtain a set of data tokens for each training file. Moreover, the system may include an encryption rules generator comprising computer hardware. The encryption rules generator can be configured to use one or more algorithms to determine a set of encryption rules based on the set of data tokens obtained for each training file.

In some implementations, the system further includes an encryption rules repository configured to store the set of encryption rules. The encryption rules repository may be accessible by one or more computing systems.

In some cases, the encryption rules generator is further configured to determine a context condition for an encryption rule of the set of encryption rules. The context condition may identify when to apply the encryption rule to a file. In addition, the encryption rules generator may be configured to associate the context condition with the encryption rule. In some cases, the context condition comprises at least one of a user, a department that includes the user within an entity, a geographic location of a computing device storing the file, a network location of a computing device storing the file, and a device type of the computing device.

With some implementations, the encryption rules generator is further configured to generate a prospective encryption rule based on an aggregated set of data tokens. The aggregated set of data tokens may be based on the set of data tokens for each training file. Further, the encryption rules generator may be further configured to perform the prospective encryption rule using the set of training files and determine a number of training files from the set of training files identified for encryption based on the prospective encryption rule. Responsive to the number of training files identified for encryption satisfying a threshold, the encryption rules generator can add the prospective encryption rule to the set of encryption rules.

In some embodiments, the encryption rules generator is configured to determine an encryption rule based on the set of data tokens obtained for a plurality of training files. Further, the encryption rules generator may be further configured to present a prospective encryption rule to a user and receive an input from the user responsive to presenting the prospective encryption rule to the user. In addition, the encryption rules generator may be further configured to determine whether to include the prospective encryption rule in the set of encryption rules based on the input received from the user.

In some implementations, the content analyzer is further configured to remove a data token from a set of data tokens of a training file based on an identified set of non-sensitive data tokens. Further, the system may include a file monitor configured to monitor creation of a file. In addition, the system may include an encryption rules engine configured to determine whether the file satisfies an encryption rule from the set of encryption rules. Moreover, the system may include an encryption module configured to encrypt the file in response to the file satisfying the encryption rule.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Figure 1A:
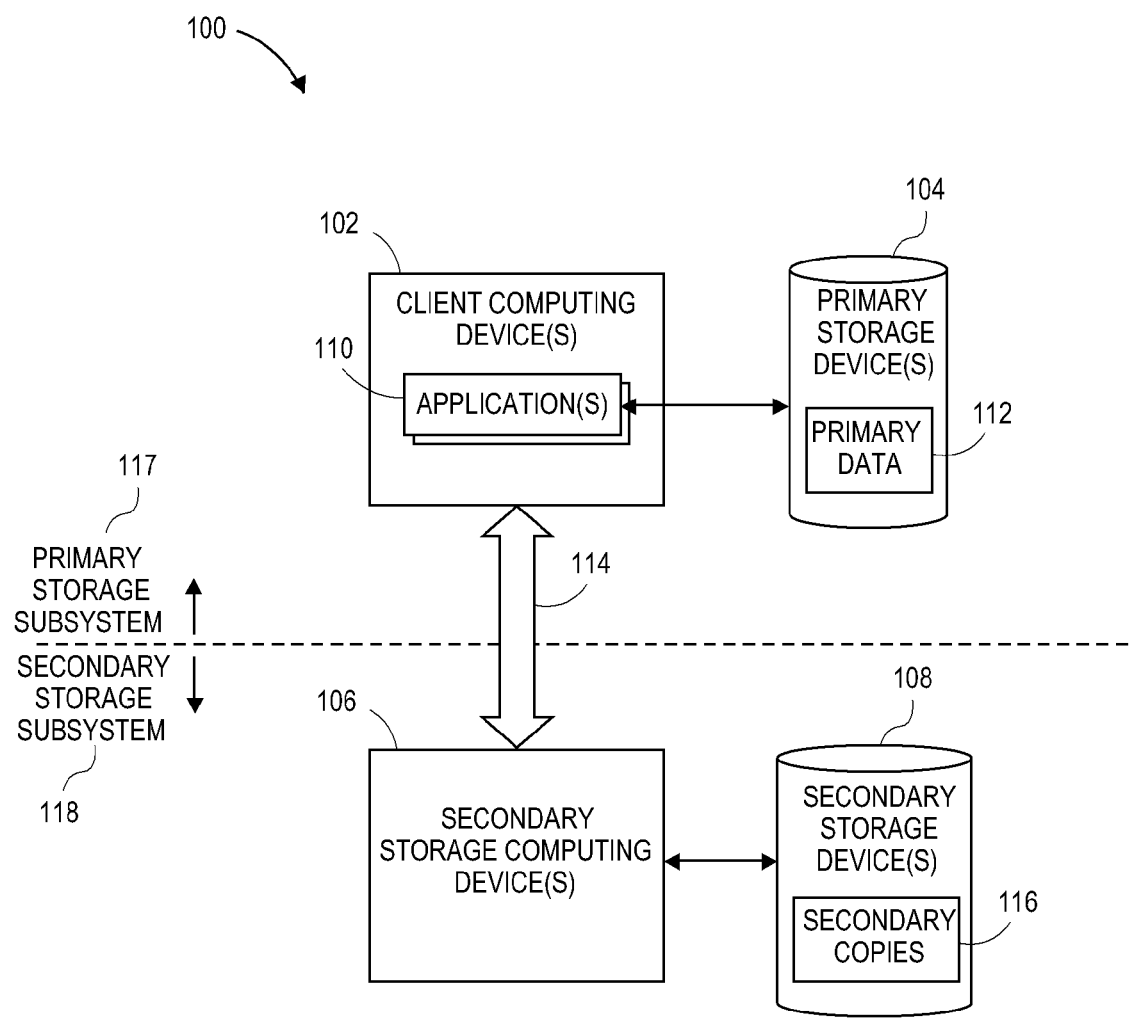
FIG. 1A is a block diagram illustrating an exemplary information management system.

To help prevent sensitive data from being exposed, files are often stored in an encrypted format. However, encrypting files can be a costly process. It often takes a non-negligible amount of time and processing power to encrypt a file. Moreover, even if the amount of resources required to encrypt a given individual file is relatively small, the cumulative resources required to encrypt a large number of files is non-negligible. Further, the initial encryption of a file is usually not the final interaction with the file. Instead, the file may be accessed a number of times. Each time the file is accessed, the file needs to be decrypted and when the access is complete, the file may be re-encrypted. Thus, the amount of time and computing resources utilized to protect a set of files can grow over time, particularly as an organization or entity generates more and more files with sensitive data that the entity desires to store in an encrypted format.

Some entities attempt to protect their data by encrypting all files of a particular type (e.g., word processing files, or spreadsheets). However, using this approach, a large number of files that do not include sensitive information may also be encrypted in some cases, resulting in a large waste of computing resources and time. Other entities may be encrypted based on the particular file locations the file is stored to. However, this approach may in some cases create user overhead because users must determine if a file includes sensitive information and must remember to store the file in one of the encryption designated locations.

To reduce the overhead relating to the encryption and access of encrypted files, entities and/or users may be selective in deciding which files are to be encrypted. Users may identify each file to be encrypted, or may identify a location (e.g., a directory) of files to be encrypted. While this approach of designating files for encryption may be effective for some entities (e.g., small businesses or individuals), it may be less effective for other entities, such as entities with a relatively large number of users that may access and edit a file. Having a large number of users edit or create files can make it more difficult to systematically identify the files that are to be encrypted because, for example, different users may have different concepts of what data is to be protected or one user may add sensitive data to a file that another user understood to not include sensitive data.

One solution to the above issues is to make a determination of whether to encrypt a file based on the content of the file itself rather than, for example, the file type or file location. Embodiments disclosed herein include one or more systems and methods that are capable of analyzing the content of files to determine whether the files include sensitive information or data. Sensitive information can include any data that is deemed by an entity to be stored in an encrypted format. The entity may include the owner or creator of the data, or some other party (e.g., a customer, an oversight entity, a government entity, etc.). Some non-limiting examples of sensitive data include social security numbers, credit card numbers, addresses, phone numbers, invoices, customer lists, design specifications, business plans, and the like. It should be understood that sensitive data may differ from one entity to the next. For example, customer lists may be considered sensitive information to one entity, but not to another entity. Thus, different entities may desire to encrypt different types of files and/or files including different types of content.

Certain embodiments disclosed herein use one or more algorithms for determining whether a file includes sensitive information. In some cases, the algorithms can include natural language processing algorithms. Advantageously, in certain embodiments, the determination of whether a file includes sensitive information can be performed automatically by applying encryption rules to a file to determine whether the file satisfies the encryption rule. The encryption rule can include rules for identifying files that include sensitive information. Further, the encryption rule can include processes for encrypting files that are identified to include sensitive information.

In some embodiments, the encryption rules are also generated automatically. Systems disclosed herein can access a set of files (e.g., training files) that are known to include sensitive information and use a number of algorithms to generate one or more encryption rules for determining whether a file includes sensitive information. In some cases, the number of algorithms can include heuristic algorithms. Further, the systems described herein can use machine learning processes to improve the encryption rules over time. In some cases, the systems disclosed herein may also access a set of files that are known to not include sensitive information. By combining files with sensitive information and files without sensitive information, improved encryption rules can be generated compared to encryption rules generated based only on training files with sensitive information.

Examples of systems and methods for providing improved file protection and encryption are described in further detail herein with reference to FIGS. 2-17. Further, the systems, components, and functionality described with respect to FIGS. 2-17 may be configured and/or incorporated into information management systems such as those described herein with respect to FIGS. 1A-1H.

Advantageously, in certain embodiments, by determining whether to encrypt a file based on the content of the file, information management systems can protect and encrypt files faster than systems that encrypt all files, all files of a particular type, or all files in a particular location because, for example, files without sensitive information that are of the same type or in the same location as files with sensitive information can be omitted from the encryption process. Further, in certain embodiments, users can save time by avoiding identifying files for encryption and/or avoid segregating protected files from unprotected files.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

'Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,229,954, entitled "Managing Copies Of Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";
- U.S. Pat. Pub. No. 2006/0224846, entitled "System and Method to Support Single Instance Storage Operations";
- U.S. Pat. Pub. No. 2009/0319534, entitled "Application-Aware and Remote Single Instance Data Management";
- U.S. Pat. Pub. No. 2012/0150818, entitled "Client-Side Repository in a Networked Deduplicated Storage System"; and
- U.S. Pat. Pub. No. 2012/0150826, entitled "Distributed Deduplicated Storage System".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
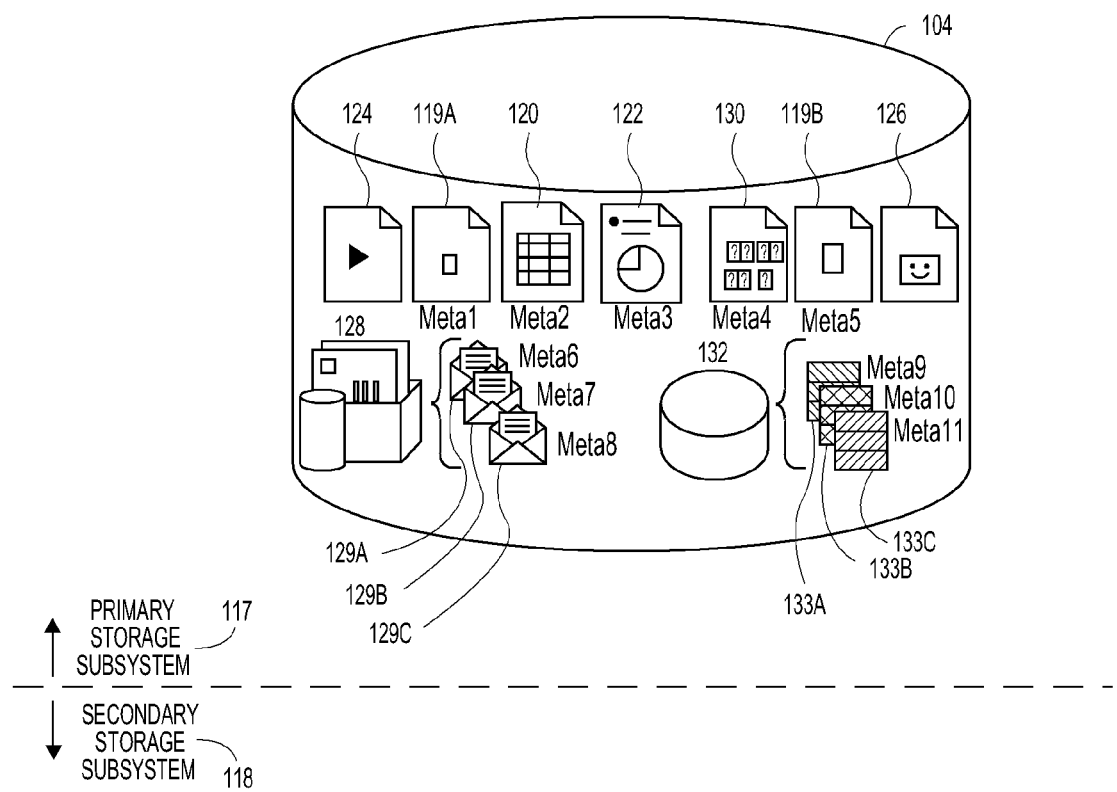
FIG. 1B is a detailed view of a primary storage device, a secondary storage device, and some examples of primary data and secondary copy data.
Figure 1B:
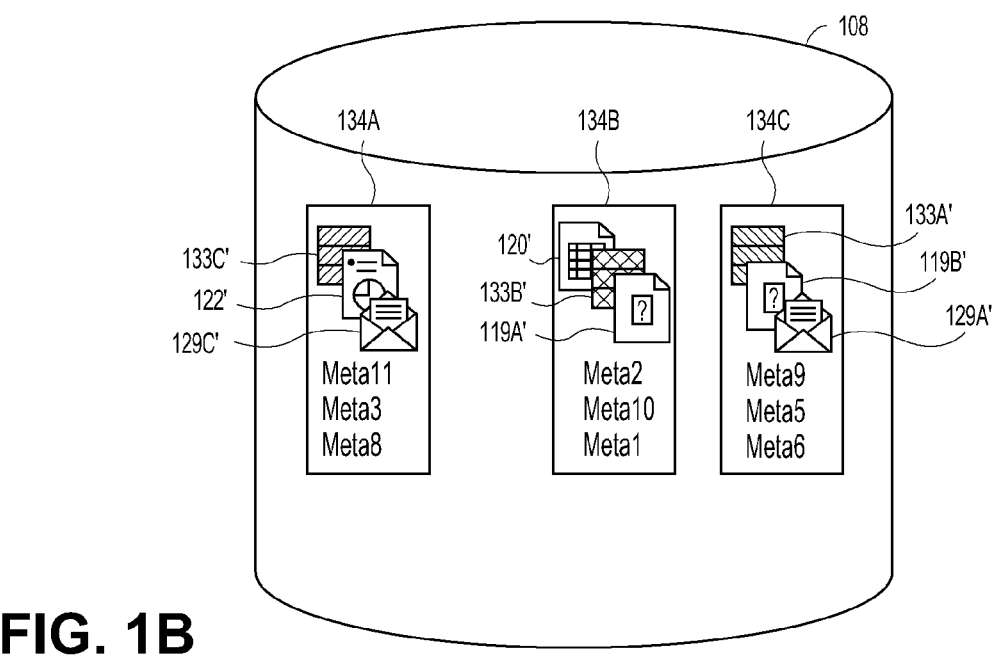

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
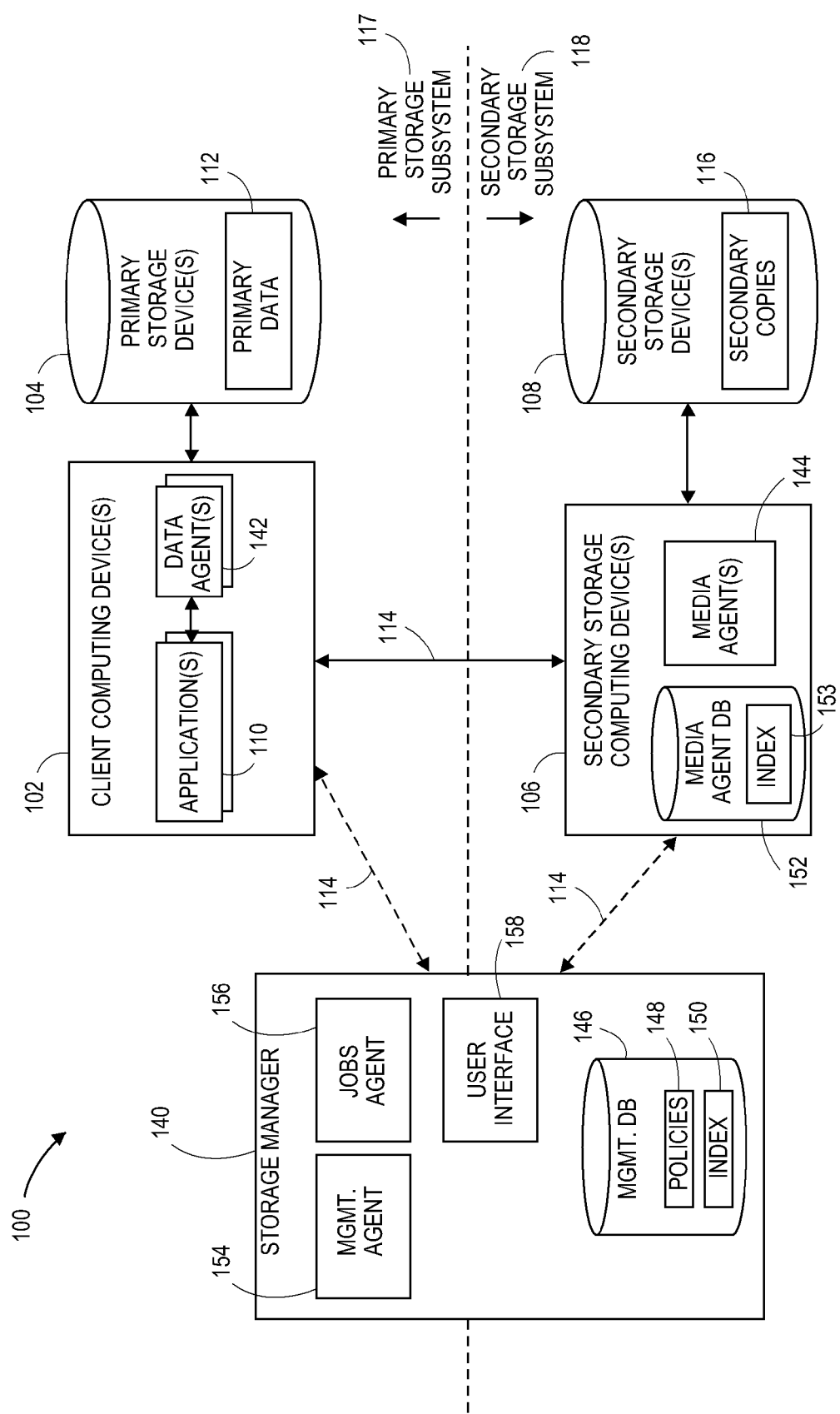
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
  initiating execution of secondary copy operations;
  managing secondary storage devices 108 and inventory/capacity of the same;
  reporting, searching, and/or classification of data in the information management system 100;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
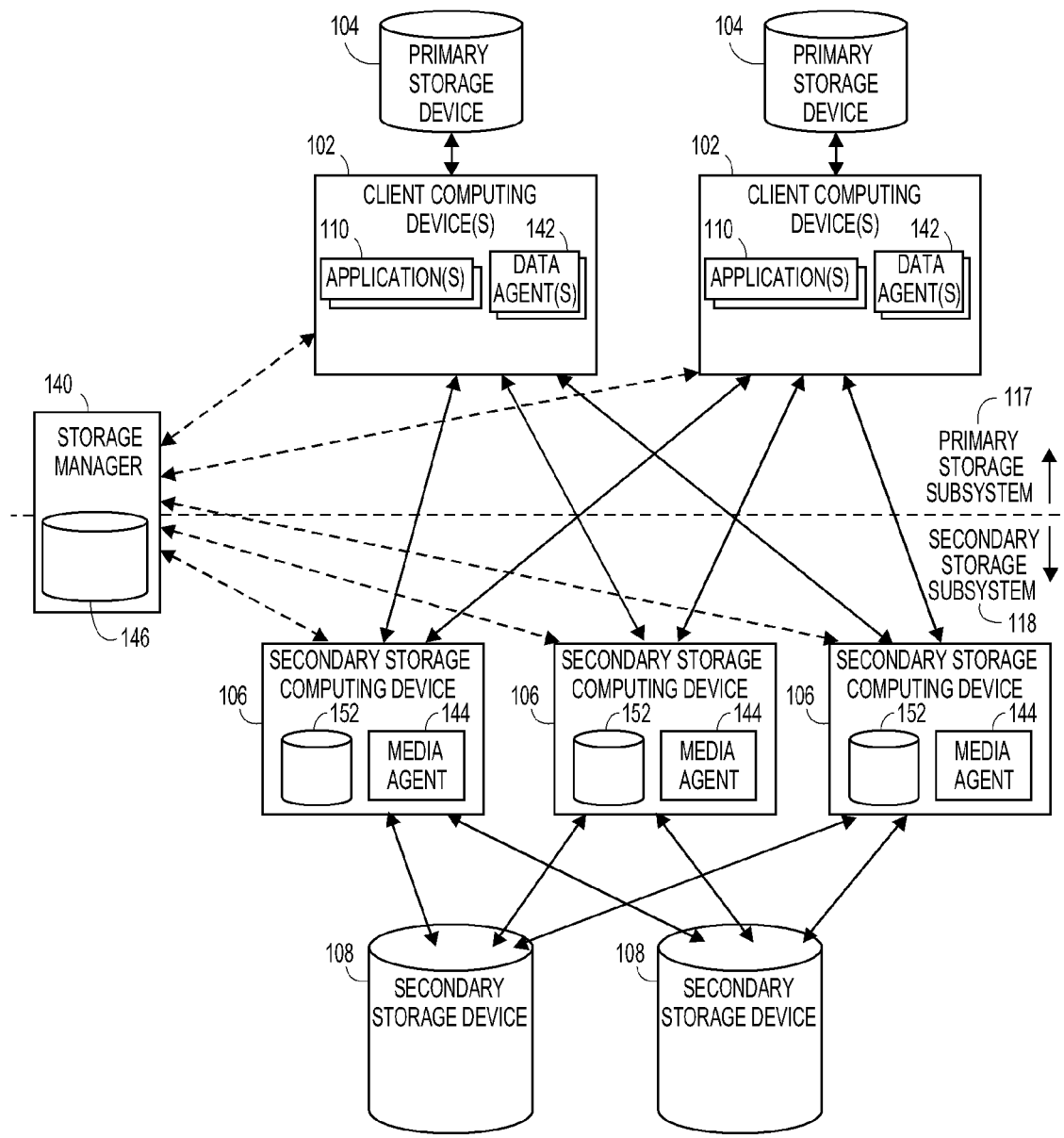
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/ phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343, 453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of copy 116 (e.g., type of secondary copy) and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
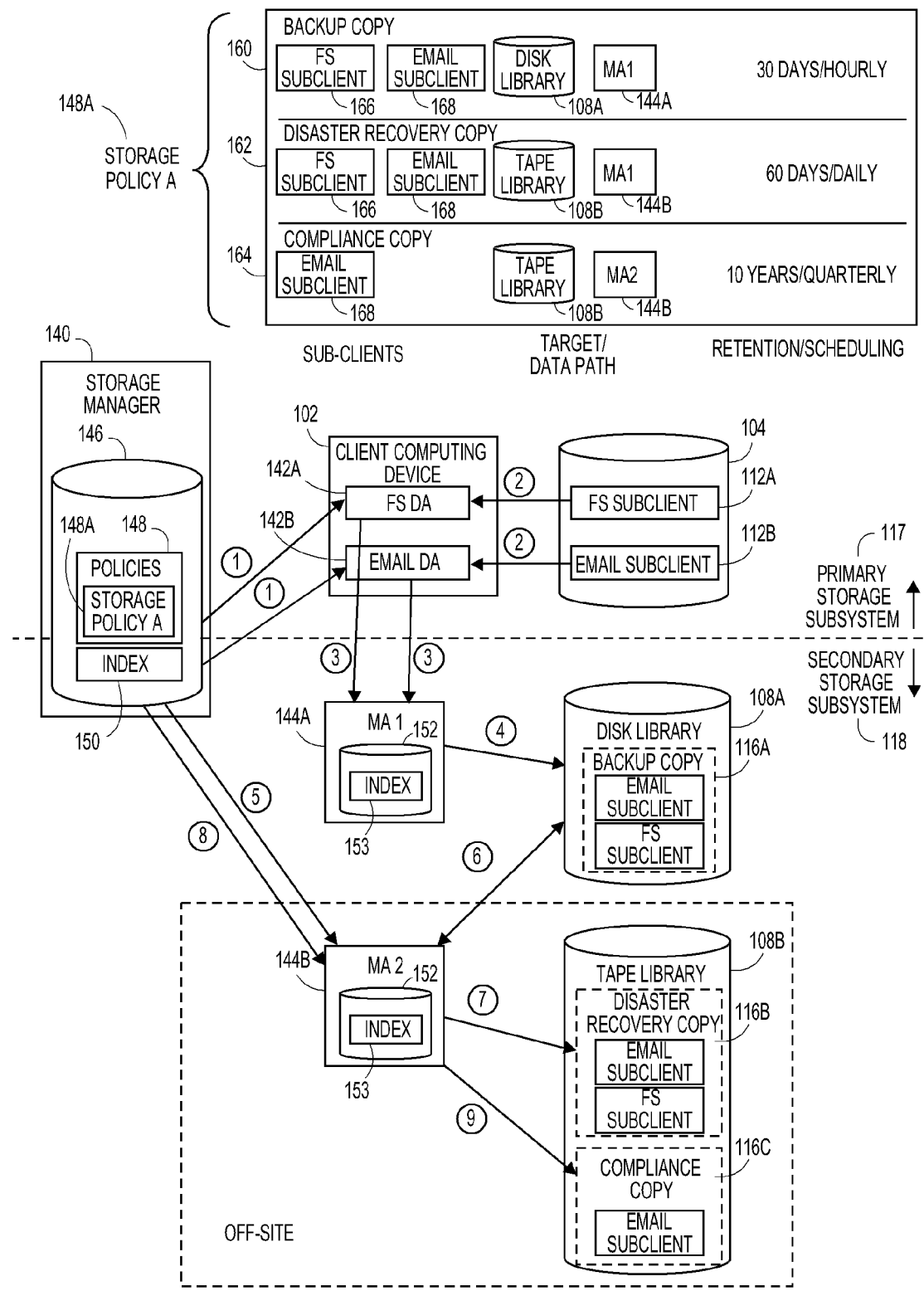
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
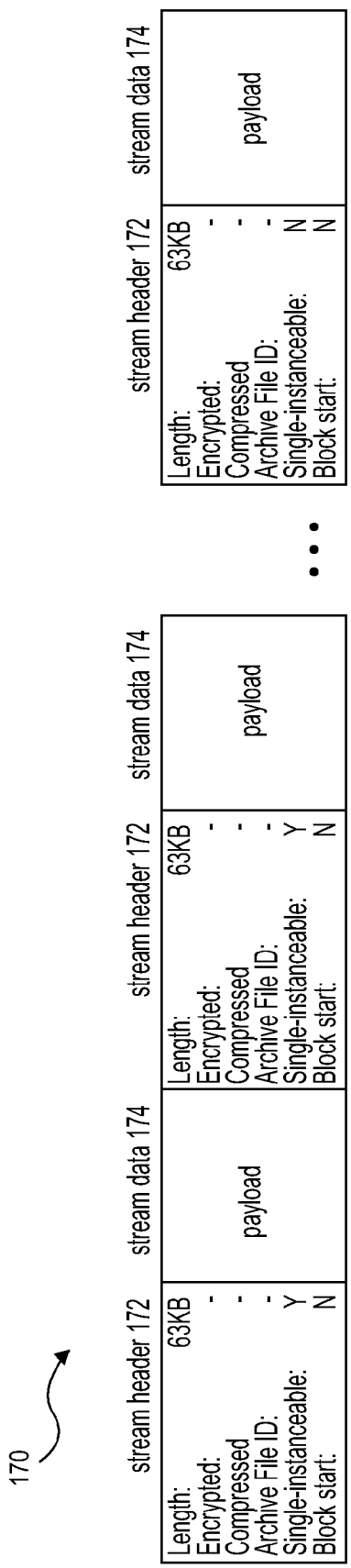
FIGS. 1F-1H are block diagrams illustrating suitable data structures that may be employed by the information management system.
Figure 1G:
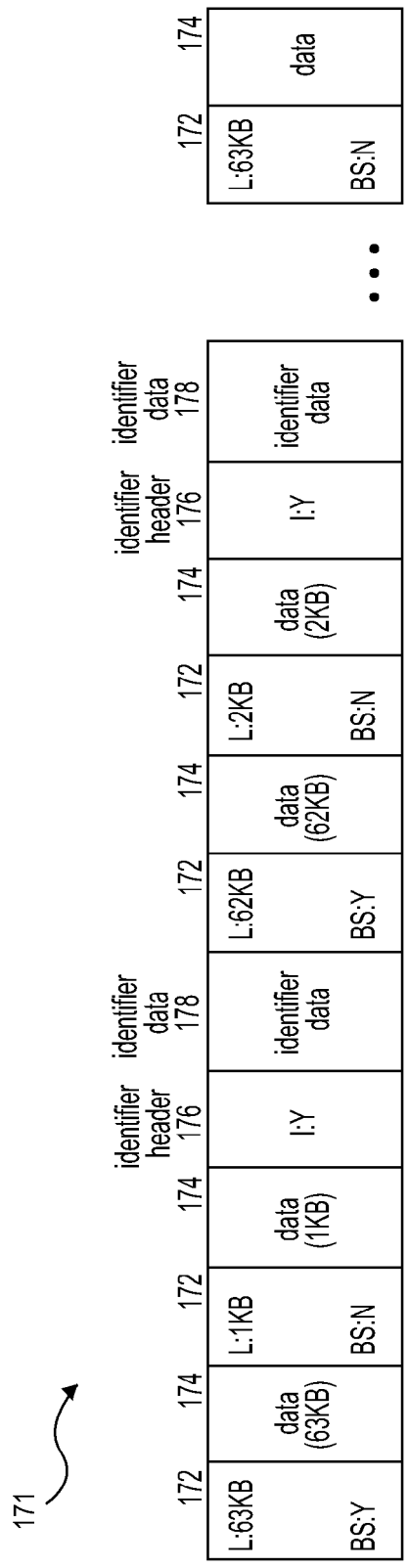

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
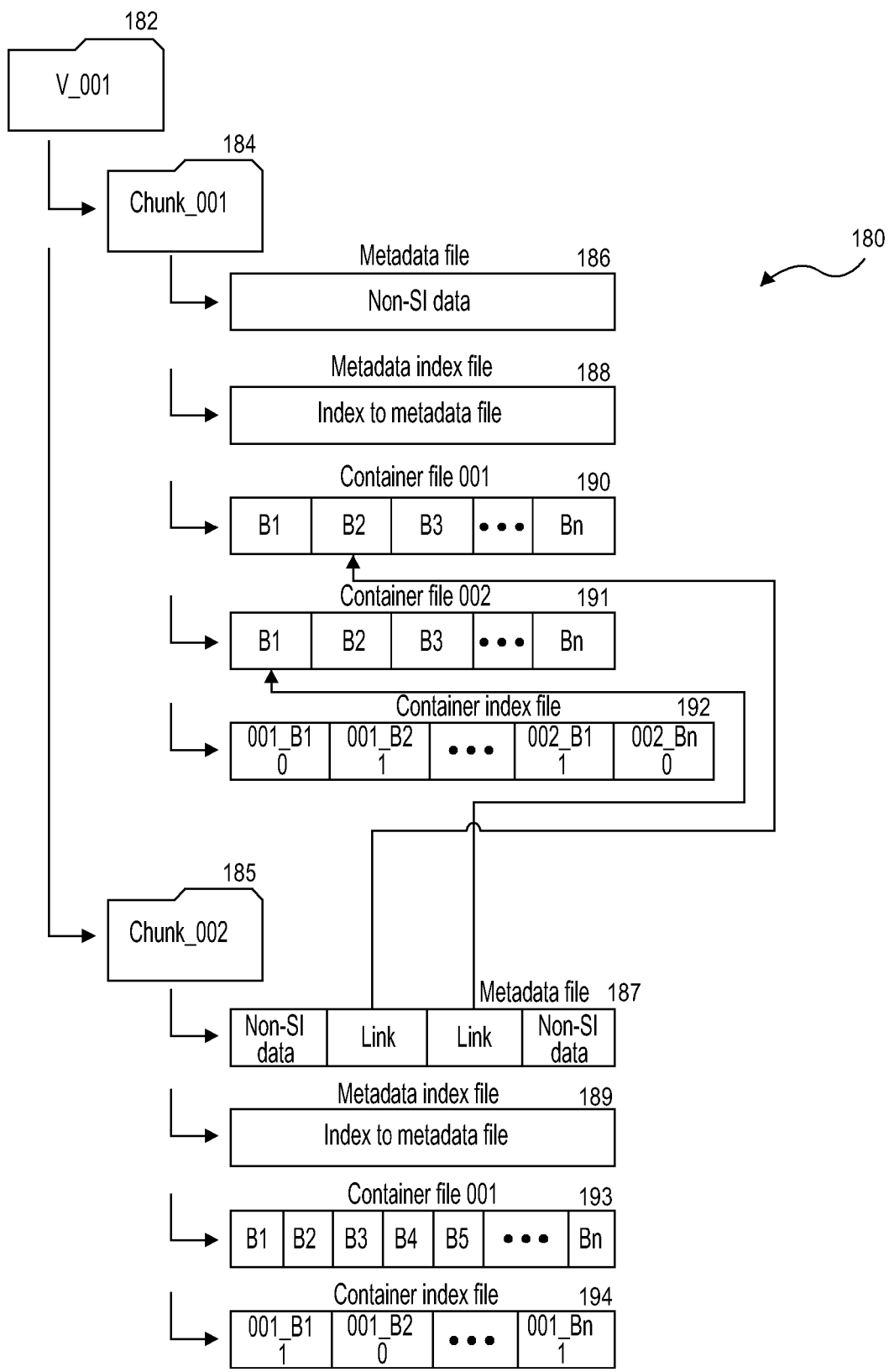

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Example Client Computing Environment

Figure 2:
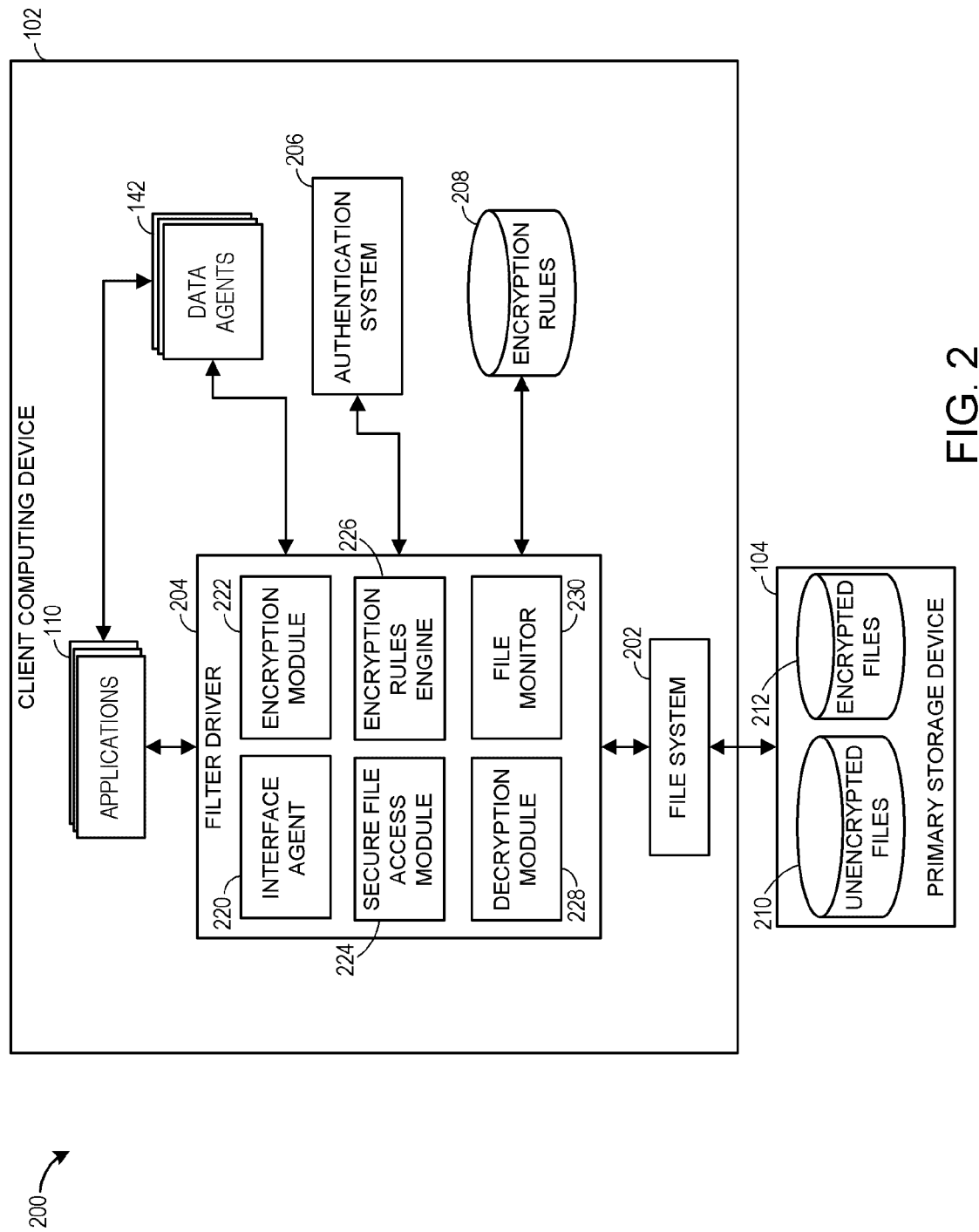
FIG. 2 is a block diagram illustrating an example of a client computing environment including a client computing device and a primary storage device.

FIG. 2 is a block diagram illustrating an example of a client computing environment 200 including a client computing device 102 and a primary storage device 104. As previously described, for example with respect to FIG. 1C, the client computing device 102 may include one or more applications 110 and one or more data agents 142. At least some of the data agents 142 may correspond to one or more of the applications 110 and, as previously described, may facilitate data operations with respect to the corresponding application(s). Further, one or more of the data agents 142 may facilitate managing and/or interacting with a file system 202 of the client computing device 102. This file system 202 may include any type of file system that can be used by a client computing device 102. For example, the file system 202 may include a Microsoft Windows file system (e.g., FAT, NTFS, etc.), a Linux based file system, a Unix based file system, an Apple Macintosh file system (e.g., HFS Plus), and the like. In some instances, the client computing device 102 may include multiple file systems 202 of the same type or of a different type.

In addition to the previously described systems, the client computing device 102 may include a filter driver 204 that can interact with data (e.g., production data) associated with the applications 110. For instance, the filter driver 204 may comprise a file system filter driver, an operating system driver, a filtering program, a data trapping program, an application, a module of one or more of the applications 110, an application programming interface ("API"), or other like software module or process that, among other things, monitors and/or intercepts particular application requests targeted at a file system, another file system filter driver, a network attached storage ("NAS"), a storage area network ("SAN"), mass storage and/or other memory or raw data. In some embodiments, the filter driver 204 may reside in the I/O stack of an application 110 and may intercept, analyze and/or copy certain data traveling to or from the application 110 from or to a file system.

In certain embodiments, the filter driver 204 may intercept data modification operations that include changes, updates and new information (e.g., data writes) with respect to the application(s) 110 of interest. For example, the filter driver 204 may locate, monitor and/or process one or more of the following with respect to a particular application 110, application type, or group of applications: data management operations (e.g., data write operations, file attribute modifications), logs or journals (e.g., NTFS change journal), configuration files, file settings, control files, other files used by the application 110, combinations of the same or the like. In certain embodiments, such data may also be gathered from files across multiple storage systems within the client computing device 102. Furthermore, the filter driver 204 may be configured to monitor changes to particular files, such as files identified as being associated with data of the applications 110.

In certain embodiments, multiple filter drivers 204 may be deployed on a computing system, each filter driver being dedicated to data of a particular application 110. In such embodiments, not all information associated with the client computing system 102 may be captured by the filter drivers 204 and thus, the impact on system performance may be reduced. In other embodiments, the filter driver 204 may be suitable for use with multiple application types and/or may be adaptable or configurable for use with multiple applications 110. For example, one or more instances of customized or particularizing filtering programs may be instantiated based on application specifics or other needs or preferences.

The filter driver 204 may include a number of modules or subsystems that can facilitate performing various operations with respect to the applications 110 and/or file system 202. For example, the filter driver 204 may include a number of modules or subsystems to facilitate encrypting data and/or files. As a second example, the filter driver 204 may include modules or subsystems to facilitate presenting encrypted files to an authorized user. In certain embodiments, the modules or subsystems of the filter driver 204 can include one or more of the following: an interface agent 220, an encryption module 222, a secure file access module 224, an encryption rules engine 226, a decryption module 228, and a file monitor 230.

Using the file monitor 230, the filter driver 204 can monitor a user's interaction with a file. This interaction can include accessing the file via the file system 202, one or more applications 110, one or more data agents 142, or through any other method of accessing or interacting with a file. In some cases, the file monitor 230 may be configured to identify when a file is modified and/or created. Monitoring the creation of a file can include identifying a "new" file operation, a "save as" operation, a "copy" operation, or any other operation that can result in a new file or a new copy of an existing file.

The encryption rules engine 226 can include any system configured to determine whether a file is to be encrypted. Generally, the file monitor 230 is configured to trigger the encryption rules engine 226 determining whether a file is to be encrypted. For example, the encryption rules engine 226 may determine whether to encrypt a file in response to the file monitor 230 detecting a write access to the file, or a file creation operation (e.g., a "new" operation, a "save as" operation, etc.) that results in the creation of the file. Alternatively, the encryption rules engine 226 may determine whether a file is to be encrypted each time the file is accessed regardless of the type of file access. In other cases, the encryption rules engine 226 may determine whether a file should be encrypted in response to a command received from another system, such as a data agent 142 or the storage manager 140.

Determining whether to encrypt a file can be based on a set of encryption rules. In some instances, these encryption rules may be included with the encryption rules engine 226. Alternatively, or in addition, the encryption rules may be stored at an encryption rules repository 208 that is accessible by the filter driver 204 and/or the encryption rules engine 226 of the filter driver 204. The encryption rules can include any rule for determining whether a file is to be encrypted. These encryption rules may be based on one or more users and/or pieces of metadata associated with the file.

For example, an encryption rule may be based on one or more of the following: the author of a file, the owner of a file, the editor of a file, the type of file, the location of the file, the name of the file, the age of the file, a tag associated with the file, whether the file and/or a version of the file was previously encrypted, keywords associated with the file name and/or the contents of the file, and the like. Unless stated otherwise, the phrase "a version of the file" as used herein generally refers to the file and/or a copy of the file that includes different content than the file currently being evaluated (e.g., an older copy of the file, a pre-edited version of a file, etc.).

In some cases, the characteristics of a file used to determine whether to encrypt a file may be weighted. For example, the type of the file may be weighted such that it has a greater affect in determining whether to encrypt a file than the author of the file.

Once the encryption rules engine 226 determines that a file should be encrypted, the encryption module 222 can encrypt the file using an encryption algorithm. In some cases, the encryption algorithm may be specified as part of an encryption rule. Once the file has been encrypted, the encryption module 222 may delete any unencrypted copies of the file located on the client computing device 102 and/or the primary storage device 104. Further, in some cases, the encryption module 222 may cause a cached copy of the file to be locked or inaccessible to prevent access to unencrypted copies or fragments of a file that has been identified for encryption by the encryption rules engine 226.

As stated above, the filter driver 204 may include an interface agent 220. The interface agent 220 may be configured to control how files, or references to files (e.g., file names, file icons, etc.), are displayed to a user. In some cases, the interface agent 220 can control how files are displayed in a variety of display locations, such as in a window, in a listing of files, on a desktop display, in an application window or viewer, etc.

Further, in some cases, the interface agent 220 may be configured to present encrypted files as if the files were unencrypted. Further, the interface agent 220 may be configured to present files differently based on the user accessing the client computing device 102 as determined by a user identifier and/or authentication information obtained via an authentication system 206. For example, an administrator may see the encryption status of a file via an annotation on an icon or a special file extension. However, the interface agent 220 may cause all files to appear as unencrypted files to a non-administrator user. Further, the interface agent 220 may cause at least some encrypted files to be hidden from view altogether for a user who does not have authorization to decrypt the hidden encrypted files.

When a user and/or application 110 attempts to access a file, the secure file access module 224 can determine whether the file is an encrypted file based on, for example, the file name. If the file is not encrypted, the file access operation is provided to the file system 202 for processing. If the file is encrypted, the secure file access module 224 can determine whether to decrypt the file based on, for example, authentication information associated with the user.

Generally, the secure file access module 224 can access the authentication information that the authentication system 206 obtained when the user logged in to the client computing device 102. Advantageously, in certain embodiments, by using the authentication information provided at login, the request to access a file can be processed without the user being prompted with a request for authentication at the time the file is accessed. Thus, in some cases, the file access request may be processed without the user being made aware of the encryption status of the file.

In cases where the secure file access module 224 determines that a file is encrypted and that a user and/or application 110 is authorized to access the file, the secure file access module 224 can provide the encrypted file to a decryption module 228. The decryption module 228 can decrypt the file and provide the file to the application 110 for use or presentation to a user. In some cases, as will be described in more detail below, the decryption module 228 can determine the type of encryption used to encrypt the file and select a corresponding decryption algorithm to decrypt the file. Further, in cases where an asymmetric key was used to encrypt the file, the decryption module 228 can identify a public key corresponding to the private key used to encrypt the file. The decryption module 228 can then use the public key to decrypt the file.

As indicated above, the primary storage device 104 can store the unencrypted files. Further, the primary storage device 104 can also store encrypted files, which may be encrypted by the encryption module 222 or otherwise. As illustrated in FIG. 2, the primary storage device 104 can include an unencrypted files repository 210 configured to store unencrypted files and an encrypted files repository 212 configured to store encrypted files.

Although encrypted files and unencrypted files may be stored in different repositories of the primary storage device 104, the encrypted and unencrypted files may be presented to a user without differentiating between the encryption status of the files and the storage location of the file in the primary storage device 104. Alternatively, the encrypted files may be presented to a user in a separate location of a file storage display and/or with an indication of the encryption status of the file. Further, in some cases, the primary storage device 104 may be divided into a fewer or greater number of repositories, which may or may not be divided based on the encryption status of files stored by the primary storage device 104.

Generally, although not necessarily, a client computing device 102 includes an authentication system 206. This authentication system 206 can be configured to authenticate a user attempting to use the client computing device 102 and/or attempting to access files stored on the primary storage device 104. Further, in some cases, the authentication system 206 can provide authentication information to the secure file access module 224 to facilitate determining whether a user is authorized to access an encrypted file. In certain embodiments, the authentication system 206 may obtain additional authentication information from a user when the user attempts to access an encrypted file. This information can then be provided to the secure file access module 224. In other embodiments, the authentication system 206 provides previously obtained authentication information to the secure access module 224 and does not prompt a user for additional information when the user attempts to access an encrypted file.

Example of an Encryption Determination Process

Figure 3:
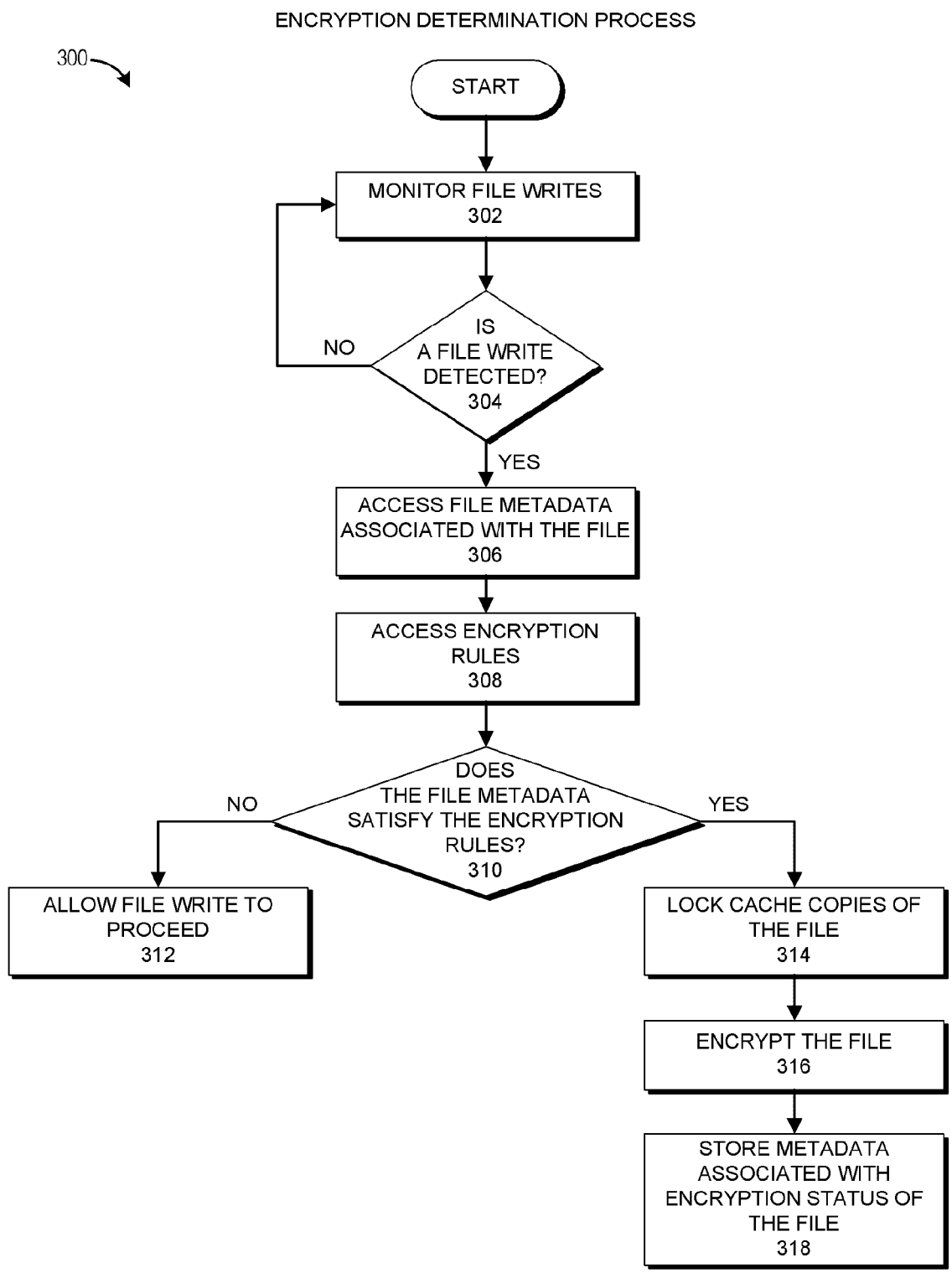
FIG. 3 illustrates an example embodiment of an encryption determination process.

FIG. 3 illustrates an example embodiment of an encryption determination process 300. The process 300 can be implemented, at least in part, by any system that can detect when a file is created or modified and can determine whether to encrypt the file based on a set of encryption rules. For example, the process 300, in whole or in part, can be implemented by the filter driver 204, the file monitor 230, the encryption rules engine 226, and the encryption module 222, to name a few. Although any number of systems, in whole or in part, can implement the process 300, to simplify discussion, portions of the process 300 will be described with reference to particular systems.

The process 300 begins at block 302 where, for example, the file monitor 230 monitors file access operations to detect file write operations. Typically, the file monitor 230 is monitoring file access operations for files stored at the primary storage device 104. However, in some cases, the file monitor 230 may monitor file access operations for files stored elsewhere, such as on a portable storage device (e.g., a USB key, an external disk drive, etc.). In some cases, the file write operations can include write commands, file create commands, file copy commands, or any commands or operations that can result in a file being modified or created, or that indicate that a file is being modified or created. For example, the file monitor 230 may detect a "New" command, a "Save" command, a "Save As" command, a "Copy" command, or any operations related to such commands. At decision block 304, the file monitor 230 determines whether a file write, or file creation, operation is detected with respect to a file. If not, the file monitor 230 continues to monitor operations at the block 302.

Generally, the operations monitored are commands received from the applications 110 and/or the data agents 142. However, in some cases, the file monitor 230 can monitor commands or operations received from any source that can access a file. For example, in some cases, commands may be received from a processor or an application-specific processor (not shown) that is included as part of the client computing device 110. As a second example, commands may be received from the storage manager 140 or a media agent 144.

At block 306, the encryption rules engine 226 accesses metadata, or file metadata, associated with the file. Alternatively, the file monitor 230 may access the metadata. In some cases, some of the metadata may be accessed and/or determined by the file monitor 230 and some of the metadata may be accessed and/or determined by the encryption rules engine 226. The metadata can include any type of data associated with the file, including data associated with users associated with the file. Further, the metadata can include any type of data related to the file that can be the basis, at least in part, of an encryption rule for determining whether to encrypt the file.

For example, the metadata can include: the name of the file, the file type of the file (e.g., a word processing file, a spreadsheet, a PDF file, a CAD file, an audio file, a video file, etc.), an author of the file, users who have authorization to access the file, one or more applications capable of reading or accessing the file (e.g., Microsoft Word, Microsoft Excel, Adobe Acrobat, Corel WinDVD, etc.), the location of the file within a file organization structure, the time the file was created, the time the file was last modified and/or accessed, the size of the file, and the like. In some cases, the metadata can include a designation and/or tag associated with the file. For example, an encryption determination may be made based on whether a user or application designated a file or set of files for encryption, either through explicit designation or by inclusion in a location (e.g., a directory) that has been designated for encryption. As a second example, files that are designated for backup or for backup to a particular location or media may be designated for encryption.

The encryption rules engine 226 accesses one or more encryption rules at block 308 for determining whether to encrypt the file associated with the file write detected at the decision block 304. In some cases, the encryption rules are accessed from the encryption rules repository 208. In other cases, the encryption rules are included as part of the filter driver 204. Whether included with the filter driver, or stored at the encryption rules repository 208, the encryption rules may be provided by the storage manager 140, a user (e.g., an administrator), a provider of the filter driver 204, or any other user or entity that can provide encryption rules.

As described above, the encryption rules can include any rule for determining whether a file is to be encrypted. Typically, the encryption rules are based on the metadata associated with the file that the encryption rules engine 226 is analyzing to make an encryption determination. However, in some cases, the encryption rules may be based on alternative or additional factors, such as a user associated with the client computing device 102, the role of the client computing device 102, a geographic and/or network location of the client computing device 102, and the like.

At decision block 310, the encryption rules engine 226 determines whether the file metadata, or at least a subset of the metadata, satisfies one or more of the encryption rules. In some cases, decision block 310 includes determining whether the alternative or additional factors described above satisfy one or more of the encryption rules. If the file metadata does not satisfy any of the encryption rules, the file write, and/or file creation, operation is allowed to proceed at block 312. In other words, the operation may be performed as if the filter driver 204 were not present or as if the blocks 302-310 were not performed. In some cases, the block 312 may include storing an unencrypted version of a previously encrypted file if the file previously satisfied an encryption rule, but no longer satisfies an encryption rule. In certain embodiments, the block 312 can include informing a user that an encryption rule is not satisfied and may present the user with an option to encrypt the file despite the file not satisfying one of the encryption rules.

If the encryption rules engine 226 determines that the file metadata does satisfy at least one of the encryption rules as the decision block 310, the filter driver 204 locks one or more cache copies of the file at block 314. Advantageously, in some embodiments, by locking cache copies of the file, users and/or applications are unable to access unencrypted versions or copies of the file. In some embodiments, the block 314 is optional.

At block 316, the encryption module 222 encrypts the file. In some cases, the encryption module 222 uses the same encryption algorithm to encrypt the file regardless of the encryption rule satisfied by the metadata and/or the file to be encrypted. In other cases, the encryption module 222 selects an encryption algorithm based on the encryption rule satisfied and/or the file to be encrypted. If multiple encryption rules are satisfied, the encryption module 222 may select the encryption algorithm based on a preference, weighting, ranking, or other factor associated with the satisfied encryption rules. In some embodiments, the block 316 includes deleting or rendering inaccessible unencrypted versions or copies of the file.

In some cases, the block 316 can include modifying an extension of the file or appending an addition extension to the file to indicate the encryption status of the file. For example, the encryption module 222 may change a file extension to .CVX to indicate the file is encrypted. Thus, in some cases, an encrypted PDF file X may be renamed from X.pdf to X.cvx. Alternatively, the encryption module 222 may append an encryption extension (e.g., .CVX) indicating the encryption status of the file after the file's unencrypted extension. Thus, in some cases, an encrypted PDF file Y may be renamed from Y.pdf to Y.pdf.cvx. The encrypted file may be stored at the location indicated by the command detected at the decision block 304. Alternatively, the encrypted file may be stored at an alternate location. This alternative location may be designated for encrypted files and/or may be designated by the encryption rule satisfied by the file.

The encryption module 222 stores metadata associated with the encryption status of the file at block 318. The metadata may be stored with the encrypted file or at another location. For example, the metadata may be stored at the primary storage device 104, with the file or in another location, and/or the metadata may be stored at the storage manager 140. The metadata can include information related to the encryption of the file. For example, the metadata can include the encryption status of the file, an identification of the encryption rule satisfied, an identification of the encryption algorithm used to encrypt the file, and the like. In some embodiments, the block 318 is optional.

Example of an Encrypted File Display Process

Figure 4:
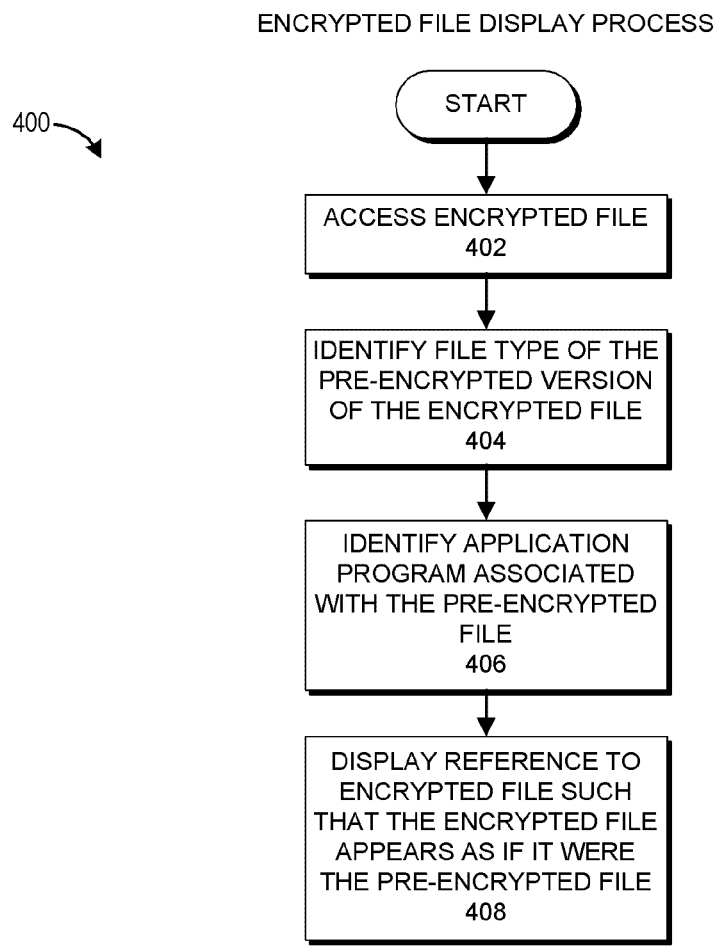
FIG. 4 illustrates an example embodiment of an encrypted file display process.

FIG. 4 illustrates an example embodiment of an encrypted file display process 400. The process 400 can be implemented, at least in part, by any system that can cause a reference or link to a file to be presented to a user. Further, the process 400 can be implemented by any system that can cause the reference or link to the file to be presented as a reference or link to an unencrypted file regardless of the encryption status of the file. For example, the process 400, in whole or in part, can be implemented by the filter driver 204, the interface agent 220, and the secure file access module 224, to name a few. Although any number of systems, in whole or in part, can implement the process 400, to simplify discussion, portions of the process 400 will be described with reference to particular systems.

The process 400 begins at block 402 where, for example, the interface agent 220 accesses an encrypted file. In some cases, the interface agent 220 may receive the encrypted file from the file system 202, an application 110, the primary storage device 104, a cache (not shown), a processor (not shown), or any other source that can provide the encrypted file to the interface agent 220. Alternatively, the interface agent 220 may scan a storage location (e.g., the primary storage device 104) to identify encrypted files at the block 402. In some embodiments, the process 400 may occur as part of an encryption process, such as the process 300. In such embodiments, the process 400, in whole or in part, may occur as part of the block 316 or subsequent to the block 316.

At block 404, the interface agent 220 identifies the file type of a pre-encrypted version or copy of the encrypted file. In other words, the interface agent 220 identifies the file type of the file (e.g., PDF file, spreadsheet file, word processing file, video file, audio file, image file, etc.) before the file was encrypted. The interface agent 220 may determine the file type based on a reference to the file. This reference generally refers to what is displayed to the user to identify the file or the existence of the file to the user. For example, the reference can include the name of the file, a file extension of the file, a link to the file, or an image or icon associated with the file, to name a few. Generally, but not necessarily, the file extension of the encrypted file differs from the file extension of the unencrypted file. Further, in some cases, the interface agent 220 may identify the file type based on metadata associated with the pre-encrypted file and/or the encrypted file.

The interface agent 220 identifies one or more application programs associated with the pre-encrypted version of the file at block 406. By identifying the application programs associated with the pre-encrypted version of the file, the interface agent 220 can, in some cases, cause the encrypted file to be associated with the same application programs. Further, the interface agent 220 can, in some cases, cause a reference to the encrypted file to include an icon or other identifying information that informs the user that the encrypted file is associated with an application that typically can access the non-encrypted version of the file.

With many proprietary file formats or types, there may exist only a single application associated with the file. However, in some cases (e.g., PDF files), multiple applications may be capable of accessing a particular file type and thus multiple applications may be associated with the pre-encrypted version of the file. In some cases, there may not exist an application associated with the file. For example, the application that created the file may have been removed from the client computing device 102, or the file may have been created on another computing device and then provided to the client computing device 102. In such cases, the interface agent 220 may still determine an application capable of accessing the pre-encrypted file based on metadata associated with the file and/or based on information available on a network. In other cases, the interface agent 220 may identify the file as being associated with an unknown file type. In some embodiments, the block 406 is optional.

At block 408, the interface agent 220 displays, or causes a display screen to display, a reference to the encrypted file that appears as if it were the reference to the unencrypted file. In other words, the reference to the encrypted file mimics, at least in part, a reference to the unencrypted file. Thus, in some cases, the reference to the encrypted file may have the same file name, file extension, icon or other file reference characteristic as a reference to the unencrypted file. Further, as described in more detail below, at least some of the metadata associated with the encrypted file may match at least some of the metadata associated with the unencrypted file thereby, in some cases, preventing a user and/or application from using the metadata to determine whether a file is encrypted.

Advantageously, in some embodiments, by displaying the reference to the encrypted file as if it were a reference to the unencrypted file, the file can be organized by the file system 202 and identified by a user with the same ease as if the file were not encrypted. In some cases, the user may not know whether the file is encrypted and can organize and access the file without knowing the encryption status of the file. Further, in some instances, the reference to the encrypted file may be based on a reference to the unencrypted file, but may or may not mimic the reference to the unencrypted file.

Moreover, the reference to the encrypted file may be similar, but not identical to a reference to the unencrypted file. For example, the reference to the encrypted file may include an annotation, such as a mark on the icon of the encrypted file that indicates the encryption status of the file. This annotation of the icon can inform the user that the file is an encrypted version of the unencrypted file. In other cases, the icon of the encrypted file may be identical to the icon of the unencrypted file, but the file extension may differ. Advantageously, in some embodiments, by non-identically mimicking the reference to the unencrypted file, encrypted and unencrypted files can be organized together, but still be distinguishable. Further, the file types of the encrypted files can be identified as easily as if the files were unencrypted files while maintaining the ability for the user to distinguish between encrypted and unencrypted files by, for example, glancing at a reference to the file (e.g., the file icon or file name).

As previously described, in some implementations, the file extension of the encrypted file may differ from the file extension of the unencrypted file. For example, a .CVX extension may be appended to an existing file extension. In some such cases, the added or modified extension of the encrypted file may be hidden from view by default thereby, in some cases, displaying the original file extension or no file extension to the user.

Example of an Encrypted File Access Process

Figure 5:
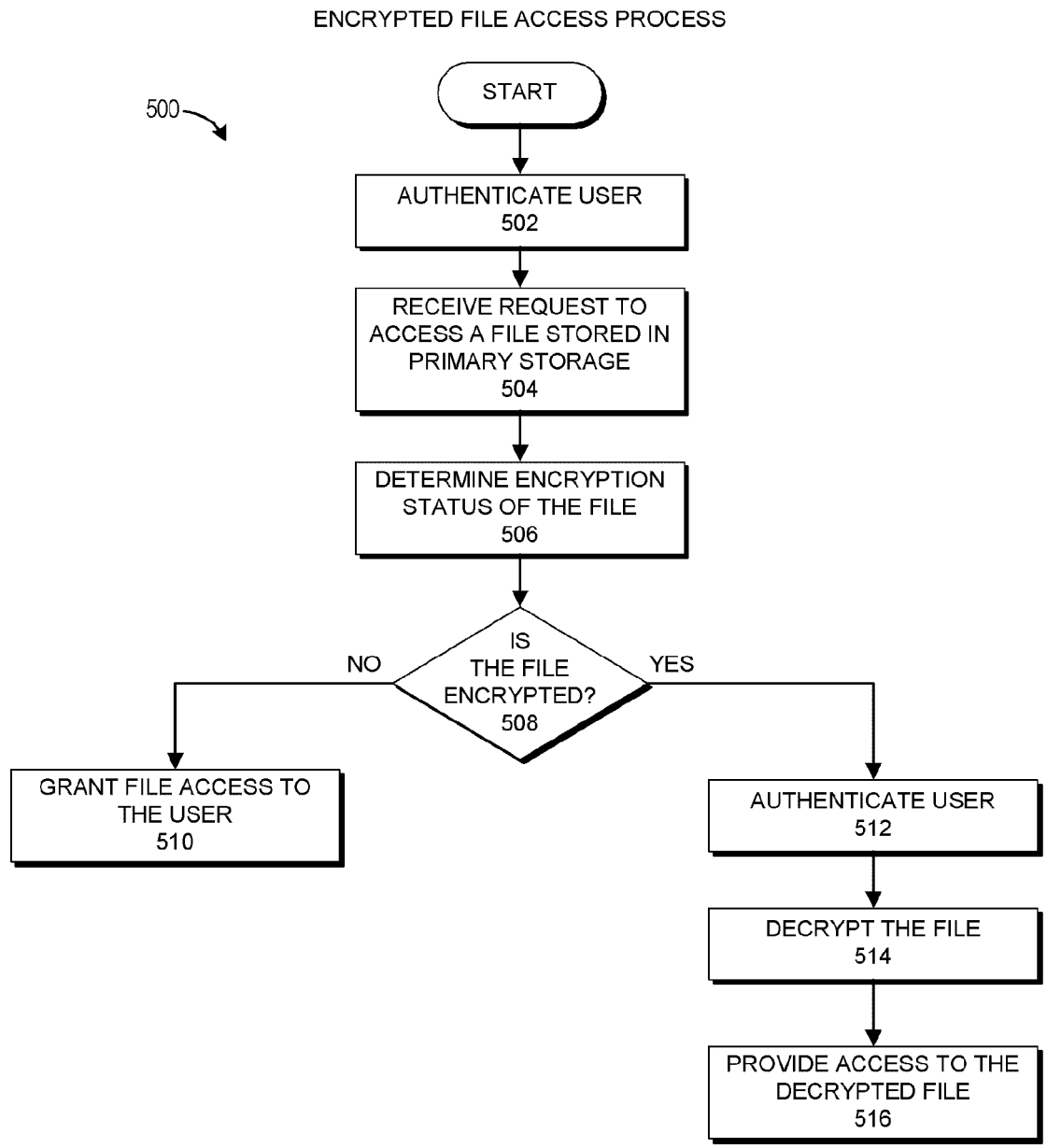
FIG. 5 illustrates an example embodiment of an encrypted file access process.

FIG. 5 illustrates an example embodiment of an encrypted file access process 500. The process 500 can be implemented, at least in part, by any system that can provide a user and/or application with access to a file that has been encrypted using an encryption process, such as the process 300. For example, the process 500, in whole or in part, can be implemented by the filter driver 204, the interface agent 220, the secure file access module 224, the decryption module 228, and the authentication system 206, to name a few. Although any number of systems, in whole or in part, can implement the process 500, to simplify discussion, portions of the process 500 will be described with reference to particular systems.

The process 500 begins at block 502 where, for example, the authentication system 206 authenticates a user. The block 502 may be performed in response to the user attempting to access the client computing device 102 (e.g., at login), access an encrypted file, or in some cases, in response to both an attempt to access the client computing device 102 and an attempt to access an encrypted file. In certain embodiments, the block 502 is optional.

At block 504, the secure file access module 224 receives a request to access a file stored in the primary storage device 104. Generally, the request is sent by a user of the client computing device 102 or an application 110 to the file system 202 and is intercepted by the filter driver 204, which provides the request to the secure access module 224. However, in some cases, the request to access the file may be addressed to the filter driver 204. In some embodiments, the request to access the file may be received from a remote system. For example, the request to access the file may be received from another client computing device, from a mobile device, from a server, or from any other computing device that can request file access on behalf of a user or application.

The secure file access module 224 determines the encryption status of the file at block 506. Determining the encryption status of the file can include examining the file extension of the file, the icon associated with the file, metadata associated with the file, the storage location of the file, a table that identifies encrypted files and/or the encryption status of files, and any other data or source that can be used to determine the encryption status of the file. At decision block 508, the secure file access module 224 determines whether the encryption status of the file indicates that the file is encrypted. If not, the secure file access module 224 at block 510 grants file access to the user, or application 110, that provided the request to access the file at the block 504. In some cases, granting access to the file involves the secure file access module 224 allowing the file access request to proceed. In other words, the file access request of the block 504 may be performed as if the filter driver 204 were not present.

In some embodiments, the block 510 may include additional operations. For example, the block 510 may include logging access to the file or notifying a user (e.g., an administrator) that the file was accessed.

If the secure file access module 224 determines that the file is encrypted at decision block 508, the authentication system 206 authenticates the user at block 512. Authenticating the user can include determining whether the user is authorized to access the encrypted file. In some embodiments, the secure file access module uses authentication information obtained at the block 502 to identify the user. The authentication information can then be used to determine whether the user is authorized to access the file without obtaining additional information from the user. Advantageously, in some cases, by using information obtained at the block 502 in place of requesting authentication information at the block 512, a user can access a file without being aware of whether the file is encrypted.

In some cases, the secure file access module 224 can determine the files the user is authorized to access, encrypted or not, when the user is authenticated at the block 502. In such cases, the block 512 is unnecessary. Thus, in some embodiments, the block 512 is optional. In other embodiments, the block 502 may be optional, and the secure file access module may determine whether the user is authorized to access a file by, in part, using the authentication system 206 to authenticate the user at the block 512.

In certain embodiments, the secure file access module 224 may access metadata and/or access control information associated with a user to determine whether the user is authorized to access the encrypted file. This metadata and/or access control information may be stored at the primary storage device 104, on a device on the network, in a secure storage location associated with the client computing device 102, on a smartcard or other personal security device associated with the user, or at any other location that can be used to store authorization information associated with a user.

At block 514, assuming that it is determined that the user is authorized to access the encrypted file, the decryption module 228 decrypts the encrypted file. Decrypting the file can include identifying the type of encryption used to encrypt the file and determining a corresponding decryption algorithm. The decryption module 228 can determine the type of encryption used based on a variety of factors including, for example, metadata associated with the file, metadata associated with the user, a source of the file, a type of the file, a header associated with the file, a storage location of the file, etc. In some cases, decrypting the file may include identifying a public key to decrypt the file when the file was encrypted with a corresponding private key.

If the user was not successfully authenticated, or was not authorized to access the file, the request to access the file is rejected. Rejecting access to the file can include logging the attempted file access and/or alerting another user (e.g., an administrator) regarding the attempted file access.

At block 516, the secure file access module 224 provides the user and/or application 110 with access to the decrypted file. In some cases, providing access to the decrypted file can include sending the decrypted file over a network to a remote device. Assuming the file was not modified, the filter driver may delete the decrypted file upon detecting the user and/or application 110 has finished accessing the file (e.g., upon detection of a "file close" command). If the file is modified, the process 300 may in some cases be initiated.

Example of a File Backup Process

Figure 6:
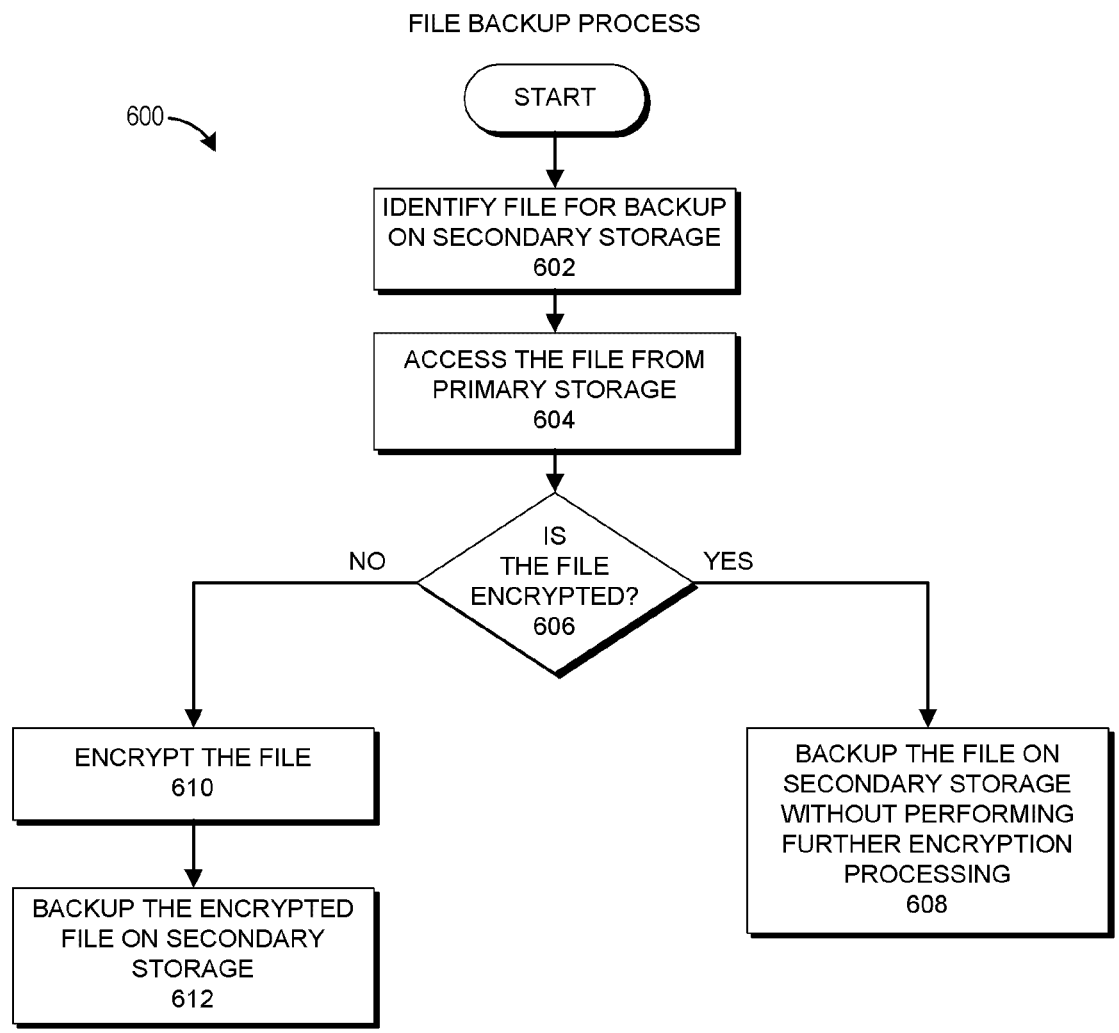
FIG. 6 illustrates an example embodiment of a file backup process.

FIG. 6 illustrates an example embodiment of a file backup process 600. The process 600 can be implemented, at least in part, by any system that can backup a file to a secondary storage device 108. For example, the process 600, in whole or in part, can be implemented by the storage manager 140, a data agent 142, a secondary storage computing device 106, and a media agent 144, to name a few. Although any number of systems, in whole or in part, can implement the process 600, to simplify discussion, portions of the process 600 will be described with reference to particular systems.

The process 600 begins at block 602 where, for example, a data agent 142 associated with an application 110 identifies a file accessible by the application 110 for backup on a secondary storage device 108. In some cases, the data agent 142 performs the block 602 in accordance with a backup policy provided or established by the storage manager 140. Alternatively, the storage manager 140 may perform the block 602. In another alternative, the storage manager 140 may initiate the process 600 by providing a backup command to the data agent 142, which may or may not identify the file for backup. In other cases, a user may identify the file for backup on the secondary storage device 108. The process 600 may be initiated as part of a scheduled or automatic backup process, or may be initiated manually (e.g., in response to a user command).

At block 604, the data agent 142 accesses the file identified at the block 602 from the primary storage 104. The data agent 142 can provide the file to a secondary storage computing device 106 associated with a media agent 144. Alternatively, the data agent 142 may provide the file to the storage manager 140, which can then provide the file to the secondary storage computing device 106. In some embodiments, the data agent 142 makes the file available to the secondary storage computing device 106. The media agent 144 of the secondary storage computing device 106 can then access the client computing device 102 to obtain the file. Generally, regardless of how the file is provided, providing the file to the secondary storage computing device 106 involves providing a copy of the file to the secondary storage computing device 106. Thus, the copy of the file may remain on the primary storage device 104.

However, in some cases, providing the file to the secondary storage computing device 106 involves providing the file itself to the secondary storage computing device 106. Thus, in some cases, a copy of the file may no longer exist on the primary storage device 104 after the backup process is complete. For example, during an archiving process, the file or a copy of the file may be provided to the secondary storage computing device 106 and may be removed from the primary storage device 104. When the file is restored from secondary storage, the file may be decrypted and stored on the primary storage device 104 as described in more detail below. However, typically, at least a copy of the file will exist on both the primary storage device 104 and a secondary storage device 108 during performance of and/or subsequent to completion of the process 600. In some cases, an archived copy of the file may remain on the primary storage device 104.

The media agent 144 determines at decision block 606 whether the file is encrypted. This determination may be based on one or more factors including the file itself and/or metadata associated with the file. For example, the media agent 144 may examine the file name, the data stored in the file, a tag associated with the file, or any other information that can be used to determine the encryption status of a file. In some cases, the encryption status of the file is provided to the media agent 144 by another system (e.g., the data agent 142 or the storage manager 140).

In addition to determining whether the file is encrypted, the media agent 144, at decision block 606, may in some cases identify the system that encrypted the file. For example, the media agent 144 may determine whether the file was encrypted by the client computing device 102 (e.g., by the encryption module 222), by another computing device included within the information management system 100, or by a computing system that is external to the information management system 100. In some embodiments, the media agent 144 may treat files that were encrypted by particular computing systems, or files that were not encrypted by particular computer systems as unencrypted files with respect to the process 600. In other words, in some cases, the media agent 144 may re-encrypt, or encrypt a second time, or cause files to be re-encrypted that are already encrypted based on the computing system that initially encrypted the file.

If the media agent 144 determines at the decision block 606 that the file is encrypted, the media agent 144 stores the file on a secondary storage device 108 without performing an encryption process at block 608. If multiple secondary storage devices 108 exist, the media agent 144 may store the file on the secondary storage device 108 specified by the storage manager 140. Alternatively, the media agent 144 selects the secondary storage device 108 to store the file based on one or more storage device selection rules. These rules may be based on the type of file, the source of the file, a user associated with the file, a data agent associated with the file, or any other information that can be used to determine the location or the device to backup a file.

After identifying the secondary storage device 108 to store the file, or secondary or backup copy of the file, the media agent 144 may identify the secondary storage device 108 to the storage manager 140. The storage manager 140 may associate the identity of the secondary storage device 108 along with the identity of the file in a repository (e.g., the management database 146). In addition, or alternatively, the media agent 144 may associate the identity of the secondary storage device 108 along with the identity of the file in a repository (e.g., the media agent database 152.

Further, one or more of the storage manager 140 and the media agent 144 may store at the repository information relating to the encryption algorithm used to encrypt the file. For example, one or both systems may store the identity of the algorithm used to encrypt the file, the identity of an algorithm capable of decrypting the file, the identity of the system that encrypted the file, and the like.

If the media agent 144 determines at the decision block 606 that the file is not encrypted or, in some cases, should be encrypted a second time, the media agent 144 encrypts the file, or causes the file to be encrypted, at block 610. In some cases, the media agent 144 may use the same encryption algorithm regardless of the file to be encrypted. In other cases, the media agent 144 may select an encryption algorithm based on the file (e.g., the name of the file, the size of the file, the type of file, the owner of the file, etc.), the secondary storage device 108 where the file is to be stored, the client computing device 102 that provided the file, or any other factor that can be used to determine the encryption algorithm to use to encrypt the file. In yet other cases, the encryption algorithm may be selected by the storage manager 140.

At block 612, the media agent 144 stores the encrypted file on a secondary storage device 108. In some embodiments, the block 612 can include one or more of the embodiments described above with respect to the block 608. For example, in some cases, the media agent 144 may select the secondary storage device 108 based on one or more storage device selection rules. As a second example, the media agent 144 may store with the file the identity of the encryption algorithm used to encrypt the file. In addition, or alternatively, the media agent 144 may store the identity of the encryption algorithm used to encrypt the file along with the storage location of the file in a table at the media agent database 152 and/or at the storage manager 140. In some cases, the storage location of the file may be stored at the client computing device 102.

In some embodiments, a copy of the file may be stored at the secondary storage computing device 106 (e.g., as part of a cache) as part of the block 608 and/or the block 612. The copy of the file may be stored for a specific period of time or until evicted, which, for example, may occur as part of a cache maintenance process or to make room in the cache for additional files.

Advantageously, in certain embodiments, the process 600 may be used to perform a selective encryption backup process. In some cases, encrypting only unencrypted files during a backup process, time and computing resources can be saved during the backup process. Alternatively, in some cases, the process 600 can be used to encrypt all files regardless of encryption status. By encrypting all files regardless of encryption status during a backup process, the process 600 can be used to ensure consistent encryption across files of a backup.

Example of a File Restoration Process

Figure 7:
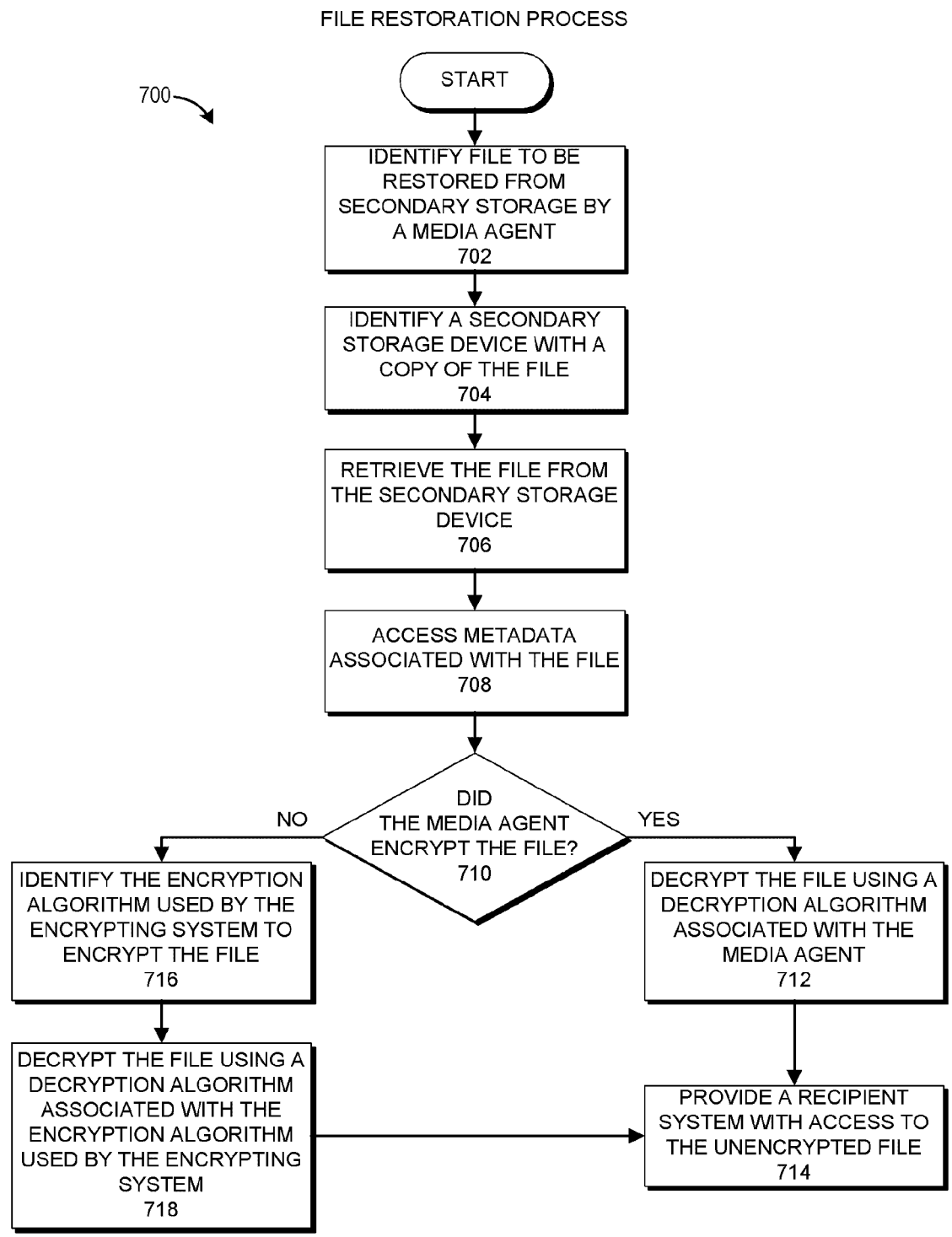
FIG. 7 illustrates an example embodiment of a file restoration process.

FIG. 7 illustrates an example embodiment of a file restoration process 700. The process 700 can be implemented, at least in part, by any system that can restore a file from a secondary storage device 108 to a recipient system (e.g., the client computing device 102). For example, the process 700, in whole or in part, can be implemented by the storage manager 140, a secondary storage computing device 106, and a media agent 144, to name a few. Although any number of systems, in whole or in part, can implement the process 700, to simplify discussion, portions of the process 700 will be described with reference to particular systems.

The process 700 begins at block 702 where, for example, a storage manager 140 identifies a file to be restored from a secondary storage device 108 by a media agent 144. The file may be identified as part of a restore command received from the storage manager 140 at a secondary storage computing device 106. In some cases, the restore command is sent to a particular secondary storage computing device 106 based on the file to be restored. The storage manager 140 can determine which secondary storage computing device 106 to send the restore command based on information stored at the storage manager 140, such as a table of file locations. In some cases, the process 700 may be performed as part of a system or storage device restore process. In other cases, the process 700 may be initiated by a client computing device 102. For example, the client computing device 102 may identify the file to be restored at the block 702 or may send the restore command to the secondary storage computing device 106 and/or media agent 144.

At block 704, the media agent 144 identifies a secondary storage device 108 that includes a copy of the file identified at the block 702. The secondary storage device 108 may be identified based on the restore command that may be received as part of the block 702. Alternatively, the secondary storage device 108 may be identified based on the file to be restored and/or based on a storage location table included as part of the media agent database 152 that identifies the location of stored files. The identified storage location may include the secondary storage device 108 from a set of secondary storage devices and, in some cases, may include the location within the identified secondary storage device 108 that has the copy of file. In some embodiments, the block 704 is optional. For example, in some cases, the media agent 144 has access to a single secondary storage device 108.

At block 706, the media agent 144 retrieves the file from the secondary storage device 108. Further, the media agent 144 accesses metadata associated with the file at block 708. The metadata may include the file name, the file extension, or additional information stored with the file or at a table with an entry for the file, such as a table at the media agent database 152.

Based, at least in part, on the metadata accessed at the block 708, the media agent 144 determines at decision block 710 whether the media agent 144 encrypted the file. In some embodiments, the media agent 144 determines whether any media agent included in a secondary storage device encrypted the file. Further, in some cases the decision block 710 can include determining whether any media agent associated with an information management system 100 of an organization encrypted the file. In other words, in some cases, the decision block 710 can include determining whether the file was encrypted as part of a storage operation associated with secondary storage or with primary storage, or whether the encryption occurred at a system external to the information management system 100 as may occur when a user or application receives an encrypted file from a third-party user or system.

If the media agent 144 determines that it encrypted the file at the decision block 710, the media agent 144 at block 712 decrypts the file retrieved at the block 706 using a decryption algorithm associated with the media agent 144. In cases where the media agent 144 may have used one of several encryption algorithms to encrypt the file, the media agent 144 may identify the decryption algorithm based on the metadata accessed at the block 708. Alternatively, the decryption algorithm may be identified as part of the restore command or included with the identification of the file to restore at the block 702.

As previously described, in some cases the file may have been encrypted by other systems within the secondary storage subsystem 118, such as by other media agents 144 or secondary storage computing devices 106. In such cases, the media agent 144 may determine the decryption algorithm based on the device that encrypted the file or by communicating with the device that encrypted the file, such as by accessing metadata stored at the device that encrypted the file.

Once the media agent 144 has decrypted the file, the secondary storage computing device 106 provides a recipient system with access to the unencrypted file at block 714. The recipient system may be the system that requested the file (e.g., the client computing device 102), a mobile device in communication with a computing system in the primary storage subsystem 117 of the information management system 100 (e.g., a client computing device 102 or a server (not shown)), the storage manager 140, a system identified by the storage manager 140, or any other system that may be authorized to access the decrypted file. Further, providing access to the decrypted file can include sending the decrypted file to the recipient system, sending the file to another system (e.g., the storage manager 140) to provide to the recipient system, or enabling the recipient system to access the secondary storage computing device 106 to obtain the decrypted file. Moreover, in some cases, providing access to the decrypted file can include providing one or more data agents 142 at the recipient system with access to the decrypted file.

If the media agent 144 determines that it did not encrypt the file at the decision block 710, the media agent 144 at block 716 identifies the encryption algorithm used by the encrypting system to encrypt the file. The media agent 144 may identify the encryption algorithm based on the file, metadata associated with the file, information provided by the storage manager 140, information provided by the recipient system, information included in the restore command, or any other data that can be used to identify the encryption algorithm. In some cases, the encryption information may include a key, such as a public key, for decrypting the file.

At block 718, the media agent 144 decrypts the file using a decryption algorithm associated with the encryption algorithm identified at the block 716. In some cases, the media agent 144 may use a key provided and/or identified at the block 716 to decrypt the file. After the file is decrypted, the secondary storage computing device 106 provides a recipient system with access to the unencrypted file at block 714 as previously described.

In some embodiments, the blocks 716, 718, and 714 may be optional. For example, if the media agent 144 determines that it did not encrypt the file at the decision block 710, it may send the encrypted file to the recipient system without decrypting the file. In such cases, the recipient system (e.g., client computing device 102) may decrypt the file or provide the file to another system for decryption.

Second Example of a File Restoration Process

Figure 8:
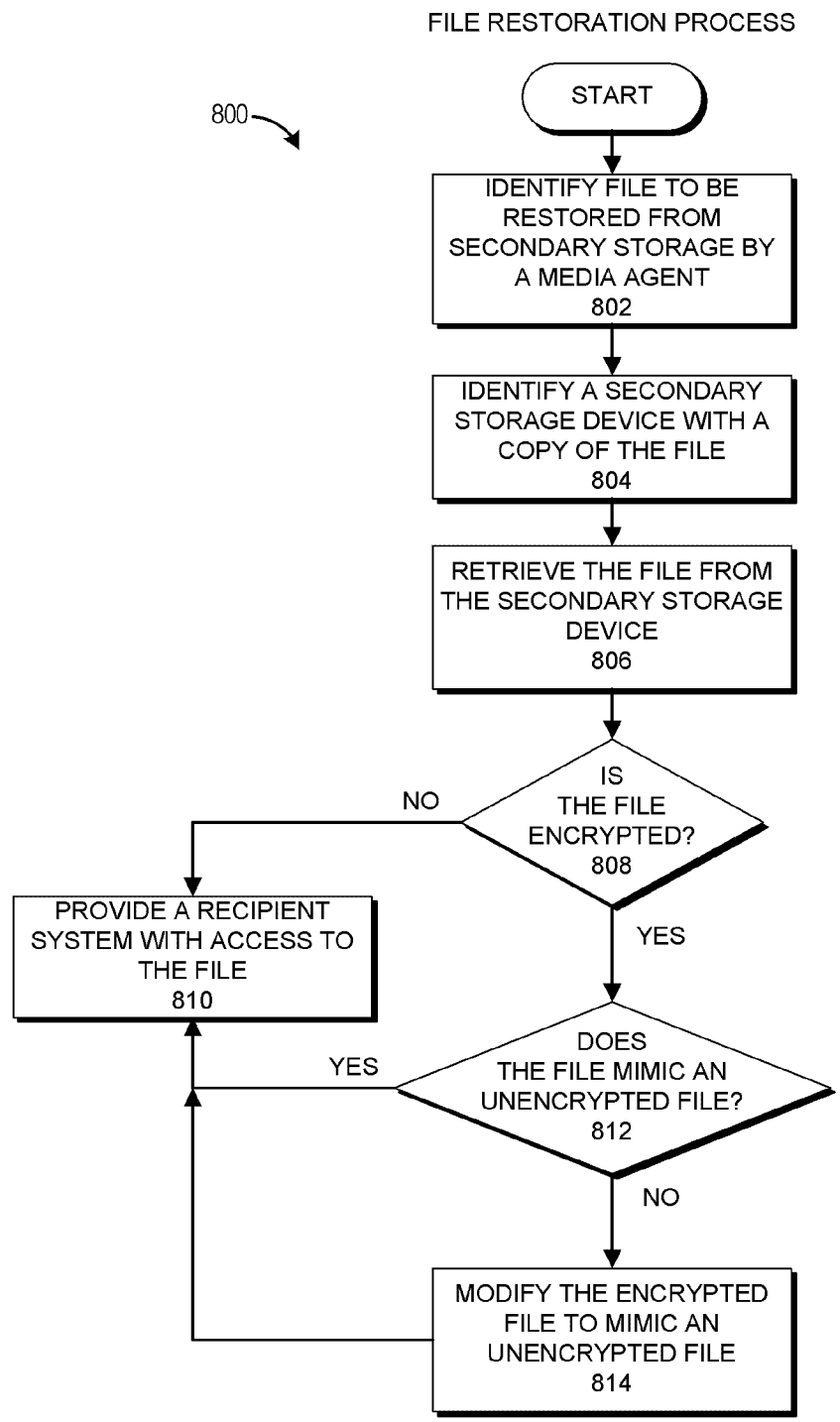
FIG. 8 illustrates a second example embodiment of a file restoration process.

FIG. 8 illustrates a second example embodiment of a file restoration process 800. The process 800 can be implemented, at least in part, by any system that can restore a file from a secondary storage device 108 to a recipient system (e.g., the client computing device 102). For example, the process 800, in whole or in part, can be implemented by the storage manager 140, a secondary storage computing device 106, and a media agent 144, to name a few. Although any number of systems, in whole or in part, can implement the process 800, to simplify discussion, portions of the process 800 will be described with reference to particular systems.

The process 800 begins at block 802 where, for example, a storage manager 140 identifies a file to be restored from a secondary storage device 108 by a media agent 144. The media agent 144 identifies at block 804 a secondary storage device 108 that includes a copy of the file to be restored. In some embodiments, the blocks 802 and 804 can include one or more of the embodiments described above with respect to the blocks 702 and 704 respectively.

At block 806, the media agent 144 retrieves the file from the secondary storage device 108 identified at the block 804. In some embodiments, the block 806 can include one or more of the embodiments described above with respect to the block 706. Further, in some cases, the block 806 can include accessing metadata associated with the file. In such cases, the block 806 can include one or more of the embodiments described above with respect to the block 708.

At decision block 808, the media agent 144 determines whether the file is encrypted. The media agent 144 may make this determination based, at least in part, on metadata associated with the file. Alternatively, or in addition, the media agent 144 may determine whether the file is encrypted by analyzing the file itself. In some embodiments, the decision block 808 may be optional. For example, if every system capable of storing a file at a secondary storage device 108 is configured to encrypt each file before storing the file, then the decision block 808 may be optional. In some embodiments, the decision block 808 can include one or more of the embodiments described above with respect to the decision block 710.

If the media agent 144 determines at the decision block 808 that the file is not encrypted, the secondary storage computing device 106 provides a recipient system with access to the file at block 810. Once the recipient system has received the file, the recipient system can present it to a user or provide an application with access to the file via, for example, the interface agent 220, the secure file access module 224, or a data agent 142. In some embodiments, the block 810 can include one or more of the embodiments described above with respect to the block 714.

If the media agent 144 determines at the decision block 808 that the file is encrypted, the media agent 144 determines whether the file mimics an unencrypted file at decision block 812. The determination of the decision block 812 is based on an unencrypted file of the same type as the decrypted version of the file retrieved at the block 806. The media agent 144 may make the determination at the decision block 812 based, at least in part, on metadata associated with the file and/or the file itself. In some embodiments, the decision block 812 may be optional. For example, if every system capable of storing a file at a secondary storage device 108 is configured to configure each encrypted file to mimic an unencrypted file before storing the file, then the decision block 812 may be optional.

As previously described with respect to the block 408, an encrypted file that mimics an unencrypted file can include a reference to the encrypted file that shares some or all of the display characteristics of a reference to an unencrypted file. For example, the reference to the encrypted file may include the same extension and/or the same icon as a reference to the unencrypted file. In some cases, at least some of the metadata associated with the encrypted file may be the same as the metadata associated with an unencrypted copy of the file. For example, the metadata associated with the encrypted file may identify one or more applications that can access the file as if it were unencrypted regardless of whether the one or more applications can access the file in its encrypted form. Thus, in some cases, a user accessing the metadata for the encrypted file may, in some cases, not be able to identify the file as an encrypted file. Further, in some instances, at least some applications may not be able to identify whether the file is encrypted based on the metadata associated with the file.

If at the decision block 812 the media agent 144 determines that the file does not mimic an unencrypted file, the media agent 144 modifies the encrypted file to mimic an unencrypted file at the block 814. Generally, the modification of the block 814 does not include decrypting the file. Thus, the modified file remains an encrypted file. Modifying the encrypted file may include modifying one or more of the factors described above with respect to the decision block 812 in determining whether the file mimics an unencrypted file. For example, modifying the encrypted file can include changing the icon used to display a reference to the encrypted file to the user to match the icon used to display a reference to the unencrypted file to the user. As previously described, in some cases, the icon may be annotated. Further, as a second example, modifying the encrypted file can include changing a the file name and/or file extension of the encrypted file to match the file name and/or file extension of an unencrypted version of the file. In other cases, changing the file name may include hiding a portion of the file name and/or file extension so that it is not displayed to a user.

Once the encrypted file, or a reference to the encrypted file, has been modified at the block 814, or if at the decision block 812 the media agent 144 determines that the file mimics an unencrypted file, the secondary storage computing device 106 provides a recipient system with access to the file at block 810 as previously described. The recipient system (e.g., the client computing device 102) using, for example, the decryption module 228 can decrypt the file for presentation to a user or for provisioning to an application. In some cases, the decryption of the file may occur upon the recipient system obtaining access to the file. In other cases, the decryption of the file may occur at a later time. In either case, the file may be stored at the primary storage device 104 upon the recipient system receiving access to the file.

In some cases, as has been described, the process 800 is a multi-tier file restoration process. In such cases, a first portion of the restoration process is performed by one or more systems within the secondary storage subsystem 118 of the information management system 100 and a second portion of the file restoration process being performed by one or more systems within the primary storage subsystem 117 of the information management system 100.

Further, in some embodiments, the recipient system may use the process 500 to provide a user and/or application with access to the file. As previously described, in some embodiments, the media agent 144 may decrypt the file at the block 814 and can provide the recipient system with access to the decrypted file.

Second Example Client Computing Environment

Figure 9:
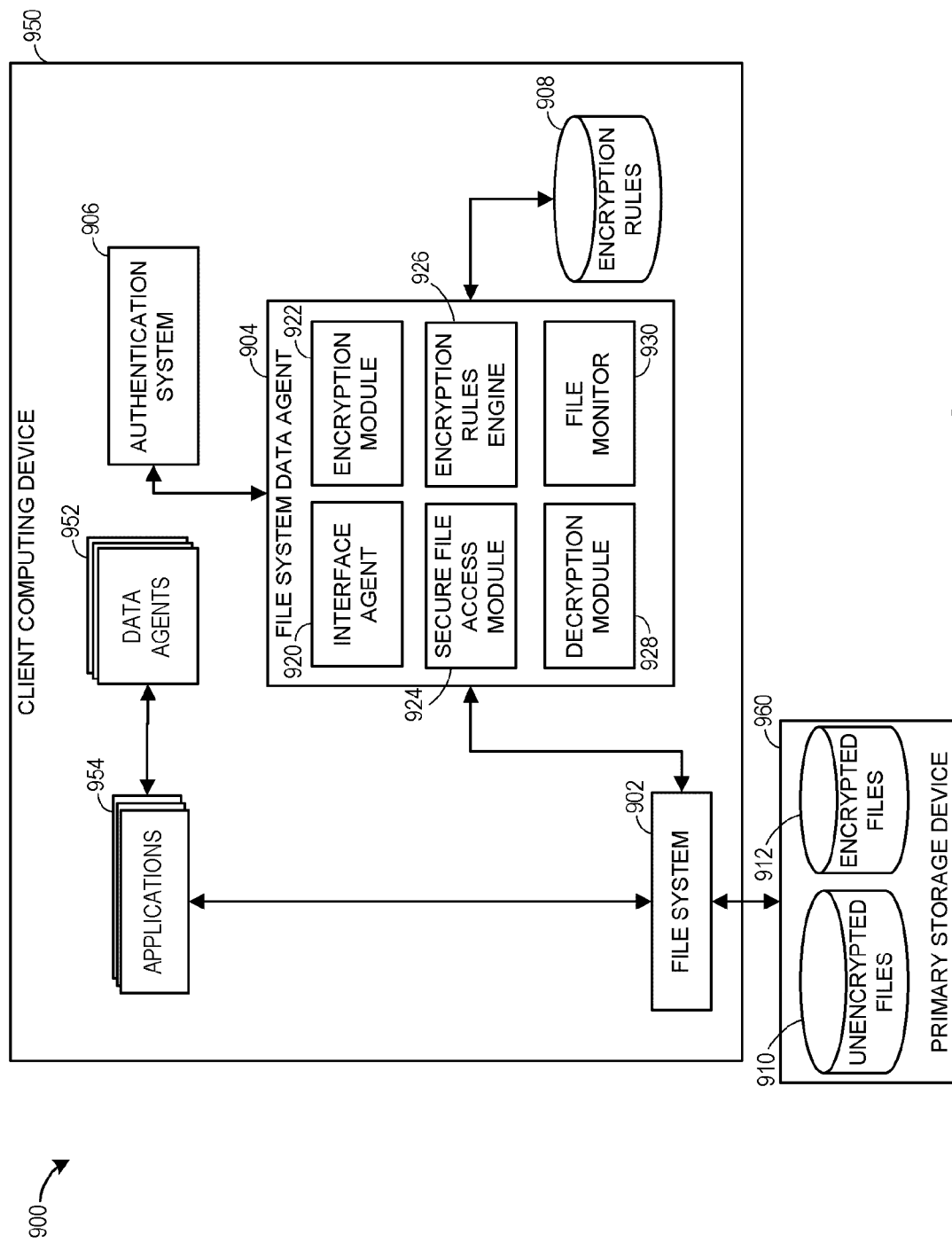
FIG. 9 is a block diagram illustrating a second example of a client computing environment including a client computing device and a primary storage device.

FIG. 9 is a block diagram illustrating a second example of a client computing environment 900 including a client computing device 950 and a primary storage device 960. The client computing device 950 and the primary storage device 960 can be included as part of the information management system 100 previously described above with respect to FIGS. 1A-1E. Further, the client computing device 950 and the primary storage device may be included in the primary storage subsystem 117. Moreover, in certain embodiments, the client computing device 950 can include one or more of the embodiments described with respect to the client computing device 102. Likewise, the primary storage device 960 can include one or more of the embodiments described with respect to the primary storage device 104.

The client computing device 950 may include a number of systems and subsystems and be capable of executing a number of different types of software. For instance, the client computing device 950 may include one or more applications 954, a file system 902, one or more data agents 952, an authentication system 906, and an encryption rules repository 908. Further, at least one of the data agents 952 may be a file system data agent 904. Although a single file system 902 and a single file system data agent 904 are illustrated in FIG. 9, in some embodiments, the client computing device 950 may include multiple file systems and/or multiple file system data agents. The file system 902 can include any type of file system. For example, the file system 902 may include a Microsoft Windows based file system or a Linux based file system. Furthermore, in some embodiments, the file system 902 may include one or more of the embodiments previously described with respect to the file system 202.

The applications 954 can include any type of application. Further, the applications 954 can include one or more embodiments previously described with respect to the applications 110. Some or all of the applications may be associated with one or more data agents 952. As previously described, a data agent may assist with the performance of information management operations based on the type of data that is being accessed and/or protected, at a client-specific and/or application-specific level. Further, at least some of the data agents 952 may include one or more of the embodiments previously described with respect to the data agents 142.

As with the client computing device 102, the client computing device 950 may include an authentication system 906. The authentication system 906 may include any system configured to authenticate a user attempting to use the client computing device 950 and/or attempting to access files stored on the primary storage device 960, or store elsewhere. Further, the authentication system 906 may include one or more of the embodiments previously described with respect to the authentication system 206.

The file system data agent 904 can include a data agent that facilitates the file system 902 managing data processed or organized by the file system 902. For example, as previously described, the file system data agent may be involved in handling data files and/or system files, and may facilitate backing up the file system 902 of the client computing device 950. Backing up the file system 902 may include backing up files stored at the primary storage device 960. In certain embodiments, the file system data agent 904 can perform one or more processes associated with the filter driver 204. Thus, in some embodiments, the file system data agent 904 and/or its subsystems can include one or more of the embodiments described with respect to the filter driver 204 and/or it subsystems.

The primary storage device 960 can include any storage device for storing primary data. For example, the primary storage device 960 may be a hard drive, a solid state drive, memory, flash, etc. Although illustrated as a separate system, the primary storage device 960 may be included as part of the client computing device 950. Further, the primary storage device 960 may include one or more of the embodiments described with respect to the primary storage device 104. As previously described with respect to FIG. 2, the primary storage device may include a number of repositories to facilitate storing and/or organizing data stored by the primary storage device. For instance, the primary storage device 960 may include a repository 910 for storing unencrypted files and a repository 912 for storing encrypted files. In some embodiments, the primary storage device 960 may be organized into a lesser number or a greater number of repositories and/or partitions.

Each data agent may include a number of systems or subsystems that facilitate the data agent processing data for a corresponding application or system. For instance, the file system data agent 904 may include an interface agent 920, an encryption module 922, a secure file access module 924, an encryption rules engine 926, a decryption module 928, and a file monitor 930. In some embodiments, the file system data agent 904 may include fewer or additional subsystems. For instance, the encryption module 922 and the decryption module 928 may be part of a single subsystem. As a second example, the secure file access module 924 may be optional because, for example, a separate system may handle secure file access.

The interface agent 920 may be configured to control how files, or references to files (e.g., file names, file icons, etc.), are displayed to a user. Controlling how files are displayed can include controlling whether a file reference to an encrypted files is displayed as a file reference to an unencrypted file or as an annotated version of a reference to an unencrypted file. For instance, a file icon for an encrypted file may be the same as for an unencrypted file. Alternatively, the file icon may include an asterisk to indicate that it represents an encrypted file. In some embodiments, the interface agent 920 can include one or more of the embodiments described with respect to the interface agent 220.

In some cases, the file system data agent 904 may use an encryption rules engine 926, which can access encryption rules from the encryption rules repository 908, to determine whether a file is to be encrypted. If the encryption rules engine 926 determines that a file should be encrypted, the encryption module 922 can perform encryption of the file and, in some cases, of the encryption key used to encrypt the file. The encryption module 922 can include any encryption engine that can encrypt a file using one or more encryption algorithms. Further, the encryption module 922 can be used to encrypt encryption keys. In some embodiments, the encryption rules engine 926 can include one or more of the embodiments described with respect to the encryption rules engine 226. Similarly, in some cases, the encryption module 922 can include one or more of the embodiments previously described with respect to the encryption module 222.

To decrypt files, the file system data agent 904 can use the decryption module 928, which can include any decryption engine that can decrypt a file using one or more decryption algorithms. Further, the decryption module 928 can be used to decrypt encrypted keys. In some cases, the decryption module 928 can include one or more of the embodiments previously described with respect to the decryption module 228.

The secure file access module 924 can determine the encryption status of a file and can manage the decryption and presentation of encrypted files to users who are authorized to access the file. Further, the secure file access module 924 can manage access by applications and/or computing systems attempting to access the file. In some embodiments, the secure file access module 924 can include one or more of the embodiments previously described with respect to the secure file access module 224.

In some embodiments, the decision of whether to encrypt a file at the primary storage device may be based on whether the file has been modified. Further, the decision of whether to decrypt a file may be based on whether a file has been selected for backup to a secondary storage device 106, or whether a user or application desires to access the file. The file monitor 930 can include any system that can monitor activity with respect to the file to facilitate determining whether the file needs encrypting or decrypting. This determination may be made based, at least in part, on rules stored at the encryption rules repository 908 and/or commands received from a user, application, and/or storage manager 140. In some embodiments, the file monitor 930 can include one or more of the embodiments described with respect to the file monitor 230.

Example User Key Encryption Process

Figure 10A:
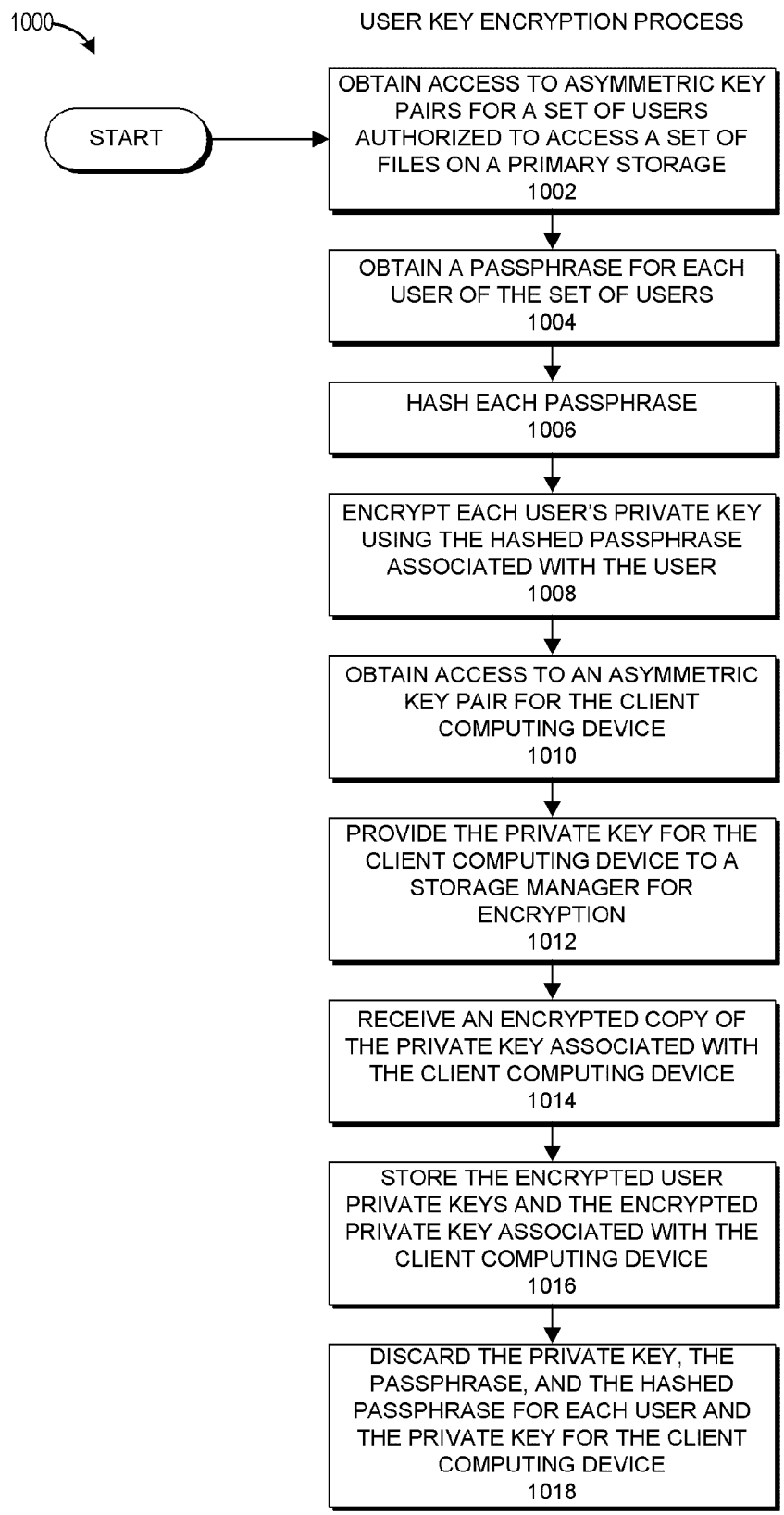
FIG. 10A illustrates an example embodiment of a user key encryption process.

FIG. 10A illustrates an example embodiment of a user key encryption process 1000. The process 1000 can be implemented, at least in part, by any system that can encrypt a private key from an asymmetric key pair (e.g., a private/public key pair). For example, the process 1000, in whole or in part, can be implemented by the filter driver 204, the file system data agent 904, the authentication system 906, the encryption rules engine 926, and the encryption module 922, to name a few. Although any number of systems, in whole or in part, can implement the process 1000, to simplify discussion, portions of the process 1000 will be described with reference to particular systems.

In some embodiments, the process 1000 may be combined and/or integrated with a process for encrypting a file for storage on a primary storage device, such as the process 1050, which is described below with respect to FIG. 10B. In some cases, the process 1000 may be performed at a time period that is earlier than a time period during which the process 1050 may be performed. In other cases, the process 1000 and the process 1050 may be performed together as part of a single process. In some cases, the process 1000 may be performed multiple times for a user. For example, a user or system may have different asymmetric key pairs for use with different sets of files.

Further, in some cases, the process 1050 may be performed a number of times as a file is encrypted and decrypted over the lifetime of the file, while the process 1000 may be performed once or some number of times fewer than the process 1050. For instance, the process 1000 may be used to obtain an encrypted copy of a user private key. Once the encrypted user private key is obtained, it may be unnecessary to perform the process 1000 again for that user. However, the process 1050 may be performed multiple times as a file may be encrypted and decrypted a number of times.

The process 1000 begins at block 1002 where, for example, the encryption module 922 obtains access to an asymmetric key pair for each user who is authorized to access a set of files at, or stored on, a primary storage 960. The set of files may include any number of files including a single file. Determining the users who are authorized to access the set of files may be based on metadata associated with the files and/or the user. Alternatively, or in addition, determining the users who are authorized to access the set of files may be based on identifying the users who are authorized to access the client computing device 950 or who have an account with the client computing device 950. Thus, in some cases, the block 1002 may identify users who are authorized to access the client computing device 950 and/or the primary storage 960 instead of the users who are authorized to access the set of files.

In some cases, only a single user may be authorized to access the set of files (e.g., the file author or owner for each of the files, or for a directory including the files). In other cases, a number of users may be authorized to access the set of files. The asymmetric key pair for each user may include a public key and a private key and may be generated based on any type of asymmetric key algorithm. For example, the asymmetric key pair may be generated using RSA.

The asymmetric key pairs may be obtained by accessing a key repository and/or by accessing the encryption rules repository 908. Alternatively, the asymmetric key pairs may be obtained from the storage manager 140. As yet another alternative, the asymmetric key pairs may be generated by the encryption module 922. An asymmetric key pair may be associated with a user regardless of the computing device or primary storage that the user accesses. In other cases, the asymmetric key pair may be specific to a user and a computing device and/or primary storage accessed by the user.

At block 1004, the encryption module 922 obtains a passphrase for each of the users. The passphrase may be a password, such as the password used by the user to login or to access the client computing device 950, or a password used to access a network used to communicate with systems of the primary storage subsystem 117. In such cases, the passphrase may be obtained by the authentication system 906. Often, the passphrase is unique to the user. However, in some cases, the passphrase may not be unique. In some embodiments, the passphrase of a user may be combined with information unique to a user to ensure that the passphrase obtained at the block 1004 is unique. For instance, the passphrase may include a combination of a user's password and a randomly, or pseudo-randomly, generated number assigned to the user that is unique to the user.

At block 1006, the encryption module 922 hashes each passphrase. Hashing the passphrase may include performing a hashing algorithm multiple times (e.g., 512 times, a thousand times, a million times, etc.) with each subsequent performance of the hashing algorithm using the result of the prior performance of the hashing algorithm as the input to be hashed. In some cases, the hashing may be performed a threshold number of times. The threshold may be selected based on a security level of the set of files. Advantageously, in certain embodiments, by hashing the passphrase multiple times, the probability that a malicious user is able to determine the passphrase based on the hashed passphrase is reduced. The encryption module 922 may use any type of cryptographic hash function. For example, the hash function can be a SHA-512, MD6, or BLAKE-512 hash function. In some cases, the encryption module 922 may pad the passphrase with additional data to ensure the passphrase is of a particular length.

At block 1008, the encryption module 922 encrypts, for each user, one of the keys from the asymmetric key pair (e.g., the private key) associated with the user using the hashed passphrase obtained at the block 1006. In some embodiments, the blocks 1002-1008 are optional. For example, the data encryption key used to encrypt the file may be secured using only keys associated with the client computing device 950, as described with respect to the blocks 1010-1014.

At block 1010, the encryption module 922 obtains access to an asymmetric key pair for the client computing device 950. The asymmetric key pair may include a public key and a private key and, as with the asymmetric key pairs of the block 1002, may be generated based on any type of asymmetric key algorithm. For example, the asymmetric keys may be generated using an RSA algorithm. Further, as with the user asymmetric key pairs, the asymmetric key pair of the client computing device 950 may be obtained by accessing a key repository and/or by accessing the encryption rules repository 908. Alternatively, the asymmetric key pair may be obtained from the storage manager 140. Further, in some cases, the asymmetric key pair may be generated by the encryption module 922.

At block 1012, the file system data agent 904 provides one of the keys from the asymmetric key pair (e.g., the private key) associated with the client computing device 950 obtained at the block 1010 to the storage manager 140 for encryption. In some embodiments, the block 1012 can include providing an identity of the client computing system 950 to the storage manager 140.

Upon receiving the private key, the storage manager 140 can access a passphrase associated with the client computing device 950. In some cases, the passphrase may be hashed, for example, by the storage manager 140. Further, the passphrase and/or the hashed version of the passphrase may be used to encrypt a copy of the private key. Thus, in some cases, the storage manager 140 may perform similar operations on the private key, provided to the storage manager at block 1012, as described above with respect to the blocks 1006 and 1008.

In some cases, the passphrase may be accessed from a repository, which may be included with the storage manager 140 or may be separate, but accessible by the storage manager 140 over, for example, a network. Alternatively, or in addition, the storage manager 140 may generate the passphrase for the client computing device 950. Moreover, in some cases, the passphrase is generated and used by computing systems without a user accessing the passphrase. Thus, in such embodiments, the passphrase may be automatically generated without user action. In some cases, the passphrase may include symbols and/or data that may be unreadable by a user or not alphanumeric. Further, in certain embodiments, the storage manager 140 may identify the client computing device 950 as available or accessible as opposed to lost or stolen. In some cases, marking the client computing device 950 as available, or not lost, may include marking the passphrase for the client computing device 950 as live or in-use.

At block 1014, the file system data agent 904 receives an encrypted copy of the private key associated with the client computing device 950 from the storage manager 140. In some embodiments, the blocks 1010-1014 may be optional. For example, in some cases, users may be associated with asymmetric key pairs for encrypting files at the primary storage 960, but the client computing device 950 may, in some cases, not be associated with its own asymmetric key pair.

At block 1016, the file system data agent 904 stores the encrypted user private keys (obtained at the block 1008) and the encrypted private key associated with the client computing device 960 (obtained at the block 1014). In cases where the block 1008 or the block 1014 is optional, the block 1016 may store the encrypted user private keys or the encrypted private key for the client computing device 960 respectively. Storing the encrypted private keys may include storing the encrypted private keys in one or more of the primary storage 960, the file system data agent 904, a registry of the client computing device 950, the encryption rules repository 908, a directory of the file system 902, a special purpose memory device (not shown) of the client computing device 950, a special purpose location within a memory device of the client computing device 950, and the like. In some cases, the encrypted private key may be embedded with a file that is encrypted with a data encryption key, which is itself encrypted by a public key corresponding to the encrypted private key. The encrypted data encryption key may also be embedded with the file.

At block 1018, the encryption module 922 discards the private key, the passphrase, and the hashed passphrase for each user. In addition, the block 1018 may include discarding the private key for the client computing device 950. Discarding the private key for the users and the client computing device 950 may include discarding unencrypted private keys. Thus, in certain embodiments, a private key may exist in its unencrypted form during generation of the private key and during decryption of a data encryption key that was encrypted with a public key corresponding to the private key. In such instances, the private key may only exist in an encrypted form during time periods other than asymmetric key generation and decryption of a data encryption key.

Although the operations of the process 1000 have been described following a specific order, the process 1000 is not limited as such. For instance, in some cases, operations may be performed in a different order (e.g., the operations associated with the block 1010 may be performed prior to the operations associated with the block 1002). Further, in some cases, operations may be performed serially or substantially in parallel. For instance, the blocks 1002 and 1010 may be performed substantially in parallel.

Example Primary Storage File Encryption Process

Figure 10B:
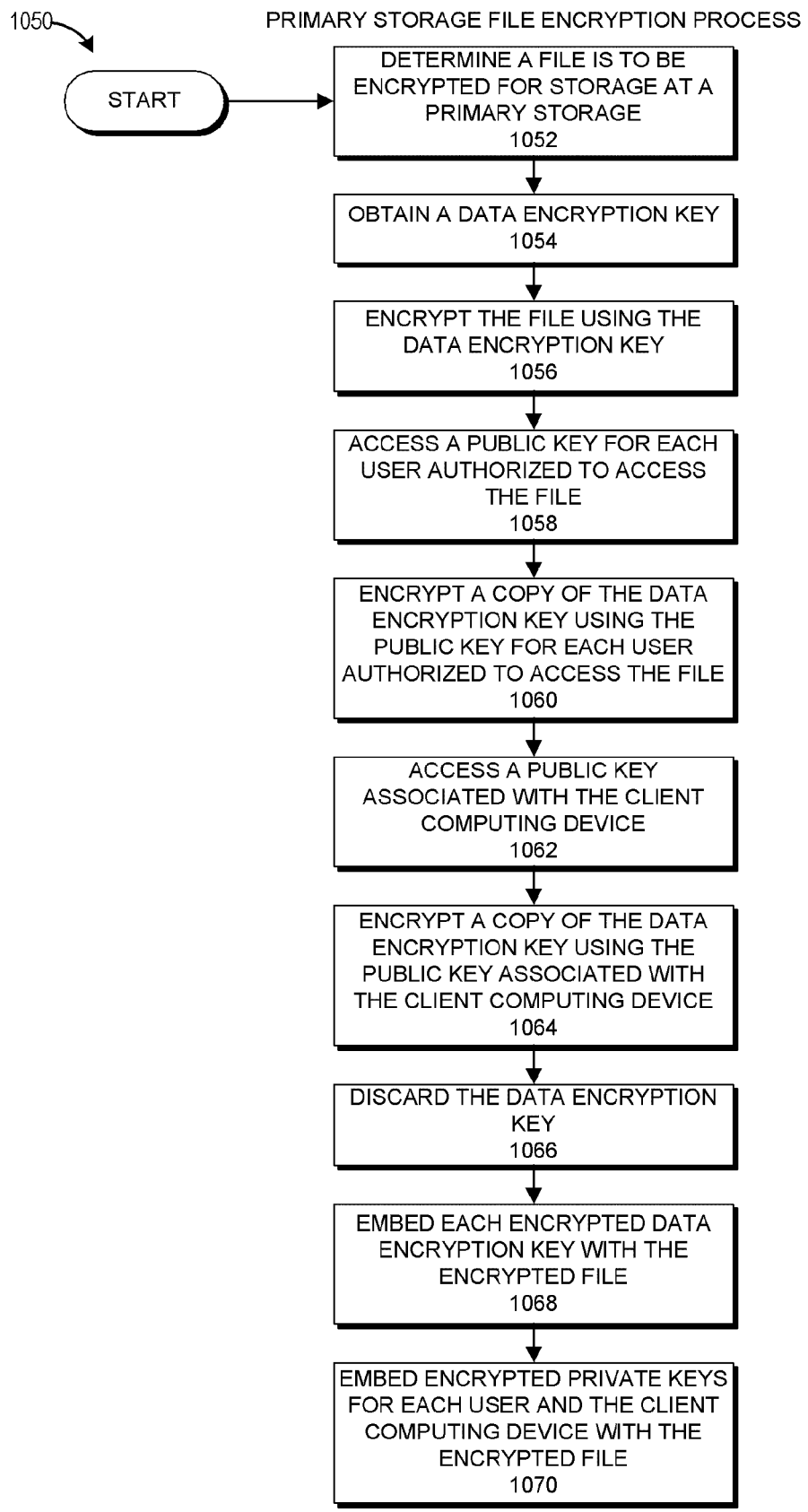
FIG. 10B illustrates an example embodiment of a primary storage file encryption process.

FIG. 10B illustrates an example embodiment of a primary storage encryption process 1050. The process 1050 can be implemented, at least in part, by any system that can encrypt a file for storage on a primary storage device (e.g., the primary storage device 104 or the primary storage device 960). Further, the process 1050 can be performed by any system that can encrypt the key used to encrypt the file with user and/or system specific keys, which may be embedded with the encrypted file. For example, the process 1050, in whole or in part, can be implemented by the filter driver 204, the file system data agent 904, the authentication system 906, the file monitor 930, the encryption rules engine 926, the interface agent 920, and the encryption module 922, to name a few. Although any number of systems, in whole or in part, can implement the process 1050, to simplify discussion, portions of the process 1050 will be described with reference to particular systems.

The process 1050 begins at block 1052 where, for example, the encryption rules engine 926 determines that a file is to be encrypted for storage at a primary storage device 960. The encryption rules engine 926 may determine that the file is to be encrypted based, at least in part, on metadata associated with the file (e.g., the file type, the file storage location). Further, the determination may be based, at least in part, on encryption rules, which may be stored at the encryption rules repository 908 and which may be associated with the file based on the file's metadata. For example, all word processing files with a particular extension may be associated with an encryption rule that states that word processing files should be encrypted at the primary storage device 960 each time the files are closed. Alternatively, the encryption rules engine 926 may determine that a file is to be encrypted in response to an action by a user or application. In some embodiments, the block 1052 may occur in response to a command from a user, application 954, or system (e.g., the storage manager 140). Alternatively, the block 1052 may occur as part of an existing process (e.g., during or at the end of a backup process to a secondary storage computing device 106 or a secondary storage device 108).

At block 1054, the encryption module 922 obtains a data encryption key. This data encryption key can include any type of symmetric key. For example, the symmetric key can be an Advanced Encryption Standard (AES) key. Further, the key may be based on a stream cipher (e.g., RC4, A5/1, etc.) or a block cipher (e.g., Blowfish, DES, etc.). In some cases, the data encryption key may be an asymmetric key. In some cases, the encryption module 922 may obtain the key by accessing a key repository and/or by accessing the encryption rules repository 908. Alternatively, the encryption module 922 may obtain the key from the storage manager 140. In some cases, the encryption module 922 may generate the data encryption key. Generally, the data encryption key is unique for a file. However, in some cases, the data encryption key may be shared among a set of files. For example, the data encryption key may be used for each file in a directory. In certain embodiments, the data encryption key may be based on the file. In other cases, the data encryption key may be generated independently of the file.

Using the data encryption key, the encryption module 922 encrypts the file at block 1056. At block 1058, the encryption module 922 accesses a public key for each user who is authorized to access the file. The encryption module 922 may determine the users who are authorized to access the file based on metadata associated with the file and/or based on users who are authorized to access the client computing device 950 and/or the primary storage 960 or a storage location thereon (e.g., a directory). Further, the encryption module 922 may access the public keys by accessing one or more of the storage locations previously described with respect to the block 1016. Although the same types of storage locations may be used to store the public keys and the encrypted private keys, the storage used to store the public keys and the private keys may or may not be the same storage. For example, the encrypted private keys may be stored in a special encrypted key store, while the corresponding public keys may be stored in an unencrypted key manager (not shown) or a location of the primary storage 960. As mentioned previously, a user may be associated with multiple asymmetric key pairs. In such cases, the block 1058 may include determining the public key of the user to access based on the file to be encrypted and/or the location of the file to be encrypted. Alternatively, or in addition, the public key may be selected based on a desired encryption level.

At block 1060, the encryption module 922 encrypts, for each user who is authorized to access the file, a copy of the data encryption key using the public key associated with the user identified or accessed at the block 1058. In some embodiments, the blocks 1058 and 1060 are optional. For example, the data encryption key used to encrypt the file may be secured using only keys associated with the client computing device 950, as described with respect to the blocks 1062-1064.

At block 1062, the encryption module 922 accesses a public key associated with the client computing device 950. As with the block 1058, the encryption module 922 may access the public key associated with the client computing device 950 by accessing one or more of the storage locations previously described with respect to the block 1016. Further, as with the user public keys, in some cases the client computing device 950 may be associated with multiple asymmetric key pairs. In such cases, the block 1062 may include determining the public key of the client computing device 950 to access at the block 1062 based on the file to be encrypted the location of the file to be encrypted and/or a desired encryption level.

At block 1064, the encryption module 922 encrypts a copy of the data encryption key using the public key identified and/or accessed at the block 1062. In some embodiments, the blocks 1062 and 1064 are optional. For example, the data encryption key used to encrypt the file may be secured using only keys associated with users, as described with respect to the blocks 1058-1060.

At block 1066, the encryption module 922 discards the data encryption key. Discarding the data encryption key may include discarding unencrypted copies of the data encryption key from the client computing device 950.

The encryption module 922 embeds each encrypted data encryption key with the encrypted file at block 1068. Embedding the encrypted data encryption keys with the file may include storing the encrypted data encryption keys with the encrypted file in a single file. In some cases, the block 1068 may include the encrypted data encryption keys with the file without embedding the keys with the file. For example, the encrypted data encryption keys may be stored with the encrypted file (e.g., in the same directory or an adjacent block of memory). In other cases, the encrypted data encryption keys may be stored in a separate location. In such cases, the encrypted data encryption keys may be associated with the encrypted file, for example, based on a relationship in a table or using any other mechanism to associate the encrypted data encryption keys with the encrypted file.

At block 1070, the encryption module 922 embeds encrypted private keys for each user and the client computing device with the encrypted file. These encrypted private keys correspond to the public keys accessed at blocks 1058 and 1062. Further, the private keys may be encrypted as previously described with respect to the process 1000. In some embodiments, the block 1070 is optional and/or omitted. For example, the encrypted private keys may be stored at the storage manager 140, at a secure store of the client computing device 950, or in any other location as previously described with respect to the block 1016.

Second Example File Backup Process

Figure 11:
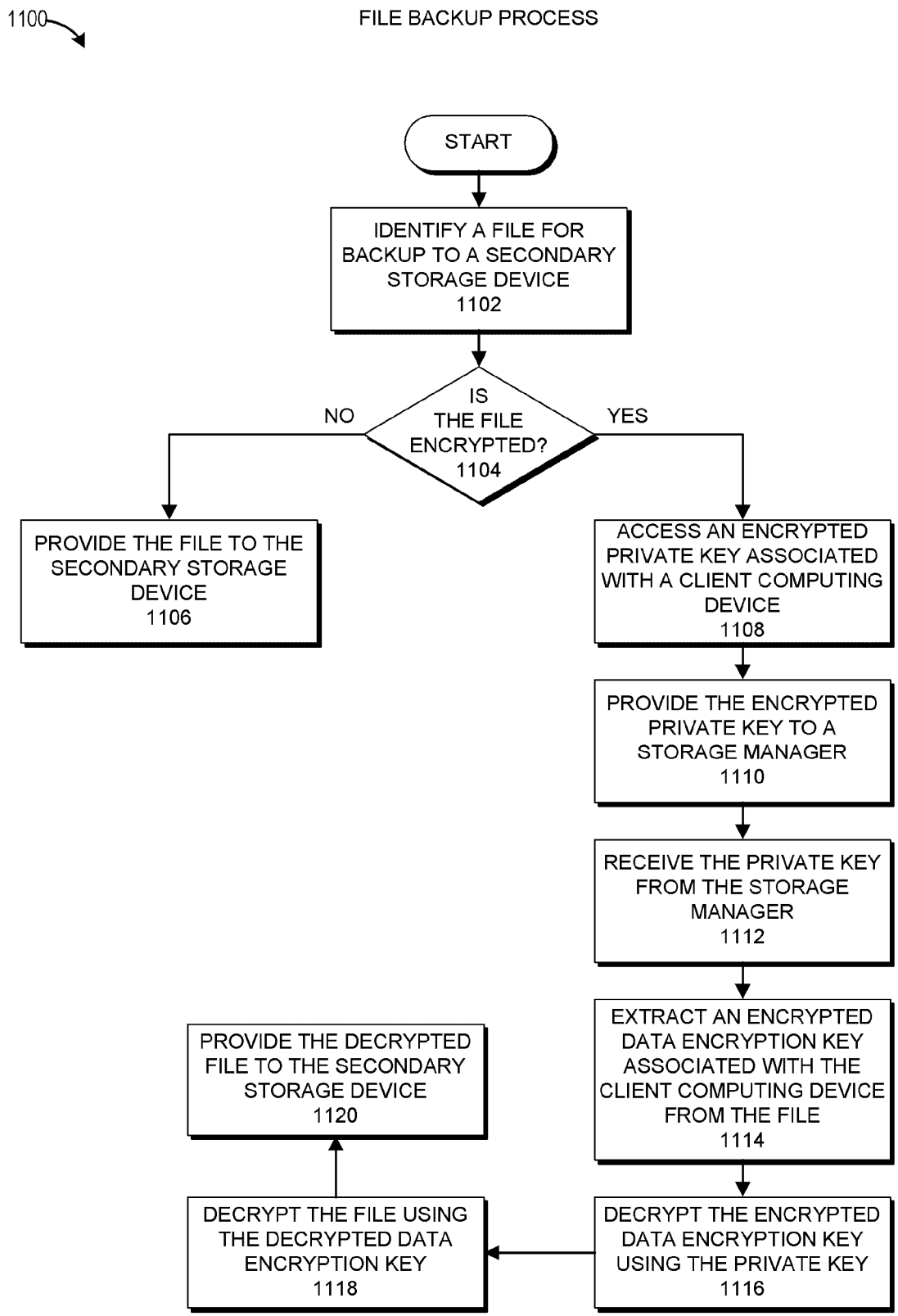
FIG. 11 illustrates a second example embodiment of a file backup process.

FIG. 11 illustrates a second example embodiment of a file backup process 1100. The process 1100 can be implemented, at least in part, by any system that can backup a file to a secondary storage device 108. For example, the process 1100, in whole or in part, can be implemented by the filter driver 204, the file system data agent 904, the secure file access module 924, the decryption module 928, the file monitor 930, and the storage manager 140, to name a few. Although any number of systems, in whole or in part, can implement the process 1100, to simplify discussion, portions of the process 1100 will be described with reference to particular systems.

As described below, the process 1100 includes decrypting an encrypted file, which may be stored at a primary storage device 960, and providing the decrypted file to a secondary storage device 108, which may or may not re-encrypt the file before storing the file. In certain embodiments, the encrypted file is decrypted as part of the process 1100 to enable single instancing. In other words, in some cases, by decrypting the file before backing up the file, the secondary storage can keep one copy of a file or data to which multiple users or computing devices may share access. Further, decrypting the file before backing it up enables deduplication at the secondary storage. In some embodiments, the process 1100 may be performed transparently and/or automatically when a user grants a backup system permission to decrypt files using the user's private key. This permission may be granted at the time that the file is protected or encrypted. Alternatively, the permission may be granted at a later time. In some cases, when the user is granting a backup system permission to backup encrypted files, the user may provide the backup system with access to the user's private key. Alternatively, in some cases, the process 1100 may be performed without the user granting permission to use the user's private key. For example, the process 1100 may be performed using the private key associated with the client computing device 950. In some such cases, the user may have previously indicated that a backup system is authorized to access one or more of the encrypted files.

The process 1100 begins at block 1102 where, for example, the file monitor 930 identifies a file for backup to a secondary storage device 108. The file may be identified for backup in response to a user command or a command from a storage manager 140. In other cases, the file may be identified for backup as part of a scheduled backup process that may occur once, or on a scheduled basis (e.g., nightly, weekly, monthly, etc.). Further, in some cases, the file may be identified for backup based on the storage location of the file in the primary storage device 960. For example, files in a particular directory may be identified or scheduled for backup.

At decision block 1104, the secure file access module 924 determines whether the file identified for backup is encrypted. If the secure file access module 924 determines that the file is not encrypted, the file system data agent 904 provides the file to the secondary storage device 108 at block 1106. Providing the file to the secondary storage device 108 may include providing the file to a media agent 144 of a secondary storage computing device 106, which can then process the file for backup storage at a secondary storage device 108. Processing the file for backup can include the secondary storage computing device 106 encrypting the file.

If at decision block 1104 the secure file access module 924 determines that the file is encrypted, the decryption module 928 accesses an encrypted private key for the file that is associated with the client computing device 950 at block 1108. Accessing the encrypted private key can include extracting the encrypted private key from the encrypted file. In other cases, the encrypted private key may be accessed from a secure storage area of the primary storage device 960.

At block 1110, the file system data agent 904 provides the encrypted private key to the storage manager 140. In some embodiments, providing the encrypted private key to the storage manager 140 includes providing an identity of the client computing device 950 to the storage manager 140. Further, in some cases, the block 1110 may include providing authentication information for a user who is accessing the client computing device 950 to the storage manager 140.

The storage manager 140 can decrypt the encrypted private key using a passphrase associated with the client computing device 950. The storage manager 140 may identity the passphrase based on the received encrypted private key and/or the identity information received from the client computing device 950. The storage manager 140 may hash the passphrase associated with the client computing device 950 and use the hashed passphrase to decrypt the encrypted private key. In some cases, the passphrase may be stored in its hashed form thereby making it unnecessary to hash the passphrase at the time of decryption of the encrypted private key for the client computing device 950.

In some embodiments, the storage manager 140 may determine whether the passphrase associated with the client computing device 950 is active. If the passphrase is active, the storage manager 140 can use the passphrase to decrypt the encrypted private key. However, if the passphrase is marked as inactive, lost, or stolen, then the storage manager 140 may reject the request to decrypt the encrypted private key. Advantageously, when a client computing device 950 has been compromised, lost, stolen, or is no longer trusted, a user (e.g., an administrator) may indicate to the storage manager 140 that requests from the client computing device 950 should no longer be accepted. In response, the storage manager 140 can mark passphrases associated with the client computing device 950 as inactive thereby preventing requests to access encrypted files from the client computing device 950 from being processed.

At block 1112, assuming the passphrase associated with the client computing device 950 is active at the storage manager 140, the file system data agent 904 receives the private key from the storage manager 140. The private key received at the block 1112 may be the decrypted version of the encrypted private key provided to the storage manager 140 at the block 1110.

The decryption module 928 extracts an encrypted data encryption key associated with the client computing device 950 from the file at block 1114. In some cases, the encrypted data encryption key is accessed from a storage location at the client computing device 950 and/or the primary storage device 960. The encrypted data encryption key may be identified by accessing a data structure, such as a table, the associates the encrypted data encryption keys with the corresponding files. Further the data structure may associate each of the encrypted data encryption keys for a file with corresponding systems and/or users.

At block 1116, the decryption module 928 decrypts the encrypted data encryption key using the private key obtained at the block 1112. The decryption module 928 then decrypts the file using the decrypted data encryption key at block 1118. The decrypted file is provided to the secondary storage device 108, or to the secondary storage computing device 106, at block 1120. In some embodiments, the block 1120 may also include deleting or discarding the decrypted data encryption key and/or private key. Further, the block 1120 may include deleting the decrypted file after it is provided to the secondary storage device 108.

In some embodiments, the process 1100 may include using a private key associated with a user instead of the private key associated with the client computing device 950. In such embodiments, block 1108 may include accessing an encrypted private key associated with a user who, for example, initiated the file backup process. Further, the blocks 1110 and 1112 may include accessing a passphrase from the user by, for example, requesting the user provide the passphrase and/or accessing the passphrase from the authentication system 906, which may have obtained the passphrase during an authentication process of the user. The passphrase may then be hashed by the decryption module 928 and used to decrypt the user's encrypted private key. At block 1114, the decryption module 928 can extract an encrypted data encryption associated with the user. This encrypted data encryption key may be decrypted at the block 1116 using the private key of the user.

The process 1100, in some embodiments, may be used for accessing the file by a user, an application, or system other than the secondary storage device 108. In such embodiments, the decrypted file is presented to the requestor of the file at the block 1120. For instance, the file may be presented to a user who is authorized to access the file. The user's authorization may be determined based, at least in part, on whether a data encryption key that was encrypted with a key associated with the user exists.

Example Client Passphrase Replacement Process

Figure 12:
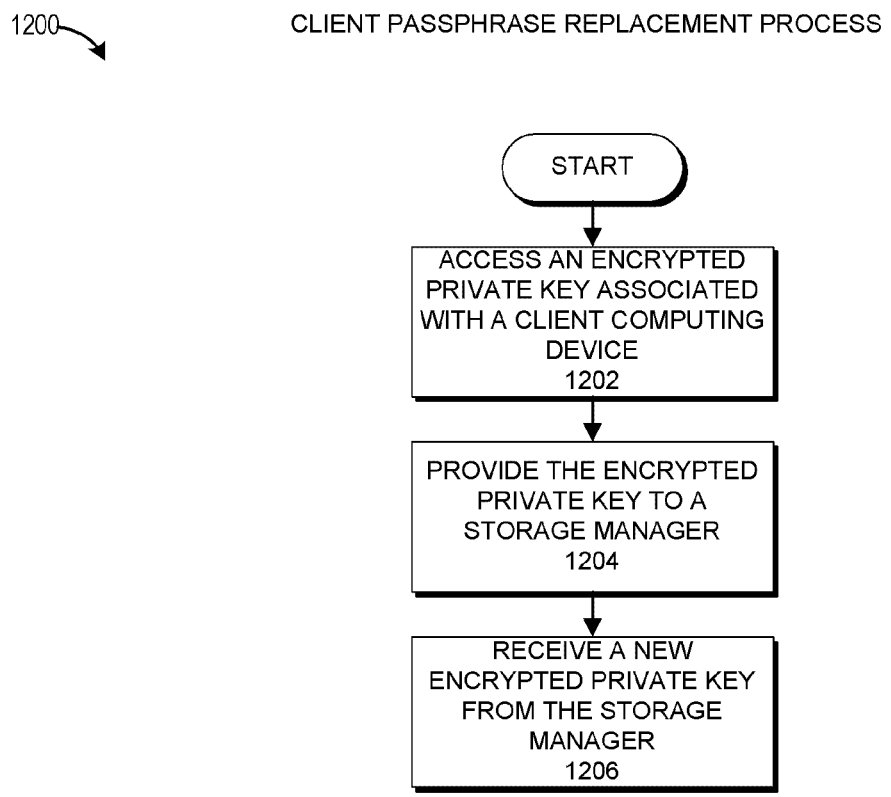
FIG. 12 illustrates an example embodiment of a client passphrase replacement process.

FIG. 12 illustrates an example embodiment of a client passphrase replacement process 1200. The process 1200 can be implemented, at least in part, by any system that can access an encrypted private key associated with or assigned to a client computing device and can replace the passphrase used to encrypt the encrypted private key. For example, the process 1200, in whole or in part, can be implemented by the filter driver 204, the file system data agent 904, the secure file access module 924, the encryption module 922, the decryption module 928, the file monitor 930, and the storage manager 140, to name a few. Although any number of systems, in whole or in part, can implement the process 1200, to simplify discussion, portions of the process 1200 will be described with reference to particular systems.

The process 1200 may be performed in response to a detected integrity breach with respect to a client computing device 950 or storage manager 140. This integrity breach may include a detected unauthorized access or an attempted unauthorized access of the client computing device 950 or storage manager 140. The unauthorized access may include an attempt, successful or otherwise, to access or decrypt a private key associated with the client computing device 950. Alternatively, or in addition, the process 1200 may be performed at a scheduled time to update or replace system passphrases for one or more client computing devices 950. Further, as will be described in more detail below, the process 1200 may be used to replace user passphrases.

The process 1200 begins at block 1202 where, for example, the file system data agent 904 accesses an encrypted private key associated with a client computing device 950. This encrypted private key may be specific to a file or set of files stored at the primary storage device 960 or accessible by the client computing device 950. Alternatively, the encrypted private key may be specific to the client computing device 950 and may be used for any file that the client computing device 950 can access.

At block 1204, the file system data agent 904 provides the encrypted private key to the storage manager 140. In some cases, the block 1204 includes providing an identity of the client computing device 950 to the storage manager 140. The storage manager 140 can decrypt the encrypted private key using a passphrase or hashed passphrase associated with the client computing device 950. The storage manager can then access a new passphrase, or can generate a new passphrase, for the client computing device 950. This new passphrase can be hashed and used to encrypt the decrypted private key to obtain an updated encrypted private key that is encrypted based on the new passphrase for the client computing device 950. The new passphrase may be assigned to the client computing device 950 and may be identified as active at the storage manager 140. The previous passphrase that was assigned to the client computing device 950 can be identified as inactive thereby preventing decryption of versions of the private key that were encrypted using the previous passphrase of the client computing device 950. In some embodiments, the block 1204 can include one or more embodiments described above with respect to the block 1110.

The file system data agent 904 receives a new encrypted private key from the storage manager 140 at block 1206. This new encrypted private key can be the updated encrypted private key created by the storage manager 140 and assigned to the client computing device 950. Using the process 1200, the passphrase of the client computing device 950 may be updated while maintaining the same asymmetric key pair for the client computing device 950. An example of an embodiment for updating the asymmetric key pair for the client computing device 950 will be described below with respect to FIG. 13.

As previously mentioned, a modified version of the process 1200 may be used to update a passphrase for a user. In such embodiments, the file system data agent 904 accesses an encrypted key associated with a user at the block 1202. In some cases, the file system data agent 904 may still provide the encrypted private key to the storage manager 140, which may obtain the user's passphrase from the user and decrypt the encrypted private key. In such cases, the storage manager 140 may also obtain a new passphrase from the user, or generate a new passphrase for the user, and encrypt the private key with the new passphrase, or a hashed version thereof, and provide the new encrypted private key to the client computing device 950.

However, in other embodiments, Instead of providing the encrypted private key to the storage manger 140, the file system data agent 904 can obtain the user's passphrase. The user may be prompted for the passphrase or the passphrase may be obtain from the authentication system 906, which may have obtained the passphrase when the user was authenticated by the authentication system 906 during, for example, a login process. The decryption module 928 may hash the passphrase and use the hashed passphrase to decrypt the encrypted private encryption key. The encryption module 922 can obtain a new passphrase for the user by, for example, prompting the user for a new passphrase. The encryption module 922 can then hash the new passphrase and use the hashed version of the new passphrase to encrypt the private key. Any unencrypted copies of the private key can be discarded. Further, the passphrase provided by the user may also be discarded.

In some embodiments, instead of decrypting an encrypted private key and using a new passphrase to re-encrypt the private key, a new asymmetric key pair may be generated for a user or a client computing device 950. In such cases, the old private key may be used to obtain access to the data encryption key. The data encryption key can then be encrypted using the new private key. The encrypted copy of the data encryption key can then be embedded or stored with the one or more files for which the data encryption key corresponds. In some implementations, instead of using the old private key to obtain access to the data encryption key, another private key may be used. For example, if the passphrase is being replaced for a user, the private key of the client computing device 950 may be used to obtain access to the data encryption key.

In some embodiments, the data encryption key encrypted with the old public key corresponding to the old private key may be discarded. In other cases, it may be left with the file, or at its storage location.

Example of a Client Key Rotation Process

Figure 13:
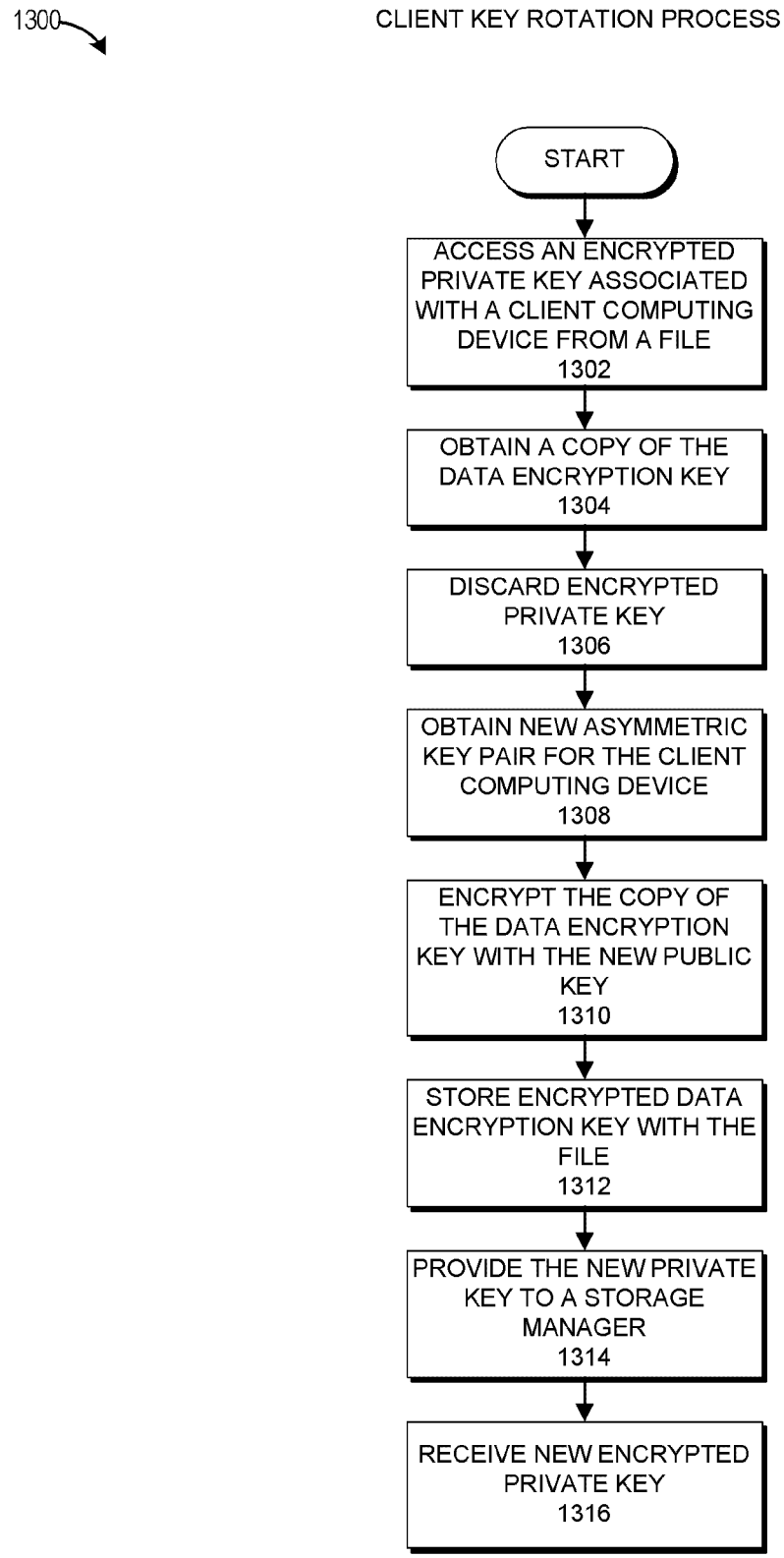
FIG. 13 illustrates an example embodiment of a client key replacement process.

FIG. 13 illustrates an example embodiment of a client key rotation and/or replacement process 1300. The process 1300 can be implemented, at least in part, by any system that can access an encrypted private key associated with or assigned to a client computing device and can replace the private key with a new private key for the client computing device as part of a process for replacing an asymmetric key pair associated with the client computing device. For example, the process 1300, in whole or in part, can be implemented by the filter driver 204, the file system data agent 904, the secure file access module 924, the encryption module 922, the decryption module 928, the file monitor 930, and the storage manager 140, to name a few. Although any number of systems, in whole or in part, can implement the process 1300, to simplify discussion, portions of the process 1300 will be described with reference to particular systems.

As with the process 1200, the process 1300 may be performed in response to a detected integrity breach with respect to a client computing device 950 or storage manager 140. This integrity breach may include a detected unauthorized access or an attempted unauthorized access of the client computing device 950 or storage manager 140. The unauthorized access may include an attempt, successful or otherwise, to access or decrypt a private key associated with the client computing device 950. Alternatively, or in addition, the process 1300 may be performed at a scheduled time to update or replace system passphrases for one or more client computing devices 950. Further, as will be described in more detail below, the process 1300 may be used to replace asymmetric keys associated with a user. Moreover, in some cases, the process 1300 can be performed in combination with the process 1200 to replace both an asymmetric key pair and a passphrase for a client computing device 950 and/or a user.

The process 1300 begins at block 1302 where, for example, the file system data agent 904 accesses an encrypted private key associated with a client computing device 950 from a file. In some embodiments, the block 1302 may include one or more embodiments described above with respect to the block 1202.

At block 1304, the file system data agent 904 obtains a copy of the data encryption key for the file. Obtaining the copy of the data encryption key may include decrypting a copy of an encrypted private key associated with the client computing device 950 and using the decrypted private key to decrypt an encrypted copy of the data encryption key as was previously described with respect to the blocks 1108-1116.

At block 1306, the file system data agent 904 discards the encrypted private key associated with the client computing device 950. Discarding the private key of the client computing device 950 can include discarding copies of the client computing device's 950 corresponding public key. In some embodiments, the block 1306 may be optional. For example, in some cases, the passphrase used to encrypt the private key may be classified as inactive at the storage manager 140 thereby causing the storage manager 140 to reject attempts to decrypt the encrypted private key.

The file system data agent 904 obtains a new asymmetric key pair for the client computing device 950 at the block 1308. As previously mentioned, the asymmetric key pairs can be obtained using an RSA scheme, or any other type of asymmetric encryption scheme. Further, in some cases, the encryption module 922 can generate the asymmetric encryption keys.

At block 1310, the encryption module 922 encrypts the copy of the data encryption key using one of the keys (e.g., a public key) from the new asymmetric key pair. The encryption module 922, at block 1312, stores the encrypted data encryption key with the file by, for example, embedding the encrypted data encryption key into the file or by storing the encrypted data encryption key in an adjacent memory block. Alternatively, the encrypted data encryption key may be stored in a designated storage area of the client computing device 950 for storing encryption keys, such as a hardware key manager or in a protected area of memory. As another alternative, the encrypted data encryption key may be stored in a designated area of the primary storage device 960.

At block 1314, the file system data agent 904 provides the second key (e.g., a private key) from the new asymmetric key pair to the storage manager 140. The storage manager 140 can encrypt the private key using a passphrase or a hashed passphrase associated with the client computing device 950. In some embodiments, the storage manager 140 may select a new passphrase for the client computing device 950 and use the new passphrase, or a hashed version thereof, to encrypt the private key. Thus, in some cases, the process 1200 may be performed in combination with the process 1300. Further, in certain embodiments, the block 1314 can include one or more of the embodiments described above with respect to the block 1204.

At block 1316, the file system data agent 904 receives the new encrypted private key from the storage manager 140. In some embodiments, the block 1316 can include one or more of the embodiments described above with respect to the block 1206.

As previously mentioned, the process 1300, or a modified version thereof, may be used to replace an asymmetric key pair for a user. In such embodiments, the encrypted private key obtained at the block 1302 is the encrypted private key for the user whose encryption keys are being replaced. Further, obtaining the copy of the data encryption key may include obtaining the user's passphrase by, for example, prompting the user for the passphrase or obtaining the passphrase from the authentication system 906 as previously described. The passphrase may then be hashed and the hashed passphrase can be used to decrypt the encrypted private key. The decrypted private key can then be used to decrypt the encrypted data encryption key associated with the user for the file to obtain the data encryption key. As with the process for replacing the asymmetric key pair of the client computing device 950, the private key of the user may be discarded and a new asymmetric key pair for the user may be obtained. One of the asymmetric keys (e.g., the public key) can be used to encrypt the copy of the data encryption key at block 1310. The encrypted data encryption key can be stored with the file at block 1312. The second asymmetric key (e.g., the private key) can be encrypted using a passphrase, or hashed passphrase, associated with the user. This may by the same passphrase for the user obtained during the process of decrypting the copy of the data encryption key at the block 1304. Alternatively, the file system data agent 904 may obtain a new passphrase for the user by, for example, prompting the user for a new passphrase.

In some embodiments, the process 1300, or a modified version thereof, may be used to provide additional users or client computing devices with access to an encrypted file. In such embodiments, the block 1302 and 1304 may be performed to obtain access to a data encryption key. However, rather than discarding an encrypted private key or obtaining a new asymmetric key pair for the client computing device 950 or a user that is associated with an existing copy of an encrypted data encryption key for the file, an asymmetric key pair is obtained or generated for a new client computing device and/or user at the block 1308. The blocks 1310-1316 may then be performed using the new asymmetric key pair for the new client computing device. Alternatively, the process described in the previous paragraph with respect to the blocks 1310-1316 may be used to encrypt a copy of the data encryption key and the private key for the new user.

To remove authorization to access a file for a client computing device and/or for a user, the file system data agent 904 can obtain or extract the encrypted copy of the data encryption key for the file corresponding to the client computing device or user whose authorization to access the file is being removed. This encryption copy of the data encryption key can then be deleted or discarded thereby preventing the client computing device or user from being able to obtain a decrypted version of the data encryption key for the file.

In certain embodiments, a new asymmetric key pair may be selected for the client computing device 950 using, for example, the process associated with the block 1308. However, a data key for a file may not be encrypted with the new private key of the new asymmetric key pair until the file is accessed by a user, or a system in the performance of an operation, such as a backup process. For example, a new asymmetric key pair may be selected for the client computing device 950 at a time X. At some later time Y, a file may be accessed using an old private key of the client computing device 950 associated with an older asymmetric key pair. After the data encryption key is obtained for the file, it may be reencrypted using the new public key of the new asymmetric key pair. The new private key can then be provided to the storage manger 140 for encryption using the client computing device's passphrase or hashed passphrase.

It is possible to rotate the asymmetric keys at some time subsequent to the replacement of the asymmetric key pairs because, for example, the storage manager 140 can maintain the passphrase of the client computing device 950, even if the passphrase has been updated. Thus, for example, if a new asymmetric key pair is assigned to the client computing device 950 and a new passphrase is generated for the client computing device 950 to encrypt or obfuscate the private key of the new asymmetric key pair, the old passphrase may still be used to access the old private key at the time that a file is first accessed subsequent to the client computing device 950 being associated with a new asymmetric key pair. Once the data encryption key is extracted using the old asymmetric key pair, it can by protected using the new asymmetric key pair. In some cases, if there are no other files with data encryption keys that were secured using the old asymmetric key pair, the old asymmetric key pair can then be discarded.

Alternatively, in some embodiments, the data encryption keys for a set of files may be reencrypted using the new asymmetric key pair for the client computing device 950 as part of a background and/or low-priority process. For instance, when the client computing device 950 is idle, or not being accessed by a user, files stored on the primary storage device 960 may be accessed to rotate the client computing device's 950 asymmetric key pair using, for example the process 1300.

Third Example Client Computing Environment

Figure 14:
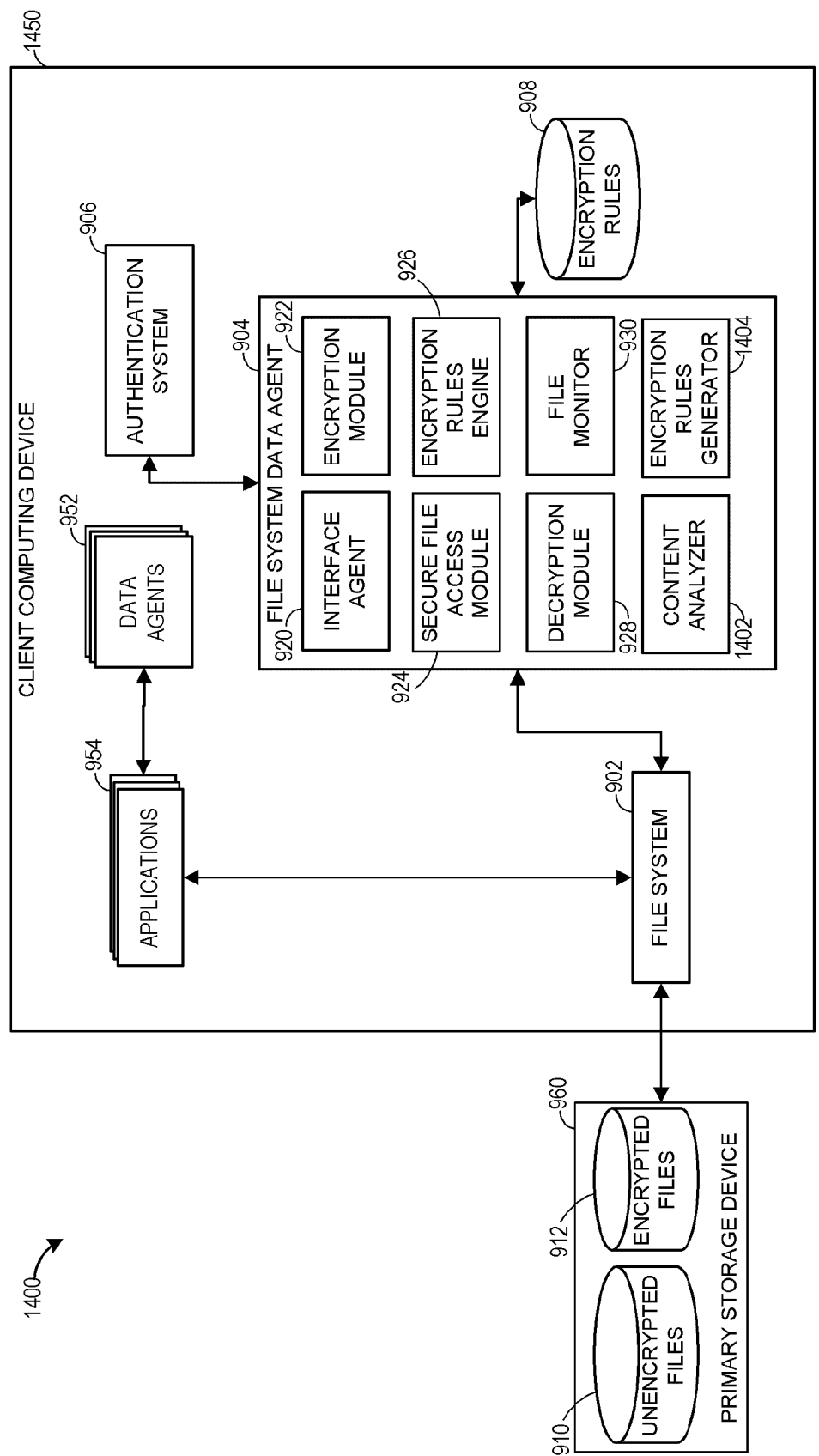
FIG. 14 is a block diagram illustrating a third example of a client computing environment including a client computing device and a primary storage device.

FIG. 14 is a block diagram illustrating a third example of a client computing environment 1400 including a client computing device 1450 and a primary storage device 960. The client computing device 1450 can include at least some of the same systems previously described with respect to FIG. 9, as indicated by shared reference numerals. However, in addition to the features and embodiments described with respect to FIG. 9, the file system data agent 904 of the client computing device 1450 can include a content analyzer 1402 and an encryption rules generator 1404.

The content analyzer 1402 can include any system that can analyze a file to determine whether the file includes sensitive information, which can include any information that is to be designated for encryption. Analyzing the file can include performing one or more data mining and/or natural language processing algorithms with respect to the file. Further, analyzing the file can include breaking up or dividing the file into a number of constituent portions. These constituent portions can be referred to as tokens or data tokens and represent data within the file. The data tokens are described in more detail below with respect to FIG. 15.

The sensitive information can include information or data that is to be stored in an encrypted format. Determining whether the file includes sensitive information may include determining whether one or more of the data tokens extracted by the content analyzer 1402 include sensitive information. The determination of whether a data token includes sensitive information may include determining the type of data included in the data token and comparing the determined type of data to a list of data types that are identified as sensitive. For example, if the data token includes a social security number (SSN), and SSN is a type of data identified as sensitive, then the data token may be identified as including sensitive information. Consequently, the file from which the data token was extracted may be identified as sensitive.

In addition to analyzing a file to determine whether it includes sensitive information, the content analyzer 1402 may be used in conjunction with an encryption rules generator 1404 to automatically generate a set of encryption rules for determining whether to encrypt a file. In such embodiments, the content analyzer 1402 may analyze a number of files, which may be identified for training the system, and determine data tokens for each of these training files. The encryption rules generator 1404 may then determine a set of encryption rules based on the data tokens for the training files for identifying files that include sensitive information.

The encryption rules may identify a type of data token or a combination of types of data tokens. When a file under analysis includes data tokens of the type or types included in the encryption rule, the file may be considered as a file to be encrypted. Further, the encryption rule may also include context information indicating when to encrypt a file as well as the type of encryption algorithms to use. Further, the encryption rule may identify which encryption keys to use to encrypt the files that satisfy the encryption rule.

In some cases, the encryption rule generation process may include comparing the data tokens to an identified set of sensitive terms or types of data. Alternatively, or in addition, the encryption rules generator may look for data tokens that are shared by a number or percentage of training files to determine encryption rules for identifying files that include sensitive information. This determination may be made regardless of whether the shared data tokens are included in a list of sensitive information or data types.

Using the generated encryption rules, which may be stored at an encryption rules repository (e.g., the encryption rules repository 908), the encryption rules engine 926 can determine whether a file includes sensitive information. In some cases, the determination is a probability made with a degree of certainty based at least in part on matching data tokens extracted by the content analyzer 1402 with the set of encryption rules generated by the encryption rules generator 1404.

Example Encryption Rules Generation Process

Figure 15:
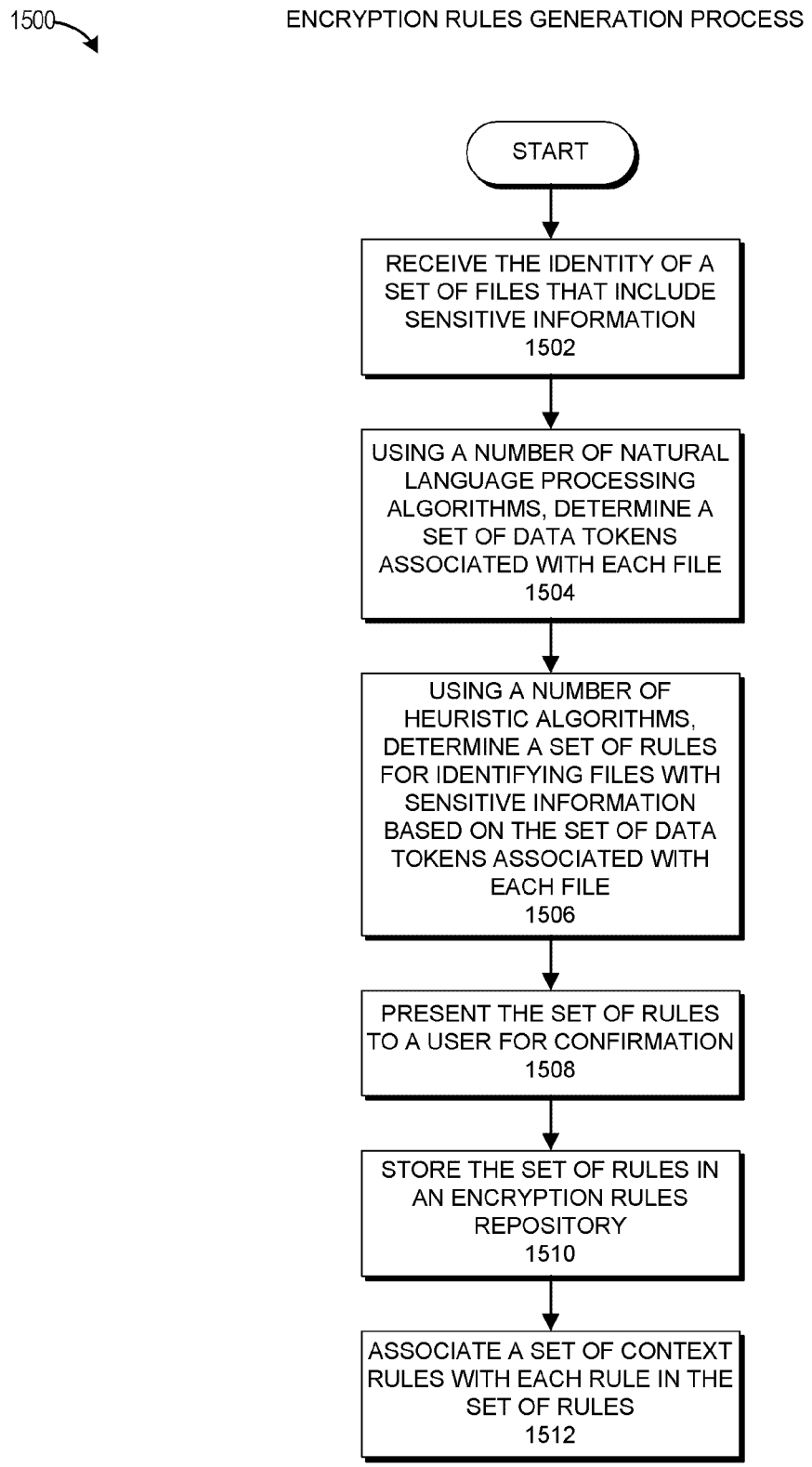
FIG. 15 illustrates an example embodiment of an encryption rules generation process.

FIG. 15 illustrates an example embodiment of an encryption rules generation process 1500. The process 1500 can be implemented, at least in part, by any system that can automatically generate a set of rules for determining whether a file is to be encrypted based on the content of the file or the data included in the file. For example, the process 1500, in whole or in part, can be implemented by the file system data agent 904, the content analyzer 1402, the encryption rules generator 1404, and the encryption module 922, to name a few. Although any number of systems, in whole or in part, can implement the process 1500, to simplify discussion, portions of the process 1500 will be described with reference to particular systems.

The process 1500 begins at block 1502 where, for example, the content analyzer 1402 receives the identity of a set of files that include sensitive information. The files may be identified by a user (e.g., an administrator) or may be located in a particular directory or location for storing files that include sensitive information. In some cases, the files may be files generated by an entity's workflow over a period of time. In other cases, the files may be files specifically generated for training or encryption rules generation. In either set of cases, the set of files may be termed "training files."

As previously stated, the sensitive information can include information or data that is to be stored in an encrypted format. The sensitive information can include any type of information that an entity has determined should be kept in an encrypted format. In some cases, the entity may include a business or other organization that generated or works with the data. In other cases, the entity may refer to a third-party entity (e.g., a partner entity of the entity, a government organization, or customers) that requires the data to be stored in an encrypted format. In some cases, a file in its entirety may be considered to store sensitive information, but in other cases, only a portion of the file may include sensitive information.

The set of files received at the block 1502 may be associated with a specific computing system, server system, or client system for the purposes of generating encryption rules. In such cases, encryption rules generated using the process 1500 may be specific to the particular computing system. However, in other cases, the set of files received at the block 1502 may be used to generate encryption rules for a set of computing systems, which may be a subset of computing systems of an entity or may include an entity's entire computing infrastructure.

At block 1504, the content analyzer 1402 uses a number of natural language processing algorithms to determine a set of data tokens associated with each file received at the block 1502. These natural language processing algorithms can include performing a number of tasks or processes relating to natural language processing including, for example, automatic summarization, coreference resolution, discourse analysis, machine translation, morphological segmentation, named entity recognition, natural language understanding, optical character recognition, part-of-speech tagging, parsing, relationship extraction, sentence boundary disambiguation, sentiment analysis, topic segmentation and recognition, word segmentation, word sense disambiguation, singular value decomposition, latent semantic analysis, latent Dirichlet allocation, pachinko allocation, and probabilistic latent semantic analysis.

In some embodiments, the natural language processing algorithms used may vary based on the content being analyzed. For example, a file system data file, which may lack context information associated with users, may be processed using one set of natural language processing tools. But an email, which has context information relating to the sender and the recipient(s) of the email may be processed using different natural language processing tools that may be able to use the context information to help process the file. For instance, if the sender and recipient(s) work in the accounting department, numbers may be treated differently than if the sender and recipient(s) are a user and the user's family members. In the first case, numbers included in the email may be assumed to be financial data for an employer, but in a second case, the numbers may be treated differently (e.g., quantities for a shopping list).

Further, the block 1504 may include dividing each file into a number of portions. Each of these portions can correspond to a data token. The portions or data tokens may be of varying sizes depending on the information included in the file. For example, in some cases, a portion of the file may be a word, a number of words, a sentence, a paragraph, a page, a sequence of characters or numbers (e.g., a Social Security number, a credit card number, a confirmation code, etc.), etc. In some cases, the content analyzer 1402 may use stop words to facilitate defining the portion of the file. Further, the content analyzer 1402 may use tonal words to determine the context of a data token.

Although the data tokens may include the actual data in the file, often the data token corresponds to the type of data in the portion of the file. For example, the data token may be SSN, salary, design drawing, and the like rather than the number representative of the SSN or salary, or the drawing representative of the design drawing.

However, in some cases, the data token will include the data or may include the data and the type of data. In some such cases, the data token includes some data, and a heuristic algorithm is used to determine with a particular probability the type of data. For instance, the algorithm may determine that a portion of a file with a series of alphanumeric characters and then a set of 9 numeric digits represents a name followed by a social security number. In some cases, the heuristic algorithm may use additional context information to increase or decrease the probability that the data token represents a name followed by a SSN. For example, if the file is located in a particular directory, or is created and/or accessed by particular users, it may be more likely that the data token is a name followed by a SSN than if the file is located elsewhere or accessed by a different set of users.

At block 1506, the encryption rules generator 1404 uses a number of heuristic algorithms to determine a set of rules for identifying files with sensitive information. The determination may be based on the set of data tokens associated with each file that is determined at the block 1504. The heuristic algorithms can include performing pattern recognition to determine a pattern associated with a particular type of file. For instance, the block 1506 can identify a pattern in the data tokens determined at the block 1504 and associate the pattern with a particular type of file specified by a user. For instance, if the user provides a set of files that are identified as financial files, the encryption rules generator 1404 can associate the determined pattern with financial files, which may be identified as files to be encrypted or protected. For example, if each of the set of files identified as financial files include a number of line items ending with a currency denomination and a number, the encryption rules generator 1404 may determine that files with data tokens that include line items, currency denominations, and a number following the currency denomination are likely to be financial files that should be protected. In other words, when a file is identified that includes the same or a similar pattern of data tokens as the financial files, the file can be classified as a financial file and/or a file to be protected.

In some cases, the heuristic algorithm may include generating a prospective encryption rule based on the set of data tokens for each file. The heuristic algorithm may further include performing the prospective encryption rule with respect to the set of files identified at the block 1502.

The heuristic algorithms may be applied separately to the set of data tokens generated for each file. A prospective encryption rule can be generated based on each file. In some cases, the prospective encryption rules for the set of files are aggregated or combined to generate some number of prospective encryption rules less than the initial number of encryption rules. The prospective encryption rules may be combined based on the percentage of overlapping data tokens between files or in each encryption rule. For instance, each prospective encryption rule that includes 75% of the same data tokens, or type of data tokens, may be combined to create a new prospective encryption rule. In some cases, the prospective encryption rules may include matching not just data tokens, but the particular sequence or patterns of data tokens. Moreover, the matching of data tokens may refer to the matching of types of data tokens instead of or in addition to the content of the data token. The types of data tokens may refer to the data type, such as character, number, word, image, or the type of data, such as addresses, social security numbers, monetary values, credit card numbers, design drawings, etc.

Alternatively, the heuristic algorithms may be applied to a cumulative set of data tokens generated for the set of files. In such cases, a single prospective encryption rule may be generated for a set of training files.

Encryption rules generator 1404 may determine the percentage or number of files that are identified for encryption using the prospective encryption rule. If the number or percentage of files identified for encryption satisfies or exceeds a threshold, the process 1500 may continue processing the prospective encryption rule as will be described in more detail below. However, if the number or percentage of files identified for encryption does not satisfy or exceed the threshold, the prospective encryption rule may be iteratively modified until the number or percentage of files identified for encryption satisfies the threshold. The threshold may be determined by a user (e.g., an administrator) and may be adjusted over time by the user and/or based on the number of false positives or negatives identified by using the generated encryption rules.

In some embodiments, the data tokens determined at the block 1504 may be filtered to remove data tokens of a type that are identified as not sensitive. In some cases, the filtering may be done automatically by comparing the identified types of data tokens with a "white list" of data token types that are not sensitive (e.g., employee work phone numbers). Alternatively, or in addition, a user (e.g., an administrator) may manually filter out data tokens that are of a non-sensitive type.

The prospective encryption rules determined at the block 1506 may be presented to a user (e.g., an administrator) for confirmation at the block 1508. The block 1508 may include receiving confirmation of the prospective encryption rules and/or modifications to the prospective encryption rules. In some implementations, the block 1508 may be omitted or optional.

At block 1510, the prospective encryption rules that do satisfy the threshold and/or that are approved by the user are stored at an encryption rules repository 908. In some cases, the block 1510 may include associating the prospective encryption rules for identifying files to be encrypted with particular encryption algorithms for encrypting the files identified by the application of the encryption rule.

Optionally, at block 1512, the encryption rules generator 1404 may associate a set of context rules with each encryption rule. In some cases the context rules may be specified by a user and may include, for example, a geographic and/or network location of a computing device, a type of a computing device, an identity of a user accessing or attempting to access a file that may be identified by performing the encryption rule, or a department associated with the user within an entity (e.g., the accounting department). For instance, in some cases, a file may be identified for encryption by the encryption rule when a device accessing the file is determined to be external to a building associated with an entity. However, continuing the example, the encryption rule may not identify the file for encryption when the device accessing the file is determined to be internal to the building associated with the entity.

In some cases, the set of context rules may also include context of use conditions. For example, a file that is being accessed and/or modified by a user may not be identified by a particular encryption rule for encryption. However, if the file is accessed for copying to another device or for backup, the encryption rule may identify the file for encryption.

It should be understood that the process 1500 may be repeated for different sets of files. For example, a first set of files may be provided at the block 1502 for generating a first encryption rule and a second set of files may be provided for generating a second encryption rule. Further, in some embodiments, the block 1502 may include receiving a first set of files identified as including sensitive information and a second set of files identified as not including sensitive information. The heuristic algorithms applied at the block 1506 may then be modified to generate prospective encryption rules that identify a first threshold percentage or number of files with sensitive information for encryption and less than a second threshold or number of files without sensitive information for encryption.

As stated above, generally each portion of the file corresponds to a single data token. Further, each data token typically corresponds to a unique portion of the file. However, in some cases, data tokens may be partially overlapping. In other words, in some cases, at least a portion of the information included in one data token may also be included in another data token. Advantageously, in certain embodiments, by overlapping data tokens it is possible to use varying contexts to determine if a data token corresponds to sensitive data. For example, if one set of data tokens includes a number of names, set of data tokens may not be identified as sensitive. However, a second set of data tokens that includes the names as well as a set of nine digit numbers may be considered sensitive data as the set of nine digit numbers could possibly be Social Security numbers.

With some files, it is possible for there to exist a number of duplicate data tokens for a particular file. Often it is sufficient for a file to include one data token that include sensitive data for the file to be identified as sensitive and to be included with a set of files for encryption. Thus, in such cases, the duplicate data tokens may be filtered from the set of data tokens determined at the block 1504. However, in some cases, certain files may be considered more sensitive than other files and may be treated differently. For example, a first set of sensitive files may be encrypted using one algorithm and a second set of sensitive files is considered more sensitive than the first set of sensitive files may be encrypted using another algorithm or maybe twice encrypted. Thus, in such cases, the duplicate data tokens may not be filtered from the set of data tokens. Further, a count may be maintained from the number of data tokens that include sensitive information.

The encryption rules generated using the process 1500 may be used to determine whether a file is to be encrypted when the file is stored at the primary storage device 960.

Alternatively, or in addition, the encryption rules may be used to determine whether to encrypt a file before or as part of a backup storage process to a secondary storage system.

Example Content-Based Encryption Process

Figure 16:
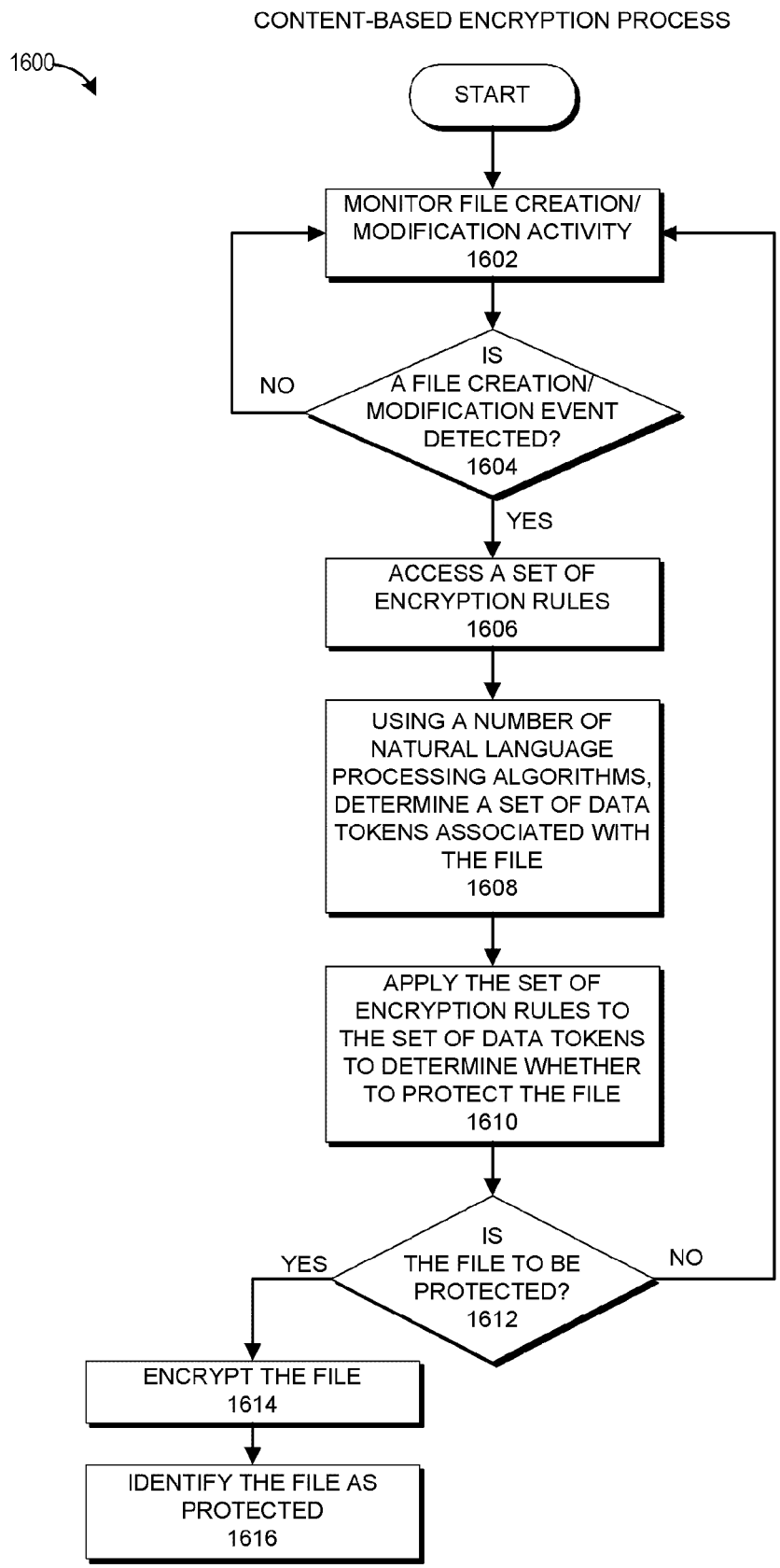
FIG. 16 illustrates an example embodiment of a content-based encryption process.

FIG. 16 illustrates an example embodiment of a content-based encryption process. The process 1600 can be implemented, at least in part, by any system that can automatically determine whether to encrypt a file based on the content of the file without receiving input from a user. For example, the process 1600, in whole or in part, can be implemented by the file system data agent 904, the content analyzer 1402, the encryption rules generator 1404, the encryption rules engine 926, file monitor 930, and the encryption module 922, to name a few. Although any number of systems, in whole or in part, can implement the process 1600, to simplify discussion, portions of the process 1600 will be described with reference to particular systems.

The process 1600 begins at block 1602 where, for example, the file monitor 930 monitors file creation or modification activity. This file creation or modification activity can include the creation of a new file, the copying of a file to create a new instance of the file, write activity for modifying the file, or any other activity that results in the creation of a file or the modification of a file. The block 1602 may also include one or more of the embodiments described with respect to the block 302. For example, the block 1602 may include monitoring of file activity at the primary storage device 960 or at another storage device accessible by the client computing device 1450.

At decision block 1604, the file monitor 930 determines whether a file creation or modification event is detected. If such an event is not detected, the file monitor 930 continues to monitor activity at the block 1602. If a file creation or modification event is detected, the encryption rules engine 926 accesses a set of encryption rules from, for example, the encryption rules repository 908 at the block 1606.

At block 1608, the content analyzer 1402 uses a number of natural language processing algorithms to determine a set of data tokens for the file associated with the file creation or modification event detected at the decision block 1604. The block 1608 may include one or more of the embodiments described with respect to the block 1504.

The encryption rules engine 926 applies the set of encryption rules to the set of data tokens to determine whether to protect the file at block 1610. In certain implementations, the encryption rules engine 926 may identify the encryption rule to apply by performing a pattern recognition process using the set of data tokens determined at the block 1608. The encryption rules engine 926 may match the data tokens, or a subset of the data tokens, to patterns associated with particular types of files. If the pattern of data tokens matches a pattern associated with a particular file type that is also associated with an encryption rule, then the encryption rules engine 926 may apply the identified encryption rule to the file to determine whether the file is to be protected. Applying the identified encryption rule may include comparing a set of keywords or identified tokens included in the encryption rule, to the set of data tokens associated with the file. If the set of data tokens for the file include a threshold number of percentage of data tokens that match the keywords or data tokens included in the encryption rule, then the file may be identified for protection as discussed below.

In some cases, the block 1610 may include identifying a subset of encryption rules to apply to the set of data tokens based on context rules associated with each of the encryption rules and the applicable context of the file. The context rules may be based on a number of factors including a file type, the user, a file location (e.g., directory), geographic and/or network location of the client computing device 1450, the type of file creation or modification event, and the like. For example, if it is determined that the client computing device 1450 is located in a public space (e.g., a geographic and/or network location not controlled by an entity that owns the client computing device 1450) then a different encryption rule may be applied to the file that if the client computing device 1450 is located in the building controlled by an entity that owns the client computing device 1450.

At decision block 1612, encryption rules engine 926 determines if the file is to be protected based at least in part on the result of the application of the set of encryption rules at the block 1610. In some embodiments, the process 1600 may include requesting that a user (e.g., an administrator) confirm whether the file is to be protected. Advantageously, in certain embodiments, by requesting that a user confirm the results of the application of the encryption rules on the file, the encryption rules can be improved or made more accurate over time. For example, the user indicates that the determination of the encryption rules engine 926 is inaccurate, the file can be added to the set of files used to generate the encryption rules. The process 1500 can then be repeated with the updated set of training files. In some cases, the process 1500 is not repeated in its entirety, but instead one or more encryption rules that generated a contrary result to the user's indication of the status of the file (e.g., protected or unprotected) may be regenerated or modified based on the addition of the file to the set of training files.

If it is determined at the decision block 1612 that the file is not to be protected the process returns to the block 1602 where the file monitor 930 continues to monitor file creation and/or modification activity. If the encryption rules engine 926 determines that the file is to be protected, encryption module 922 encrypts the file at the block 1614. Encrypting the file can include performing the encryption processes described herein. For example, encrypting the file can include performing the process 1050 described above with respect to the FIG. 10B.

In some cases, encrypting the file at the block 1614 may include performing a second encryption process for a file that is already encrypted. For example, a user may encrypt the file using an encryption key included in a certificate associated with the user. However, continuing the example, if it is determined that the file should be protected using the process 1600, the encryption module 922 may encrypt the encrypted file using an encryption key included in a certificate associated with an entity that employs the user or owns the information in the file. Similarly, if an attempt is made by an authorized user and/or device to access the protected file after it is encrypted, the file may be decrypted using an encryption key included in the certificate, which may be a different key if the encryption uses asymmetric keys, or the same key if the encryption uses symmetric keys.

In some embodiments, the block 1614 is performed during particular contexts, but not during other contexts. For example, the block 1614 may be performed when a file is copied, but not when the file is accessed for viewing or reading. As a second example, the block 1614 may be performed when the client computing device 1450 leaves a particular geographic area, but not when the client computing device 1450 remains the particular geographic area. Performing context-based encryption is described in more detail below with respect to FIG. 17.

Optionally, the encryption rules engine 926 may identify or tag the file as protected at the block 1616. The file may be identified as protected by, for example, tagging or labeling the file, or by modifying the name or an icon associated with the file. In some embodiments, the block 1616 may be superfluous because it can be determined that the file is protected based on whether the file is encrypted. However, in some embodiments, determining whether the file is encrypted may not be sufficient for determining that the file has been identified as protected. For example, if a user encrypts the file, then it may not be possible to determine the file was identified as protected using the process 1600. As another example, a file that is identified as protected may in some cases be kept unencrypted based on a context associated with the file. For instance the file may be encrypted when accessed on a personal or mobile device, but may be kept in the clear on a server located at a facility of an entity that controls file.

In some embodiments, a file that is identified as protected may be associated with restricted access settings. For example, a file that is identified as protected may be accessible for viewing, the may be prevented from being copied. In such cases, a user may access the file using, for example, an email application and a message may be presented to the user informing the user that the file is protected and cannot be copied or shared. However, the user may still be able to access the file for reading via a word processing application, but may still not be prevented from saving the file in a location external to the device storing the copy of the file accessed by the user.

In some embodiments, if a file creation or modification event is detected at the decision block 1604, the file may be provided to a server (not shown) or other computing system that performs some or all of the remainder of the process 1600. For example, a protected data server may receive the file and make the determination that the file is to be protected. The server may then encrypt the file, or label it as protected and provide the labelled file to the client computing device 1450 for encryption or further processing.

In an example use case, a file is determined to have been created or modified at the decision block 1604. The encryption rules engine 926 accesses a set of encryption rules at the block 1606. Further, the content analyzer 1402 uses one or more natural language processing algorithms to device the file into a set of data tokens that each include a portion of the file. The data tokens may each be unique or may be overlapping, at least in part.

The natural language processing algorithms may include identifying and removing a set of stop words (e.g., articles, linking verbs, infinitives, etc.). In some cases, the set of stop words can include a set of words identified by a user (e.g., an administrator) and in some cases, may include application or entity-specific sets of words. For example, one entity may include a set of colors in the set of stop words as these words may be deemed unimportant for content analysis, but another entity (such as a fashion design entity) may not include the set of colors in the set of stop words.

Further the natural language processing algorithms may include parsing the file into word or phrase-based tokens and determining topics related to each of the data tokens. Moreover, word sense disambiguation may be performed to determine the meaning of words in given contexts. In some cases, the natural language processing algorithms may be repeated on an iterative basis to adjust the data token identification based on the result of applying the encryption rules. In particular, the natural language processing may be repeated if the encryption rules engine 926 cannot determine with a degree of certainty whether the file satisfies one or more of the encryption rules.

Continuing the above example, the result of the natural language processing algorithms may include the formation of a set of data tokens that include social security numbers, credit card numbers, and account numbers with the entity that owns the file. Although in some cases these data tokens may be directly applied to the encryption rules, in other cases, the data tokens may first be categorized (e.g., SSN, credit card data, entity account number) and the data token categories may be applied to the encryption rules.

In this particular use case example, the data token types are compared to data token types included on a list of data token types for each encryption rule. It may then be determined that the data token types match those included on the list of data token types for one of the encryption rules. As such, the file is identified at the decision block 1612 as a file to be protected. The file may then be encrypted at block 1614 and the file may be identified or marked as protected at the block 1616. Marking the file as protected may include tagging the file and/or marking the file in an index or other data structure as protected.

In some embodiments, breaking up a file into a set of data tokens can speed up determining whether to encrypt a file. For example, some encryption rules may identify a file as including sensitive information if a single data token is identified as including sensitive information. Thus, in such cases, upon the identification of a single data token including sensitive information or being of a type that includes sensitive information, processing of the file to determine whether it includes sensitive information can cease. Therefore, the processing time of files to determine whether they include sensitive information can in some cases be reduced. Although not limited to large files, the reduced processing time may particularly occur with respect to large files (e.g., 500 MB, 1 GB, 10 GB files, etc.).

Example Context-Based Encryption Process

Figure 17:
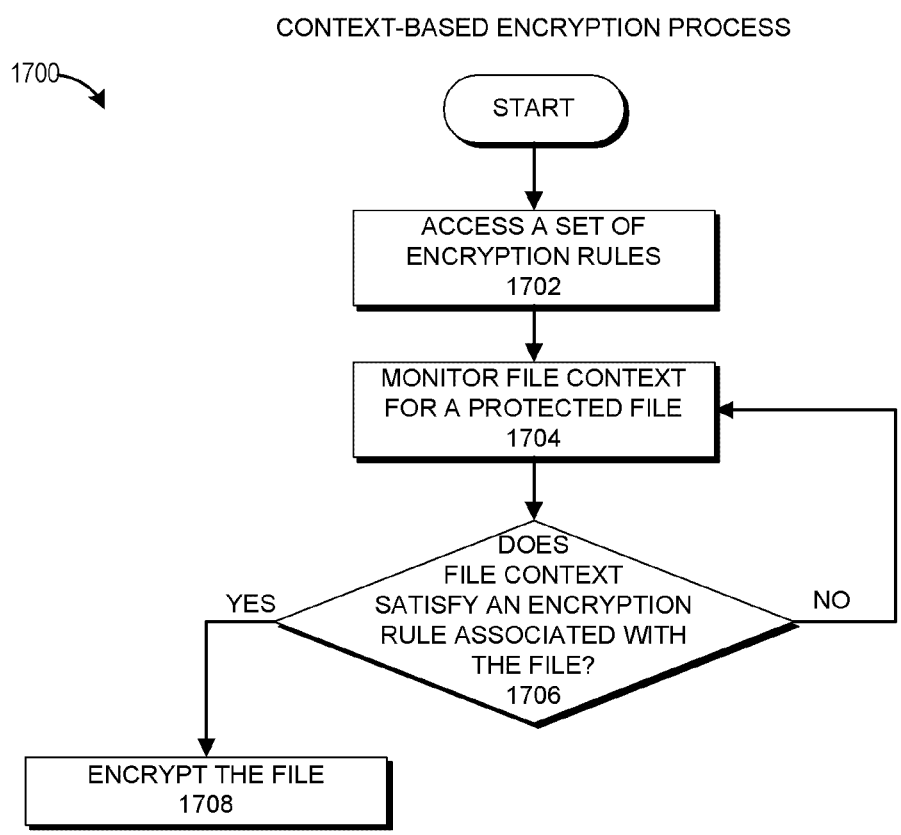
FIG. 17 illustrates an example embodiment of a context-based encryption process.

FIG. 17 illustrates an example embodiment of a context-based encryption process. The process 1700 can be implemented, at least in part, by any system that can determine whether to encrypt a protected file based on a context associated with the protected file. For example, the process 1700, in whole or in part, can be implemented by the file system data agent 904, the content analyzer 1402, the encryption rules generator 1404, the encryption rules engine 926, file monitor 930, and the encryption module 922, to name a few. Although any number of systems, in whole or in part, can implement the process 1700, to simplify discussion, portions of the process 1700 will be described with reference to particular systems.

The process 1700 begins at block 1702 where, for example, the encryption rules engine 926 accesses a set of encryption rules from, for example, the encryption rules repository 908. Typically, the set of encryption rules are a subset of encryption rules that were applied during performance of the process 1600 to determine that a file is to be protected. Further, the subset of encryption rules may each be associated with one or more contexts. When a context associated with a particular encryption rule is satisfied by the protected file, the protected file may be identified for encryption. The context may include a geographic and/or network location of a client computing device 1450 accessing the file, a geographic and/or network location of a primary storage device 960 with a copy of the file, a user accessing the file, the type of access event associated with the file (e.g., read, write, copy, move, etc.), and the like.

At block 1704, the file monitor 930 monitors the file context for a protected file. Monitoring the file context of the protected file can include monitoring which user or users access the file, the geographic and/or network location of the computing device accessing the file, the type of computing device accessing the file, and the type of file access. Further, in some cases, monitoring the file context may include monitoring the context of the device storing the file, regardless of whether the file is being accessed. For instance, the geographic location of the client computing device 1450 may be monitored using GPS technology or some other appropriate mechanism.

At the decision block 1706, encryption rules engine 926 determines whether the file context satisfies an encryption rule associated with the file. Generally, although not necessarily, the encryption rules associated with the file is the encryption rule that designated the file as a protected file. If the file context does not satisfy the encryption rule associated with the file, then the process 1700 may return to block 1704 to continue to monitor the file context.

If the encryption rules engine 926 determines that the decision block 1706 that the file context does satisfy the encryption rule, encryption module 922 encrypts the file at block 1708. Generally the encryption occurs automatically without input from a user. However, in some cases, the user may be informed that the file is being encrypted. Informing the user that the file is being encrypted can include informing the user as to why the file is being encrypted (e.g., because the user is accessing a file from a public location). Although typically a user cannot override the decision to encrypt the file, in some cases some users, such as an administrator, can override the decision file.

As an example use case, suppose that the set of encryption rules accessed at the block 1702 indicate that protected files, or a particular category of protected files (e.g., accounting files with sensitive information), accessed by a computing device located outside of an entity's local area network should always be encrypted. At block 1704, the file monitor 930 monitors the network location of the computing devices accessing the protected files. If a particular computing device accessing one of the protected files is outside of the entity's local area network, the file access may be denied or the file may only be accessed in its encrypted form.

As a second example use case, suppose that the set of encryption rules accessed at the block 1702 indicate that protected files accessed by a mobile device should be denied. At block 1704, the file monitor 930 monitors the device type of devices attempting to access the protected files. If a particular computing device attempting to access one of the protected files is a wireless device, the file may be encrypted at the block 1708 and/or file access may be denied.

In some embodiments, the process 1700 may be modified to monitor and control access to a file based on the file context. In such embodiments, the file monitor 930 monitors file access commands for a protected file as described, for example, with respect to the block 1704. These file access commands can include file write, file read, file copy, file move, file delete, etc. In some cases, detecting a file access command can include detecting an application attempting to access the protected file. Upon detecting a file access command with respect to a protected file, the file monitor 930 or a secure file access module 924 can determine whether a context associated with the protected file and with a particular encryption rule is satisfied. As previously described, the context can include an identity of the user accessing the file, an organization or department associated with the user, a geographic or network location of the computing device accessing the file, a time of day or day of the week, and, in some cases, an application accessing the file.

If the context is satisfied, the secure file access module 924 can enable execution of the file access command or prevent access of the file access command based on the encryption rule designating the file as a protected file. For example, suppose the application accessing the file is an email application and the user accessing the file is not a department head. If this file context matches a file context of a particular encryption rule that designates protected files to remain encrypted within the file context, the secure file access module 924 may reject the file access command or prevent the file access command from being performed. As a second example, suppose the application accessing the file is a pdf viewer and the geographic location (e.g., a coffee shop, a user's house, etc.) of the device accessing the file is external to a building of an entity (e.g., a defense company, an investment firm, etc.) that owns the file. If this file context matches a file context of a particular encryption rule that designates protected files as viewable, but not transferable, a file read command may be performed, but a file write or file copy command may not be performed.

If a particular encryption command indicates the file context for a particular protected file permits the performance or execution of a particular file access command (e.g., a file read, file write, file copy, file delete, etc.), the secure file access module 924 may perform or permit performance of the particular file access command. If necessary (e.g., the file is encrypted and the file access command is a file read), performing the particular file access command may include decrypting the protected file. The file may be decrypted by, for example, the decryption module 928. The decryption module 928 may access a certificate that includes a cryptographic key (e.g., a public key) to obtain access to the cryptographic key. The decryption module 928 may decrypt the protected file using the cryptographic key enabling the file access command to be performed on the decrypted file. The certificate may be associated with a user who caused the file access command to be issued, the computing device storing or attempting to access the protected file, or an entity (e.g., an employer) associated with the user and/or the file.

In some embodiments, file access may be permitted for a particular file, but the preconditions for accessing the file may differ based on the file context. For example, an encryption rule may permit a file to be automatically decrypted and accessed by a user using a workstation at the user's employer location (e.g., the user's workplace). However, the encryption rule may require that the user provide a password prior to accessing the file is the user is accessing the file from a mobile device or at an external location (e.g., a restaurant or private home).

Additional Embodiments

Certain embodiments described herein include a method for automatically encrypting files. In some cases, the method may be performed by computer hardware comprising one or more processors. The method can include detecting access to a first file, which may be stored in a primary storage system. Further, the method can include determining whether the access comprises a write access. In response to determining that the access comprises a write access, the method can include accessing file metadata associated with the first file and accessing a set of encryption rules. In addition, the method can include determining whether the file metadata satisfies the set of encryption rules. In response to determining that the file metadata satisfies the set of encryption rules, the method can include encrypting the first file to obtain a first encrypted file and modifying an extension of the first encrypted file to include an encryption extension.

In some embodiments, a system for automatically encrypting files is disclosed. The system can include a primary storage system configured to store a first file. In addition, the system can include a file monitor comprising computer hardware and configured to detect access to the first file and to determine whether the access comprises a write access. Further, the system can include an encryption rules repository configured to store encryption rules. In addition, the system can include an encryption rules engine comprising computer hardware and configured to access file metadata associated with the first file in response to the file monitor determining that the access comprises a write access. The encryption rules engine may be further configured to access a set of encryption rules from the encryption rules repository and to determine whether the file metadata satisfies the encryption rules. Moreover, the system may include an encryption module comprising computer hardware and configured to encrypt the first file to obtain a first encrypted file in response to the encryption rules engine determining that the file metadata satisfies the encryption rules. Further, the encryption module may be configured to modify an extension of the first encrypted file to include an encryption extension. In some cases, the computer hardware may include multiple computing devices.

In certain embodiments, a method for displaying encrypted files is disclosed. In some cases, the method may be performed by computer hardware comprising one or more processors. The method can include accessing an encrypted file, which may be an encrypted version of an unencrypted file. The unencrypted file may have an extension that is different than an extension of the encrypted file. Further, the method may include accessing metadata associated with the encrypted file and determining a file type of the file based, at least in part, on the metadata. In addition, the file can include outputting for display a reference to the encrypted file based, at least in part, on the file type. The reference to the encrypted file may be configured to mimic, at least in part, the extension of the unencrypted file.

Some embodiments of the present disclosure can include a method for displaying encrypted files, which, in some cases, may be performed by computer hardware comprising one or more processors. This method can include accessing an encrypted file that may be an encrypted version of a file. Further, the method can include accessing metadata associated with the encrypted file and determining a file type of the file based, at least in part, on the metadata. In addition, the method may include outputting for display a reference to the encrypted file based, at least in part, on the file type. This reference to the encrypted file may be configured to mimic, at least in part, a reference to the file.

Certain embodiments of the present disclosure include a system for displaying encrypted files. The system can include a display screen configured to output a user interface and an interface agent comprising computer hardware. The interface agent may be configured to access an encrypted file. The encrypted file may be an encrypted version of an unencrypted file, which may include an extension that is different than an extension of the encrypted file. Further, the interface agent may be configured to access metadata associated with the encrypted file and determine a file type of the file based, at least in part, on the metadata. Moreover, the interface agent may be configured to output for display on the display screen a reference to the encrypted file based, at least in part, on the file type. The reference to the encrypted file may be configured to mimic, at least in part, the extension of the unencrypted file.

In some embodiments, a method for automatically decrypting files is disclosed. The method, in some cases, may be performed by computer hardware comprising one or more processors. In some instances, the method can include authenticating a user based, at least in part, on authentication information provided by the user. The method may further include receiving a request to access a file stored in primary storage and determining based, at least in part, on a file extension of the file whether the file is an encrypted file. In some instances, the encrypted file comprises a modified file extension indicating that the encrypted file is encrypted. Further, in some instances, a reference to the file is displayed to the user as an unencrypted file regardless of whether the file is encrypted. In response to determining that the file is an encrypted file, the method can include determining whether the user is authorized to access the file based, at least in part, on the authentication information without prompting the user for the authentication information in response to the request to access the file. In response to determining that the user is authorized to access the file, the method may include decrypting the file to obtain a decrypted file and providing the user with access to the decrypted file.

In certain embodiments of the present disclosure, a system for automatically decrypting files is disclosed. The system can include an authentication system comprising computer hardware and configured to authenticate a user based, at least in part, on authentication information provided by the user. Further, the system may include a primary storage configured to store encrypted files and unencrypted files, and a secure file access module comprising computer hardware and configured to receive a request to access a file stored in the primary storage. The secure file access module may be further configured to determine based, at least in part, on a file extension of the file whether the file is an encrypted file. The encrypted file may include a modified file extension indicating that the encrypted file is encrypted. In some cases, a reference to the file is displayed to the user as an unencrypted file regardless of whether the file is encrypted. In addition, the secure file access module may be configured to determine whether the user is authorized to access the file based, at least in part, on the authentication information without prompting the user for the authentication information in response to the request to access the file. The system may further include a decryption module comprising computer hardware and configured to decrypt the file to obtain a decrypted file in response to the secure file access module determining that the file is an encrypted file and the user is authorized to access the file. In addition, the system can include an interface agent comprising computer hardware and configured to provide the user with access to the decrypted file obtained by the decryption module in response to the secure file access module determining that the file is an encrypted file and the user is authorized to access the file.

Some embodiments of the present disclosure include a method for backing up a file, which may be performed by a computing system comprising one or more processors. The method can include receiving, at a media agent, a command from a storage manager to backup a file at a secondary storage device. Further, the method can include receiving the file from a data agent and determining whether the file is an encrypted file. In response to determining that the file is an encrypted file, the method can include identifying an encryption algorithm used to encrypt the file and storing metadata associated with the file. The metadata may include an identity of the encryption algorithm. Further, the method may include storing the file at the secondary storage device without performing an encryption process. In response to determining that the file is not an encrypted file, the method can include encrypting the file to obtain an encrypted file and storing the encrypted file at the secondary storage device.

Certain embodiments of the present disclosure include a system for backing up a file. The system can include a primary storage device configured to store a set of files and a secondary storage device configured to store a backup of a file from the set of files. Further, the system can include a storage manager comprising computer hardware and configured to initiate the backup of the file. Initiating the backup of the file can include sending a first backup command to a data agent. In addition, the system can include a data agent comprising computer hardware and configured to provide the file to the media agent based, at least in part, to receiving the first backup command. Moreover, the system can include a media agent comprising computer hardware and configured to receive the file from the data agent and determine whether the file is an encrypted file. In response to determining that the file is an encrypted file, the media agent may store the file at the secondary storage device without performing an encryption process. Further, in response to determining that the file is not an encrypted file, the media agent may encrypt the file to obtain an encrypted file and store the encrypted file at the secondary storage device.

In some embodiments, a method for restoring a file from secondary storage is disclosed. This method, in some cases, may be performed by a computing system comprising one or more processors. In some instances, the method includes receiving, at a media agent, a command from a storage manager to restore a file from a secondary storage device to a recipient system. Further, the method may include accessing the secondary storage device to retrieve the file and accessing metadata associated with the file. In addition, the method may include determining based, at least in part, on the metadata whether the file was encrypted by the media agent. In response to determining that the media agent encrypted the file, the method can include decrypting the file to obtain an unencrypted file and providing the recipient system with access to the unencrypted file.

In certain embodiments, a system for restoring a file from secondary storage is disclosed. This system can include a secondary storage device configured to store a backup of a file. In some instance, the backup of the file is an encrypted file. Further, the system can include a storage manager comprising computer hardware and configured to initiate the restoration of the file. Initiating the restoration of the file can include sending a restore command to a media agent. Moreover, the system can include a media agent comprising computer hardware and configured to retrieve the file from the secondary storage device in response to receiving the restore command. The media agent may also access metadata associated with the file and determine based, at least in part, on the metadata whether the file was encrypted by the media agent. In response to determining that the media agent encrypted the file, the media agent may decrypt the file to obtain an unencrypted file and provide a recipient system with access to the unencrypted file.

Some embodiments of the present disclosure include a method for restoring a file from secondary storage. This method, in some cases, may be performed by a computing system comprising one or more processors. In some instances, the method includes receiving, at a media agent, a command from a storage manager to restore a file from a secondary storage device to a recipient system. Further, the method may include accessing the secondary storage device to retrieve the file and accessing metadata associated with the file. In addition, the method may include determining based, at least in part, on the metadata whether the file is encrypted. In response to determining that the file is encrypted, the method can include modifying the file to mimic, at least in part, an unencrypted version of the file without decrypting the file and providing the recipient system with access to the modified file.

Certain embodiments of the present disclosure include a system for restoring a file from secondary storage. The system can include a secondary storage device configured to store a backup of a file. In some cases, the backup of the file is an encrypted file. Further, the system can include a storage manager comprising computer hardware and configured to initiate the restoration of the file. Initiating the restoration of the file can include sending a restore command to a media agent. In addition, the system can include a media agent comprising computer hardware and configured to retrieve the file from the secondary storage device in response to receiving the restore command. Moreover, the media agent may be configured to access metadata associated with the file and to determine based, at least in part, on the metadata whether the file is encrypted. In response to determining that the file is encrypted, the media agent may be configured to modify the file to mimic, at least in part, an unencrypted version of the file without decrypting the file. Further, the media agent may be configured to provide a recipient system with access to the modified file.

In certain embodiments of the present disclosure, a method for automatically encrypting files is disclosed. The method may be performed by a computing system comprising one or more processors. In some cases, in response to determining that file metadata associated with a file stored in a primary storage system satisfies a set of encryption rules, the method includes encrypting the file to obtain an encrypted file and modifying an extension of the encrypted file to include an encryption extension. Encrypting the file comprises obtaining a data encryption key and encrypting the file with the data encryption key to obtain the encrypted file. Further, encrypting the file includes identifying a set of users who are authorized to access the file. For each user from the set of users, encrypting the file further includes encrypting a copy of the data encryption key for the user to obtain an encrypted copy of the data encryption key and embedding the encrypted copy of the data encryption key with the encrypted file.

In some embodiments of the present disclosure, a system is presented for automatically encrypting files. The system can include a primary storage system configured to store a file and an encryption rules system comprising computer hardware and configured to store a set of encryption rules. Further, the system may include a data agent comprising computer hardware. The data agent may be is associated with a file system of the system. Further, the data agent may be configured to access the set of encryption rules from the encryption rules system and determine based, at least in part, on the set of encryption rules that the file is to be encrypted. In addition, the system can generate a data encryption key and encrypt the file with the data encryption key to obtain an encrypted file. In addition, the system may identify a set of users who are authorized to access the file. For each of the users from the set of users, the data agent may be further configured to encrypt a copy of the data encryption key for the user to obtain an encrypted copy of the data encryption key and include the encrypted copy of the data encryption key with the encrypted file.

In certain embodiments of the present disclosure, a method is presented for backing up a primary storage system. The method may be performed by a computing system comprising one or more processors. The method may include identifying a file stored at a primary storage system for backup to a secondary storage system and determining whether the file is an encrypted file. In response to determining that the file is an encrypted file, the method may include extracting an encrypted data encryption key from the file and decrypting the encrypted data encryption key to obtain a data encryption key. Moreover, the method may include decrypting the file using the data encryption key to obtain a decrypted file and providing the decrypted file to the secondary storage system for backup, thereby enabling the secondary storage system to more efficiently store files at the secondary storage system.

Some embodiments of the present disclosure describe a system for backing up a primary storage system. The system can include a primary storage device configured to store a set of files and a data agent comprising computer hardware. The data agent may be configured to identify a file from the set of files for backup to a secondary storage system and to determine whether the file is an encrypted file. In response to determining that the file is an encrypted file, the data agent may be further configured to extract an encrypted data encryption key from the file and to decrypt the encrypted data encryption key to obtain a data encryption key. Further, the data agent may be configured to decrypt the file using the data encryption key to obtain a decrypted file and to provide the decrypted file to the secondary storage system for backup, thereby enabling the secondary storage system to more efficiently store files at the secondary storage system.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A data storage system comprising:
    a computing system comprising one or more hardware processors programmed to:
        determine a set of file portions from a plurality of training files, at least some of the set of file portions comprising content designated as sensitive information, each of the file portions comprising a subset of content of at least one file from the plurality of training files;
        generate a prospective encryption rule for addition to a set of available encryption rules based at least in part on an aggregated set of the file portions, the aggregated set of the file portions including file portions that appear in more than one file from the plurality of training files;
        determine a number of files from the plurality of training files identified for encryption by performance of the prospective encryption rule; and
        when the number of files identified for encryption does not satisfy a threshold number of files, iteratively modify the prospective encryption rule until the threshold number of files of the plurality of training files are identified for encryption by performance of the modified prospective encryption rule, and store the modified prospective encryption rule at a non-volatile repository.

2. The data storage system of claim 1, wherein the one or more hardware processors are further programmed to add the prospective encryption rule to the set of available encryption rules when the number of files identified for encryption satisfies the threshold number of files.

3. The data storage system of claim 1, further comprising the non-volatile repository that stores the set of available encryption rules.

4. The data storage system of claim 1, wherein the one or more hardware processors are further programmed to:
    apply the set of available encryption rules to a set of files;
    identify a file from the set of files based on the application of the set of available encryption rules, wherein the file is identified based at least in part on a correspondence between a portion of the file and one or more file portions from the plurality of training files used to generate at least one encryption rule from the set of available encryption rules; and
    encrypt the file using the at least one encryption rule.

5. The data storage system of claim 1, wherein the one or more hardware processors are further programmed to:
    monitor creation of a file; and
    determine whether the file satisfies an encryption rule from the set of available encryption rules.

6. The data storage system of claim 1, wherein the one or more hardware processors are further programmed to:
    determine a context condition for the prospective encryption rule, the context condition specifying when to apply the prospective encryption rule to a file; and
    associate the context condition with the prospective encryption rule.

7. The data storage system of claim 6, wherein the context condition comprises at least one of an identity of a user, an identity of a department that includes the user within an entity, a geographic location of a computing device storing the file, a network location of the computing device storing the file, and a device type of the computing device.

8. The data storage system of claim 1, wherein the one or more hardware processors are further programmed to:
    present the prospective encryption rule to a user;
    receive an input from the user responsive to presenting the prospective encryption rule to the user; and
    determine whether to include the prospective encryption rule in the set of available encryption rules based at least in part on the input received from the user.

9. The data storage system of claim 1, wherein the one or more hardware processors are further programmed to remove a file portion from the set of file portions based at least in part on an identified set of non-sensitive file portions.

10. A method of automatically generating encryption rules, the method comprising:
    by a rules generation system comprising one or more hardware processors, determining a set of file portions from a plurality of training files, at least some of the set of file portions comprising content designated as sensitive information, each of the file portions comprising a subset of content of at least one file from the plurality of training files;

generating a prospective encryption rule for addition to a set of available encryption rules based at least in part on an aggregated set of the file portions, the aggregated set of the file portions including at least one file portion that appears in more than one file from the plurality of training files;

determining that a number of files from the plurality of training files identified for encryption by performance of the prospective encryption rule does not satisfy a threshold number of files; and in response to said determining, iteratively modifying the prospective encryption rule until the threshold number of files of the plurality of training files are identified for encryption by performance of the modified prospective encryption rule, and storing the modified prospective encryption rule at a non-volatile repository.

11. The method of claim 10, further comprising applying one or more natural language processing algorithms or heuristic algorithms to the plurality of training files to determine the set of file portions.

12. The method of claim 10, further comprising adding the prospective encryption rule to the set of available encryption rules when the number of files identified for encryption satisfies the threshold number of files.

13. The method of claim 10, further comprising:
applying the set of available encryption rules to a set of files;
identifying a file from the set of files based on the application of the set of available encryption rules, wherein the file is identified based at least in part on a correspondence between a portion of the file and one or more file portions from the plurality of training files used to generate at least one encryption rule from the set of available encryption rules; and
encrypting the file using the at least one encryption rule.

14. The method of claim 10, further comprising:
monitoring creation of a file; and
determining whether the file satisfies an encryption rule from the set of available encryption rules.

15. The method of claim 10, further comprising:
determining a context condition for the prospective encryption rule, the context condition specifying when to apply the prospective encryption rule to a file; and
associating the context condition with the prospective encryption rule.

16. The method of claim 10, further comprising:
presenting the prospective encryption rule to a user;
receiving an input from the user responsive to presenting the prospective encryption rule to the user; and
determining whether to include the prospective encryption rule in the set of available encryption rules based at least in part on the input received from the user.

17. The method of claim 10, further comprising removing a file portion from the set of file portions based at least in part on an identified set of non-sensitive file portions.

18. The method of claim 10, further comprising storing the set of encryption rules at the non-volatile repository, the non-volatile repository accessible by a plurality of networked computing systems.

19. The method of claim 10, wherein generating the prospective encryption rule comprises filtering file portions identified as non-sensitive from the set of file portions for each file from the plurality of training files.

20. The method of claim 10, further comprising:
presenting a file identified as including sensitive content to a user;
receiving confirmation from the user that the file includes sensitive content; and
adding the file to the plurality of training files.

* * * * *